(12) United States Patent
Qasem

(10) Patent No.: US 12,448,301 B2
(45) Date of Patent: *Oct. 21, 2025

(54) DESALINATION SYSTEM AND DESALINATION PROCESS THEREFOR

(71) Applicant: KING FAHD UNIVERSITY OF PETROLEUM AND MINERALS, Dhahran (SA)

(72) Inventor: Naef A.A. Qasem, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 497 days.

This patent is subject to a terminal disclaimer.

(21) Appl. No.: 18/159,442

(22) Filed: Jan. 25, 2023

(65) Prior Publication Data
US 2024/0262715 A1 Aug. 8, 2024

(51) Int. Cl.
C02F 1/14 (2023.01)
C02F 1/26 (2023.01)
(Continued)

(52) U.S. Cl.
CPC ............... *C02F 1/14* (2013.01); *C02F 1/265* (2013.01); *C02F 1/447* (2013.01); *C02F 2103/08* (2013.01); *C02F 2201/002* (2013.01)

(58) Field of Classification Search
CPC .. C02F 1/14; C02F 1/265; C02F 1/447; C02F 2103/08; C02F 2201/002
See application file for complete search history.

(56) References Cited

U.S. PATENT DOCUMENTS

| 9,360,242 B2 * | 6/2016 | Muren ................... F25B 15/02 |
| 10,532,936 B2 * | 1/2020 | Al-Azazmeh .......... B01D 5/006 |

(Continued)

FOREIGN PATENT DOCUMENTS

| CN | 101344342 B | 8/2010 |
| CN | 104944492 B | 1/2018 |
| CN | 114890505 A | 8/2022 |

OTHER PUBLICATIONS

Qasem, N., et al., "Novel and efficient integration of a humidification-dehumidification desalination system with an absorption refrigeration system", Applied Energy, 263, 114659. (Year: 2020).*

(Continued)

*Primary Examiner* — Benjamin L Lebron
(74) *Attorney, Agent, or Firm* — Oblon, McClelland, Maier &Neustadt, L.L.P.

(57) ABSTRACT

A desalination system. The desalination system includes a vapor-absorption refrigeration (VAR) unit. The VAR unit includes a first desorber and a second desorber, an absorber, an evaporator, a condenser, a first heat exchanger and a second heat exchanger, a first lithium bromide (LiBr) solution pump and a second LiBr solution pump, and at least four throttling valves. The desalination system further includes a direct contact membrane distillation (DCMD) unit having a plurality of modules. Each module includes a saltwater feed compartment and a water compartment. The saltwater feed compartment and the water compartment are separated by a membrane so that water vapor is generated in the saltwater feed compartment and is transferred through the membrane to condense in the water compartment. A desalination process is also provided.

20 Claims, 23 Drawing Sheets

(51) Int. Cl.
    *C02F 1/44*         (2023.01)
    *C02F 103/08*     (2006.01)

(56) References Cited

U.S. PATENT DOCUMENTS

| | | | |
|---|---|---|---|
| 10,926,223 B2 * | 2/2021 | Al-Amri | B01D 61/364 |
| 11,142,468 B2 * | 10/2021 | Qasem | B01D 5/0051 |
| 2010/0300946 A1 * | 12/2010 | Nguyen | A23L 2/08 |
| | | | 202/206 |
| 2013/0312445 A1 * | 11/2013 | Isetti | F24F 3/1429 |
| | | | 62/271 |
| 2019/0161366 A1 | 5/2019 | Al-Azazmeh et al. | |
| 2019/0352194 A1 * | 11/2019 | Thiers | C02F 1/28 |

OTHER PUBLICATIONS

Naef A.A. Qasem, et al., "Novel integration of a parallel-multistage direct contact membrane distillation plant with a double-effect absorption refrigeration system", Applied Energy, vol. 323, Article No. 119572, Oct. 2022, 3 pages (Abstract only).

Naef A.A. Qasem, et al., "Innovative integration of a series-module membrane distillation plant with a double-effect absorption refrigerator", Case Studies in Thermal Engineering, vol. 40, Article No. 102498, 2022, pp. 1-16.

* cited by examiner

DESALINATION SYSTEM AND DESALINATION PROCESS THEREFOR

STATEMENT REGARDING PRIOR DISCLOSURE BY THE INVENTORS

Aspects of this technology are described in "Novel integration of a parallel-multistage direct contact membrane distillation plant with a double-effect absorption refrigeration system" published in *Applied Energy*, Volume 323, 7 Jul. 2022, 119572, which is incorporated herein by reference in its entirety.

STATEMENT OF ACKNOWLEDGEMENT

This research was supported by the Interdisciplinary Research Center for Membranes and Water Security and Deanship of Research Oversight and Coordination, King Fahd University of Petroleum and Minerals, under the project number INMW2104.

BACKGROUND

Technical Field

The present disclosure is directed to an integrated cooling and desalination system, and more particularly to powering of a parallel-multistage direct contact membrane distillation (DCMD) unit by heat released from a double-effect vapor-absorption refrigerator (VAR) unit.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Freshwater and comfortable indoor conditions are two of the major global requirements, particularly in hot and arid regions [Qasem N A A, Zubair S M, Abdallah A M, Elbassoussi M H, Ahmed M A. Novel and efficient integration of a humidification-dehumidification desalination system with an absorption refrigeration system. Appl Energy 2020; 263:114659]. The demand for potable water and cooling/refrigeration has been increasing substantially as the world's population continues to grow. Desalination systems are practical solutions used to secure the potable water requirement. Reverse osmosis [Malek A, Hawlader M N A, Ho J C. Design and economics of RO seawater desalination. Desalination 1996; 105:245-61], electrodialysis [Lopez A M, Williams M, Paiva M, Demydov D, Do T D, Fairey J L, et al. Potential of electrodialytic techniques in brackish desalination and recovery of industrial process water for reuse. Desalination 2017; 409:108-14], and multi-effect desalination are examples of commercial desalination technologies that have been utilized to produce freshwater. Concerning cooling requirements, different refrigeration systems have been proposed including vapor-compression refrigeration (VCR) system [Ayati E, Rahimi-Ahar Z, Hatamipour M S, Ghalavand Y. Performance evaluation of a heat pump-driven vacuum humidification-dehumidification desalination system. Appl Therm Eng 2020; 180:115872], vapor-absorption refrigeration (VAR) system [Qasem N A A. Waste-heat recovery from a vapor-absorption refrigeration system for a desalination plant. Appl Therm Eng 2021; 195:117199], and vapor-adsorption (VAD) system [Qasem N A A, Zubair S M. Performance evaluation of a novel hybrid humidification dehumidification (air-heated) system with an adsorption desalination system. Desalination 2019; 461:37-54]. Both desalination systems and refrigeration systems have high energy requirements for their respective operations. It may be noted that each of the said types of refrigeration systems generates thermal energy, which is usually expelled into the atmosphere as waste heat. The coupling between refrigeration systems (heat pumps) and desalination systems can provide advantage by using waste heat to minimize energy consumption and produce freshwater besides the required heating/cooling. In particular, with integration of the desalination system and the refrigeration system, the produced water may turn out to be less expensive and comply with lower-emission goals.

Membrane-based desalination systems such as reverse osmosis and electrodialysis have been demonstrated as economically feasible for water production. At the same time, membrane distillation (MD) is a promising technology as it depends on thermal energy to work. The thermal energy may be secured from solar collectors, geothermal energy, and waste heat of different thermal systems [Khalifa A, Mezghani A, Alawami H. Analysis of integrated membrane distillation heat pump system for water desalination. Desalination 2021; 510:115087]. Direct contact membrane distillation (DCMD) has been employed for thermal-driven membrane desalination. The performance of the DCMD is influenced by the temperature difference of the hot and cold streams, concentration polarization, applied conditions, and membrane characteristics [Ullah R, Khraisheh M, Esteves R J, McLeskey J T, AlGhouti M, Gad-el-Hak M, et al. Energy efficiency of direct contact membrane distillation, Desalination 2018; 433:56-67]. To have a competitive performance of the DCMD compared to reverse osmosis desalination, low-cost heating sources is used [Ahmed F E, Lalia B S, Hashaikeh R, Hilal N. Alternative heating techniques in membrane distillation: A review, Desalination 2020; 496: 114713]. Therefore, using the waste heat of refrigeration systems is in the right direction towards driving efficient and productive MD plants.

In general, a MD system coupled with power plants such as supercritical $CO_2$ showed better performance than those integrated with refrigerators due to the high waste energy released from power plants [Xu J, Liang Y, Luo X, Chen J, Yang Z, Chen Y. Design and optimization of integrated direct-contact membrane distillation and supercritical $CO_2$ Brayton cycle systems for water cogeneration. J Clean Prod 2021; 329:129696]. However, the integration with refrigeration systems (especially absorption-based refrigeration system) can help to utilize the waste heat energy, and also such integrated systems may be feasible for different territories, including rural and off-grid regions. Further, although the VCR systems demonstrated higher performance than other known refrigeration systems for producing cooling, such VCR systems are still electrically powered. The VAR systems, on the other hand, are driven by thermal energy sources and use eco-friendly working fluids, such as lithium bromide. Also, VAR systems have waste heat from two elements (condenser and absorber), which makes it a good option to drive other thermal systems, including desalination systems. Therefore, the DCMD systems may be integrated with the VAR systems to be heated by the waste heat from the condenser as well as the heat released from the absorber thereof.

Integration of the DCMD system with the VAR system for desalination and cooling purposes has not been widely investigated in the literature. VAR systems have been integrated to be feasible with humidification dehumidification (HDH) systems [Boman D B, Garimella S. Performance improvement of a water-purifying absorption cooler through humidification-dehumidification. Appl Therm Eng 2021; 185:116327]. A two-module air-gap MD has been integrated into the VAR system to produce freshwater (no cooling effect) to achieve 2000 L/h water production but with high energy consumption [Bindels M, Nelemans B. Theoretical analysis of heat pump assisted air gap membrane distillation. Desalination 2021; 518:115282]. Another paper suggested a single-effect VAR system integrated with one DCMD system module [Yassen A, Antar M A, Khalifa A E, El-Shaarawi M. Analysis of Absorption Cooling and MD Desalination Cogeneration System. Arab J Sci Eng 2019; 44:1081-95]. This study investigated the effect of source temperature on the cooling capacity and water permeate without addressing the performance indices such as GOR, COP, and cost. Nonetheless, it has shown that standalone double-effect VAR systems are better than single-effect [Herold K E, Radermacher R, Klein S A. Absorption Chillers and Heat Pumps. 2016].

Each of the aforementioned references suffers from one or more drawbacks hindering their adoption. In particular, parallel-multistage membrane distillation (DCMD) unit driven by double-effect vapor-absorption refrigerator (VAR) unit is not investigated in the past. Moreover, none of the references specifically teaches about powering of the DCMD unit by heat released from absorber and condenser of the VAR unit.

Accordingly, it is one object of the present disclosure to provide a desalination system that integrates the VAR unit with the DCMD unit in such a way that two products (freshwater and cooling effect) are obtained with low energy consumption.

SUMMARY

In an exemplary embodiment, a desalination system is provided. The desalination system includes a vapor-absorption refrigeration (VAR) unit. The VAR unit includes a first desorber and a second desorber, an absorber, an evaporator, a condenser, a first heat exchanger and a second heat exchanger, a first lithium bromide (LiBr) solution pump and a second LiBr solution pump, and at least four throttling valves. The desalination system further includes a direct contact membrane distillation (DCMD) unit having a plurality of modules. Each module includes a saltwater feed compartment and a water compartment. The saltwater feed compartment and the water compartment are separated by a membrane so that water vapor is generated in the saltwater feed compartment and is transferred through the membrane to condense in the water compartment. Herein, the absorber is in fluid communication with the second heat exchanger via the second LiBr solution pump. The second heat exchanger is in fluid communication with the first heat exchanger via the first LiBr pump. The second heat exchanger is in fluid communication with the second desorber. The first heat exchanger is in fluid communication with the first desorber. The first desorber is in fluid communication with the first heat exchanger. The first heat exchanger is in fluid communication with the second desorber via a first throttling valve. The second desorber is in fluid communication with the second heat exchanger. The second heat exchanger is in fluid communication with the absorber via a second throttling valve. The second desorber is in fluid communication with the condenser via a third throttling valve. The condenser is in fluid communication with the evaporator via a fourth throttling valve. The evaporator is in fluid communication with the absorber. The condenser is in fluid communication with the saltwater feed compartment of the DCMD unit. The absorber is in fluid communication with the saltwater feed compartment of the DCMD unit.

In one or more exemplary embodiments, the first desorber, the second desorber, the absorber, and the evaporator are oriented horizontally. Further, the first heat exchanger, the second heat exchanger, and the condenser are oriented vertically.

In one or more exemplary embodiments, the modules of the DCMD unit are connected in parallel to each other, and are operated in a counter-current flow mode.

In one or more exemplary embodiments, the DCMD unit comprises from 2 to 40 modules.

In one or more exemplary embodiments, each module of the DCMD unit shares a hot stream via an inlet of the saltwater feed compartment. Also, each module of the DCMD unit shares a cold stream via an inlet of the water compartment. Herein, the hot stream and the cold stream are in countercurrent flow. Further, the saltwater feed compartment of each module is in fluid communication with the water compartment of the same module by passing a portion of the hot stream from the saltwater feed compartment to the water compartment through the membrane.

In one or more exemplary embodiments, the DCMD unit further comprises a discharge line configured to remove excess brine within the saltwater feed compartment. Each module of the DCMD unit shares the discharge line via an outlet of the saltwater feed compartment.

In one or more exemplary embodiments, water produced from the water compartment of the DCMD unit is collected at a permeate tank via an outlet of the water compartment. Further, the permeate tank is in fluid communication with each water compartment of the plurality of modules.

In one or more exemplary embodiments, the condenser and the absorber share a saltwater feed stream. Further, a condenser inlet and an absorber inlet are configured to receive the saltwater feed stream.

In one or more exemplary embodiments, the evaporator is configured to cool a working fluid in a fluid path of an air conditioning system.

In one or more exemplary embodiments, a mass flow rate of a saltwater feed stream sent to the absorber is from 1.2 to 1.8 times greater than a mass flow rate of a saltwater feed stream sent to the condenser.

In one or more exemplary embodiments, the VAR unit further comprises thermal solar cells electrically connected to the first desorber to provide electricity for the first desorber.

In one or more exemplary embodiments, the heating source for the first desorber is at least one selected from a group consisting of a space heater, heating pipes, a furnace, and a boiler.

In one or more exemplary embodiments, the membrane is at least one selected from a group consisting of a composite membrane, a nano-composite membrane, a hydrophobic membrane, an omniphobic membrane, a hydrophilic and hydrophobic composite dual layer membrane, a modified ceramic membrane, a porous ceramic membrane, a surface modified membrane, a polymer electrolyte membrane, a porous graphene membrane, and a polymeric membrane.

In one or more exemplary embodiments, the first heat exchanger is at least one selected from a group consisting of a plate heat exchanger, a tube in tube heat exchanger, a shell and tube heat exchanger, a plate and shell heat exchanger, a plate fin heat exchanger, a double tube heat exchanger, an adiabatic wheel heat exchanger, and a finned tube heat exchanger.

In one or more exemplary embodiments, the second heat exchanger is at least one selected from a group consisting of a plate heat exchanger, a tube in tube heat exchanger, a shell and tube heat exchanger, a plate and shell heat exchanger, a plate fin heat exchanger, a double tube heat exchanger, an adiabatic wheel heat exchanger, and a finned tube heat exchanger.

In one or more exemplary embodiments, the VAR unit employs LiBr solution as an absorbent solution. Herein, the LiBr solution has a concentration of 50 to 70 wt. % based on a total weight of the LiBr solution.

In one or more exemplary embodiments, the absorber is in fluid communication with the plurality of modules of the DCMD unit through inlets of the saltwater feed compartment.

In one or more exemplary embodiments, the condenser is in fluid communication with the plurality of modules of the DCMD unit through inlets of the saltwater feed compartment.

In one or more exemplary embodiments, a heat transfer fluid employed in both the first heat exchanger and the second heat exchanger is at least one molten salt selected from a group consisting of sodium nitrate and potassium nitrate.

In another exemplary embodiment, a desalination process is provided. The desalination process includes feeding a liquid into the desalination system through the saltwater feed compartment. The desalination process further collecting distilled water from the water compartment. Herein, the liquid is at least one selected from a group consisting of salty water, ocean/sea water, rejected brine, wastewater, brackish water, flowback/produced water, and waste flows.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
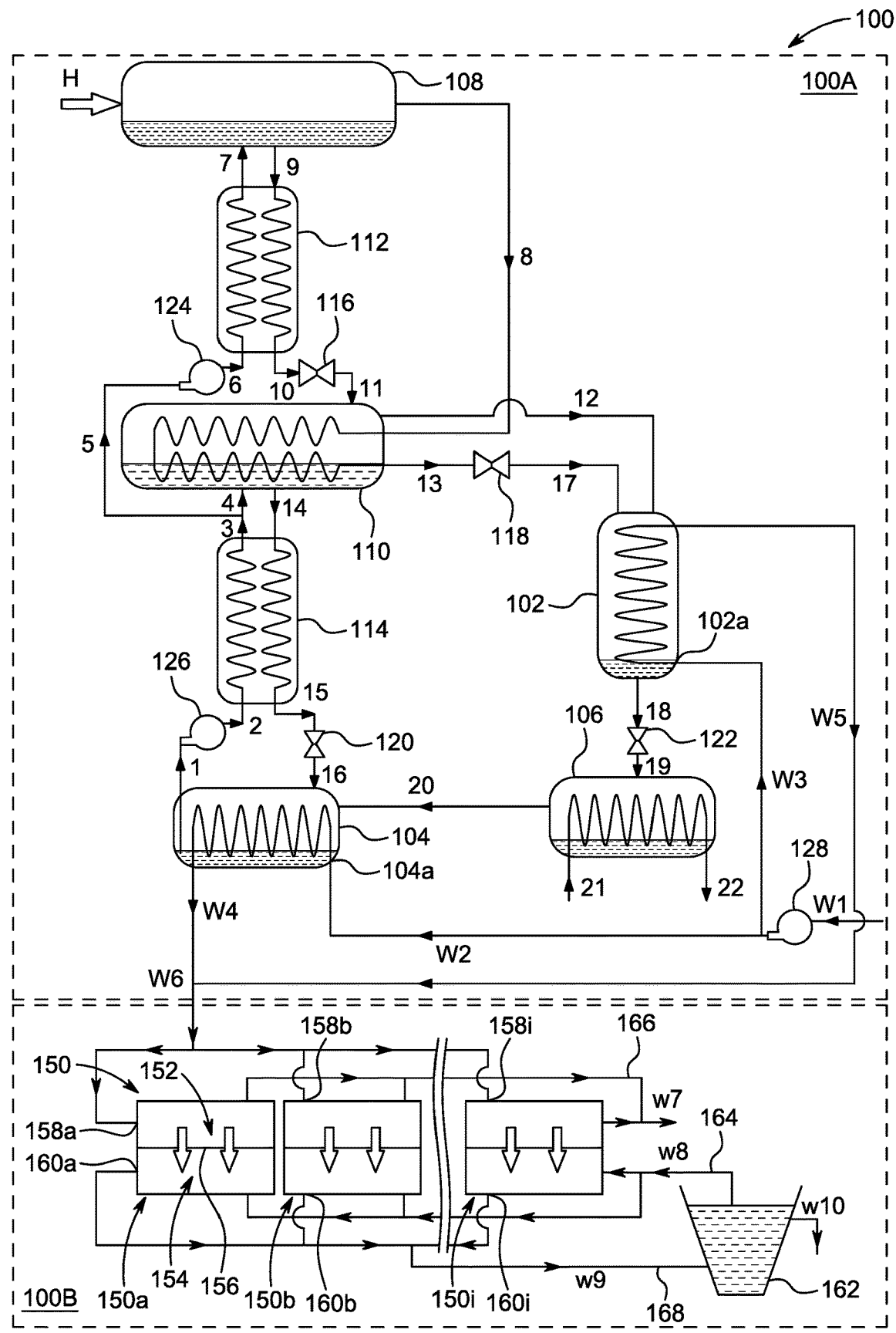
FIG. 1 is a schematic diagram of a desalination system having a vapor-absorption refrigeration (VAR) unit integrated with a direct contact membrane distillation (DCMD) unit, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a desalination system utilizing heat from a vapor-absorption refrigeration (VAR) unit to efficiently power a direct contact membrane distillation (DCMD) unit for freshwater production. The present desalination system plays two roles: a heat pump to drive the DCMD unit for freshwater production and a refrigeration unit for air conditioning purposes. In particular, the present disclosure investigates the powering of a parallel-multistage DCMD unit by waste heat released from absorber and condenser of a double-effect VAR unit in such a way, that two products, i.e., freshwater and cooling effect, are obtained with low energy consumption. Under the applied conditions, the present desalination system shows performance better than a standalone VAR system as well as a standalone DCMD system. Also, it has been found that the parallel-multistage DCMD unit, as integrated in the present desalination system, performs better than a standalone parallel multistage DCMD plant suggested in the literature under the same operating conditions.

The objective of the present disclosure is to investigate the novel integration between the double-effect VAR unit and the multi-module DCMD unit to produce freshwater and cooling effect (for air conditioning purposes). The double-effect VAR unit is used as a refrigerator to produce a cooling effect and simultaneously as a heat pump to drive the DCMD unit through both its absorber and condenser. Therefore, there is no major heat losses (waste heat) from the system, resulting in high performance. Different parameters are investigated, including the feed water temperature of the DCMD system, the ratio of feed amount that goes to cool the absorber, the permeate channels cooling amounts, the inlet heating power, the absorption solution amounts, number of DCMD modules, and channel width. The performance of the integrated system is based on the produced freshwater, the cooling capacity, GOR, COP, and the energy utilization factor (EUF, the overall performance of the integrated system). A robust economic model is used to estimate the integrated system's freshwater and cooling effect costs. Finally, the performance of the integrated system is compared to a standalone DCMD system and a standalone VAR system.

The desalination system of the present disclosure was examined at different conditions, and the performance indicators were represented by freshwater production, cooling capacity, gained output ratio (GOR), coefficient of performance (COP), energy utilization factor (EUF), freshwater cost, and cooling cost. For the best-tuned investigated conditions, the results of produced freshwater, cooling effect, GOR, COP, EUF, freshwater cost, and cooling cost are found as 1315 L/h, 123.4 tons of refrigeration (TR), 2.20, 1.09, 3.28, 4.09 $/m3, and 0.0052 $/kWh, respectively. These performance values outperform the standalone DCMD system by about 2.23 times for produced freshwater, 2.29 times for GOR, 3.42 times for EUF, and 2.82 times for freshwater cost. Compared to a standalone refrigeration system, the cooling cost of the present desalination system is reduced by 2.88 times with a slight sacrifice in cooling capacity and COP by 0.92 and 0.87 times, respectively. Therefore, the present desalination system is an excellent candidate for concurrent production of freshwater and air conditioning.

Referring to FIG. 1, illustrated is a schematic diagram of a desalination system, represented by reference numeral 100 and hereinafter sometimes referred to as "system 100" or "integrated system 100" without any limitations. As illustrated, the desalination system 100 includes a vapor-absorption refrigeration (VAR) unit (as represented by reference numeral 100A). In the present embodiments, the VAR unit 100A is a double-effect VAR system (as discussed later in more detail). Such double-effect VAR system has a higher COP and provides enhanced utilization of input energy. Basic working principle of the double-effect VAR system remains same as a single-effect VAR system but with additional components, such as multiple desorbers and heat exchangers (as discussed later) for the vapor absorption cycle, may effectively provide two single-effect systems, and thereby double the COP as that of the single-effect VAR system. The desalination system 100 further includes a direct contact membrane distillation (DCMD) unit (as represented by reference numeral 100B). In the present embodiments, the DCMD unit 100B is a parallel-multistage DCMD system (as discussed later in more detail). The DCMD unit 100B is a membrane distillation (MD) configuration in which both solutions, feed and permeate, are in a direct contact with a hydrophobic porous membrane. Thus, the water vapor transferred across the membrane is directly condensed in a cold permeate inside the membrane module, as discussed later in the description in more detail.

As illustrated in FIG. 1, the VAR unit 100A includes a condenser 102, an absorber 104 and an evaporator 106. In the VAR unit 100A, the condenser 102 is a heat exchanger that is used to reject heat from the VAR unit 100A. In the condenser 102, the high-pressure, high-temperature vapors of a refrigerant is condensed into a liquid by transferring heat to the surrounding air or water. The absorber 104 is a heat exchanger that is used to absorb heat from the surroundings and transfer it to the refrigerant in the VAR unit 100A. The evaporator 106 is a heat exchanger that is used to transfer heat from the surroundings to the refrigerant, and thereby evaporate the refrigerant to provide cooling effect in the VAR unit 100A. In the present examples, the VAR unit 100A employs water as a refrigerant without any limitations. Further, the absorber 104 is provided with an absorbent solution (sometimes simply referred to as "solution"), and disposed in connection with the evaporator 106 to receive the refrigerant therefrom. The absorber 104 is configured for absorbing the refrigerant by the absorbent solution. In one or more embodiments, the VAR unit 100A employs lithium bromide (LiBr) solution as an absorbent solution. Herein, the LiBr solution has a concentration of 50 to 70 wt. % based on a total weight of the LiBr solution, preferably 55 to 65 wt. %, or even more preferably about 60 wt. % based on the total weight of the LiBr solution. Other ranges are also possible.

The VAR unit 100A also includes two desorbers, namely a first desorber 108 and a second desorber 110. The desorbers 108, 110 are used for removing the absorbed refrigerant vapor from the absorbent solution in the VAR unit 100A. As discussed, the absorbent solution absorbs the heat from the refrigerant vapor and becomes a hot, high-pressure liquid. The desorbers 108, 110 are heat exchangers that are used to transfer heat from the hot, high-pressure absorbent solution to the refrigerant, causing the refrigerant to be released from the absorbent solution. The first desorber 108 is typically located after the absorber 104 and before the evaporator 106 in the VAR unit 100A. The first desorber 108 is used to release a portion of the refrigerant vapor from the absorbent solution, which is then condensed into a liquid in the condenser 102 by transferring heat to the surrounding air or water. The second desorber 110 is typically located after the first desorber 108 and before the evaporator 106 in the VAR unit 100A. The second desorber 110 is used to release the remaining portion of the refrigerant vapor from the absorbent solution, which is then condensed into a liquid in the condenser 102.

The VAR unit 100A further includes two heat exchangers, namely a first heat exchanger 112 and a second heat exchanger 114. The heat exchangers 112, 114 are employed for heating and extracting heat from the absorbent solution as it is transferred between the desorbers 108, 110, for increasing efficiency of the VAR unit 100A. In an example embodiment, the first heat exchanger 112 is at least one selected from a group consisting of a plate heat exchanger, a tube in tube heat exchanger, a shell and tube heat exchanger, a plate and shell heat exchanger, a plate fin heat exchanger, a double tube heat exchanger, an adiabatic wheel heat exchanger, and a finned tube heat exchanger. Similarly, the second heat exchanger 114 is at least one selected from a group consisting of the plate heat exchanger, the tube in tube heat exchanger, the shell and tube heat exchanger, the plate and shell heat exchanger, the plate fin heat exchanger, the double tube heat exchanger, the adiabatic wheel heat exchanger, and the finned tube heat exchanger. Such heat exchangers are well known in the art and thus not described herein for brevity of the present disclosure. Further, in some embodiments, a heat transfer fluid employed in both the first heat exchanger 112 and the second heat exchanger 114 is at least one molten salt selected from a group consisting of sodium nitrate and potassium nitrate. The said molten salts have high thermal stability and low corrosiveness, and these properties make them suitable for use in the high-temperature, high-pressure environments that are present in the VAR unit 100A, without any limitations.

The VAR unit 100A also includes at least four throttling valves, namely a first throttling valve 116, a second throttling valve 118, a third throttling valve 120 and a fourth throttling valve 122. The throttling valves 116, 118, 120, 122 are used to adjust a flow rate and a pressure of the refrigerant and the absorbent solution through the VAR unit 100A in order to optimize the performance thereof. The VAR unit 100A further includes a first LiBr solution pump 124 and a second LiBr solution pump 126. The LiBr solution pumps 124, 126 are used to regulate the flow of the absorbent solution in the VAR unit 100A. In the present VAR unit 100A, the use of multiple throttling valves 116, 118, 120, 122 and multiple pumps 124, 126 supports its double-effect cooling operation, as required.

In an example embodiment, the condenser 102, the evaporator 106, and the absorber 104 share a common housing (not shown). Further, the first desorber 108, the second desorber 110, the absorber 104, and the evaporator 106 are oriented horizontally. One reason is that horizontal orientation allows for more efficient heat transfer between the absorbent solution and the refrigerant. For instance, in the horizontally oriented absorber 104, the absorbent solution flows over the tubes that contain the refrigerant, which allows for more efficient heat transfer between the two fluids. Similarly, in the horizontally oriented evaporator 106, the refrigerant flows over the tubes that contain the absorbent solution, which also allows for more efficient heat transfer. Another reason for the horizontal orientation of the desorbers 108, 110, the absorber 104, and the evaporator 106 is that it allows for better control of the flow of the absorbent solution and the refrigerant by use of gravity, which can be more reliable and easier to control than other flow control methods. Further, in the VAR unit 100A, the first heat exchanger 112, the second heat exchanger 114, and the condenser 102 are oriented vertically. For instance, the vertically oriented condenser 102 may provide space saving and be more efficient to reject heat from the VAR unit 100A to the surrounding air or water.

As illustrated, in the VAR unit 100A, the absorber 104 is in fluid communication with the second heat exchanger 114 via the second LiBr solution pump 126. The second heat exchanger 114 is in fluid communication with the first heat exchanger 112 via the first LiBr pump 124. The second heat exchanger 114 is in fluid communication with the second desorber 110. The first heat exchanger 112 is in fluid communication with the first desorber 108. The first desorber 108 is in fluid communication with the first heat exchanger 112. The first heat exchanger 112 is in fluid communication with the second desorber 110 via the first throttling valve 116. The second desorber 110 is in fluid communication with the second heat exchanger 114. The second heat exchanger 114 is in fluid communication with the absorber 104 via the second throttling valve 118. The second desorber 110 is in fluid communication with the condenser 102 via the third throttling valve 120. The condenser 102 is in fluid communication with the evaporator 106 via the fourth throttling valve 122. The evaporator 106 is in fluid communication with the absorber 104.

In the VAR unit 100A, the condenser 102 and the absorber 104 share a saltwater feed stream. In particular, in the VAR unit 100A, as illustrated in FIG. 1, a saltwater feed stream (as represented by 'W1') is received. The saltwater feed stream 'W1' is split to provide a saltwater feed stream 'W2' and a saltwater feed stream 'W3'. The saltwater feed stream 'W2' is received at the absorber 104, and the saltwater feed stream 'W3' is received at the condenser 102. As shown, the VAR unit 100A includes a saltwater pump 128 to pump a portion of the saltwater feed stream 'W1' to both the condenser 102 and the absorber 104. In an example, a mass flow rate of the saltwater feed stream 'W2' sent to the absorber 104 is from 1.2 to 1.8 times greater than a mass flow rate of the saltwater feed stream 'W3' sent to the condenser 102. In a preferred embodiment, the mass flow rate of the saltwater feed stream 'W2' sent to the absorber 104 is from 1.4 to 1.6 times greater than the mass flow rate of the saltwater feed stream 'W3' sent to the condenser 102. In other words, 60% or more of the total saltwater feed stream 'W1' is utilized to cool the absorber 104, preferably 80% or more of the total saltwater feed stream 'W1' is utilized to cool the absorber 104. The effect of the total saltwater feed stream on performance of the VAR unit 100A, and on the desalination system 100 in general, is discussed later in the description with reference to FIGS. 6A-6G. Herein, as illustrated in FIG. 1, the absorber 104 has an absorber inlet 104a configured to receive the saltwater feed stream 'W2', and the condenser 102 has a condenser inlet 102a configured to receive the saltwater feed stream 'W3'. Other ranges are also possible.

In the VAR unit 100A, a weak solution (i.e., a weak absorbent solution) is heated in the first desorber 108 using a heating source (as represented by 'H'), so some water evaporates and leaves at state '8' and residual strong solution is left therein. In an example, the heating source 'H' for the first desorber 108 is at least one selected from a group consisting of a space heater, heating pipes, a furnace, and a boiler, without any limitations. Further, in an example, the VAR unit 100A further comprises thermal solar cells electrically connected to the first desorber 108 to provide electricity for the first desorber 108, or specifically the heating source 'H' for the first desorber 108. Such heating arrangement may be contemplated by a person skilled in the art and thus not described herein. The first desorber 108 is in fluid communication with the first heat exchanger 112 and configured to return a first separated desorber stream (i.e., the residual strong solution) to the first heat exchanger 112. Further, the first desorber 108 is in fluid communication with the second desorber 110 and configured to pass a second separated desorber stream (i.e., water vapor) to the second desorber 110. Herein, the residual strong solution leaves the first desorber 108 at state '9', passing through the first heat exchanger 112 for preheating weak solution flowing into the first heat exchanger 112 at state '6' from other side and exiting at state '7'. Further, in the second desorber 110, a hot strong solution is mixed with the weak solution inserted at state '4' (as discussed later). The mixture is additionally heated by the water vapor flowing in pipe of the second desorber 110 coming from the first desorber 108 at the state '8' (as discussed above).

Also, the first heat exchanger 112 is in fluid communication with the condenser 102 and configured to pass the first separated desorber stream (i.e., the residual strong solution) from the first heat exchanger 112 to the condenser 102 (as water vapor generated from heat of the residual strong solution in the second desorber 110) via the first throttle valve 116. Further, the second desorber 110 is in fluid communication with the condenser 102 and configured to pass the second separated desorber stream (i.e., the water vapor from the first desorber 108) from the second desorber 110 to the condenser 102 via the second throttling valve 118. That is, the residual strong solution from the first desorber 108 at the state '9' is passed through the first heat exchanger 112 to lose heat to be at state '10'. The residual strong solution is then throttled by the first throttling valve 116 from the state '10' to state '11', to be at a same condition of the second desorber 110. Herein, water vapor is generated in the second desorber 110 which may enter the condenser 102 at state '12'. Further, the water vapor of the first desorber 108 leaves at state '8' to enter pipe of the second desorber 110, which then exits the second desorber 110 at state '13' and is subsequently throttled by the second throttling valve 118 to state '17' to enter the condenser 102 together with water vapor generated from the second desorber 110 at the state '12'.

Further, the second desorber 110 is in fluid communication with the second heat exchanger 114 and configured to pass a first heat exchanger stream (i.e., remaining strong solution in the second desorber 110) from the second desorber 110 to the second heat exchanger 114. That is, the remaining strong solution in the second desorber 110 leaves at state '14' to enter the second heat exchanger 114 and leaves at state '15' therefrom by recovering some heat from weak solution received from the absorber 104 (as discussed later) coming in at state '2' and leaving at state '3' through the second heat exchanger 114. Furthermore, the second heat exchanger 114 is in fluid communication with the absorber 104 and configured to pass the first heat exchanger stream (i.e., heated strong solution) from the second heat exchanger 114 to the absorber 104 via the third throttling valve 120. That is, the heated strong solution at the state '15' is then throttled by the third throttling valve 120 to state '16', which then enters the absorber 104.

The absorber 104 is used to mix the received strong solution at the state '16' using water vapor coming from the evaporator 106 at state '20' (as discussed later) and further cool the received strong solution with the help of the saltwater feed stream 'W2', which in turn provides a saltwater feed stream 'W4' at a relatively higher temperature compared to the saltwater feed stream 'W2'. Also, the absorber 104 is in fluid communication with the second heat exchanger 114 and configured to pass the solution from the absorber 104 to the second heat exchanger 114 via the second pump 126. That is, the resultant weak solution, formed in the absorber 104, at state '1' is pumped via the second pump 126 to enter the second heat exchanger 114 at state '2', and gain some heat in the second heat exchanger 114 to be at state '3'. Further, the second heat exchanger 114 is in fluid communication with the first heat exchanger 112 and configured to pass the solution from the second heat exchanger 114 to the first heat exchanger 112 via the first pump 124. In particular, the heated weak solution at the state '3' is split into two streams, with one stream entering the second desorber 110 at the state '4', and the other steam at state '5' being pumped by the first pump 124 to the state '6' to be passed to the first heat exchanger 112 to gain some more heat to be at state '7'. Furthermore, the first heat exchanger 112 is in fluid communication with the first desorber 108 and configured to pass the solution from the first heat exchanger 112 to the first desorber 108 to heat the solution in the first desorber 108 with the heating source 'H'. That is, the heated stream at the state '7' from the first heat exchanger 112 enters the first desorber 108 (as discussed above) and is further heated therein by heat provided by the heating source 'H'.

As discussed, the water vapor of the first desorber 108 leaves at the state '8' to enter pipe of the second desorber 110, which then exits the second desorber 110 at the state '13' and is subsequently throttled by the second throttling valve 118 to the state '17' to enter the condenser 102 together with water vapor generated from the second desorber 110 at the state '12'. The received water vapors are condensed at the condenser 102 with the help of the saltwater feed stream 'W3' flowing in pipe of the condenser 102 and leaving therefrom as a saltwater feed stream 'W5'. Thereby, a saturated liquid is formed in the condenser 102. Further, the condenser 102 is in fluid communication with the evaporator 106 and configured to pass a rejected DCMD stream (i.e., the saturated liquid) from the condenser 102 to the evaporator 106 via the fourth throttling valve 122. That is, the saturated liquid exits the condenser 102 at state '18' to be throttled by the fourth throttling valve 122 to provide cooled saturated liquid at state '19' which enters the evaporator 106. Herein, the evaporator 106 is configured to cool a working fluid (such as, chiller water) in a fluid path of an air conditioning system (not shown). As shown, the evaporator 106 uses the cooled saturated liquid to cool chiller water entering therein at state '21' and exiting therefrom at state '22' for providing the cooling effect.

Further, in the VAR unit 100A, the absorber 104 is in fluid communication with the DCMD unit 100B and configured to pass a second stream (i.e., the saltwater feed stream 'W4') from the absorber 104 to the DCMD unit 100B to produce water (as discussed in the proceeding paragraphs in detail). Also, in the VAR unit 100A, the condenser 102 is in fluid communication with the DCMD unit 100B and configured to pass a first stream (i.e., the saltwater feed stream 'W5') from the condenser 102 to the DCMD unit 100B to produce water (as discussed in the proceeding paragraphs in detail). In particular, as shown in FIG. 1, a combined stream (represented by a saltwater feed stream 'W6'), including the first stream 'W5' and the second stream 'W4', is passed to the DCMD unit 100B.

As illustrated in FIG. 1, the DCMD unit 100B has a plurality of modules (collectively represented by reference numeral 150). Hereinafter, the modules 150 of the DCMD unit 100B have sometimes been interchangeably referred to as "DCMD modules 150" without any limitations. In the illustrated example, the desalination system 100 is shown to include a first module 150a, a second module 150b, and an end module 150i, with 'i' representing a total number of the modules 150. In the present embodiments, the modules 150 of the DCMD unit 100B are connected in parallel to each other. That is, the DCMD unit 100B is a parallel-multistage DCMD unit. Further, the modules 150 of the DCMD unit 100B are operated in a counter-current flow mode. Counter-current flow is a mode of flow in which two fluids flow in opposite directions, with one fluid flowing into the system and the other flowing out of the system. In an example embodiment, the DCMD unit 100B includes from 2 to 40 modules 150. In a preferred example embodiment, the DCMD unit 100B includes from 15 to 25 modules 150. In a more preferred example embodiment, the DCMD unit 100B includes from 10 to 30 modules 150. The effect of the number of modules 150 in the DCMD unit 100B on the overall performance of the desalination system 100 has been described in reference to FIGS. 9A-9D later in the description. Other ranges are also possible.

Each module 150 includes a saltwater feed compartment 152 and a water compartment 154. Further, in each module 150, the saltwater feed compartment 152 and the water compartment 154 provide hot saltwater feed stream channels and cooling water stream permeate channels, respectively. For purposes of the present disclosure, the individual saltwater feed compartments 152 of all of the modules 150, the individual water compartments 154 of all of the modules 150 and the individual membranes 156 of all of the modules 150 have been, sometimes, collectively referred to as the saltwater feed compartment 152, the water compartment 154 and the membrane 156, respectively, for explanation purposes.

The saltwater feed compartment 152 and the water compartment 154 are separated by a membrane 156 so that water vapor is generated in the saltwater feed compartment 152 and is transferred through the membrane 156 to condense in the water compartment 154. In an example embodiment, the membrane 156 is at least one selected from a group consisting of a composite membrane, a nano-composite membrane, a hydrophobic membrane, an omniphobic membrane, a hydrophilic and hydrophobic composite dual layer membrane, a modified ceramic membrane, a porous ceramic membrane, a surface modified membrane, a polymer electrolyte membrane, a porous graphene membrane, and a polymeric membrane, without any limitations. In present examples, the membrane 156 is hydrophobic membrane for all of the listed membrane types. Such membranes are well known in the art and thus not described herein for brevity of the present disclosure.

Further, the first module 150a of the DCMD unit 100B has a first module inlet 158a at the respective saltwater feed compartment 152 and a second module inlet 160a at the respective water compartment 154. Similarly, the second module 150b of the DCMD unit 100B has a first module inlet 158b at the respective saltwater feed compartment 152 and a second module inlet 160b at the respective water compartment 154; and the end module 150i of the DCMD unit 100B has a first module inlet 158i at the respective saltwater feed compartment 152 and a second module inlet 160i at the respective water compartment 154. As may be seen, the absorber 104 is in fluid communication with the plurality of modules 150 of the DCMD unit 100B through the inlets 158a, 158b, . . . , 158i of the saltwater feed compartment 152. Similarly, the condenser 102 is in fluid communication with the plurality of modules 150 of the DCMD unit 100B through the inlets 158a, 158b, . . . , 158i of the saltwater feed compartment 152. For purposes of the present disclosure, the first module inlets 158a, 158b, . . . , 158i of the saltwater feed compartments 152 have been collectively referred to as inlet of the saltwater feed compartment 152, and the second module inlets 160a, 160b, . . . , 160i of the water compartments 154 have been collectively referred to as inlet of the water compartment 154.

As shown, the condenser 102 is in fluid communication with the saltwater feed compartment 152 of the DCMD unit 100B, to pass the saltwater feed stream 'W5' thereto. Further, as shown, the absorber 104 is in fluid communication with the saltwater feed compartment 152 of the DCMD unit 100B, to pass the saltwater feed stream 'W4' thereto. In particular, the saltwater feed streams 'W2' and 'W3' (split from the saltwater feed stream 'W1') gain some heat from the absorber 104 and the condenser 102, respectively; then leave as the saltwater feed streams 'W4' and 'W5', respectively; and combined again to form a combined stream as the saltwater feed stream 'W6', which is a hot stream (with the two terms being interchangeably used hereinafter). Herein, each module 150 of the DCMD unit 100B shares the hot stream 'W6' via the inlet of the saltwater feed compartment 152. Also, as discussed, the modules 150 are arranged in a counter-current configuration. Herein, the modules 150 receive flow of a cold stream (as represented by 'W8'), from a permeate tank 162, via a cold stream line 164, in an opposite direction to the hot stream 'W6'. Herein, each module 150 of the DCMD unit 100B shares the cold stream 'W8' via the inlet of the water compartment 154. It may be understood that the hot stream 'W6' and the cold stream 'W8' are in countercurrent flow.

In the DCMD unit 100B, the membrane 156 permits water vapor to pass from the saltwater feed compartment 152 to the water compartment 154. In particular, the saltwater feed compartment 152 of each module 150 is in fluid communication with the water compartment 154 of the same module 150 by passing a portion of the hot stream 'W6' from the saltwater feed compartment 152 to the water compartment 154 through the membrane 156. In some examples, the water compartment 154 includes a DCMD condenser (not shown) to condense the water vapor passing through the membrane 156. Specifically, due to temperature difference, water is evaporated closer to the hot saltwater feed stream channels in the saltwater feed compartment 152 and passes through the membrane 156 to the cooling water stream permeate channels in the water compartment 154.

Further, herein, the DCMD unit 100B includes a discharge line 166 configured to remove excess brine within the saltwater feed compartment 152 as stream 'W7'. As shown, each module 150 of the DCMD unit 100B shares the discharge line 166 via an outlet (not labelled in drawings) of the saltwater feed compartment 152. Also, the permeate tank 162 is in fluid communication with each water compartment 154 of the plurality of modules 150. The water produced from the water compartment 154 of the DCMD unit 100B is collected at the permeate tank 162 via an outlet (not labelled in drawings) of the water compartment 154. As shown, the water produced is passed as water stream 'W9', via another discharge line 168, to be collected in the permeate tank 162, which may then be extracted as water stream 'W10', as required.

Next, the following description provides working principle of the desalination system 100, including components thereof, and also provide various performance parameters and results validation against experimental data of known studies. For such purposes, the following nomenclature has been used.

Nomenclature

Abbreviations

AGMD air-gap membrene distillation
COP coefficient of performance
DCMD direct contact membrane distillation
EES engineering equation solver
EUF energy utilization factor
GOR gained output ratio
HX heat-exchanger
LiBr lithium bromide
TR ton of refrigeration
VAR vapor-absorption refrigerator
VCR vapor-compression refrigerator

Symbols $ United States dollar
$\dot{W}$ pumping power, kW
$P_{w,p}^{\,o}$ partial pressure of water vapor inside pores, kPa
$\dot{Q}$ heat transfer rate, kW
$\dot{m}$ mass flowrate, kg/s
a activity coefficient
C concentration, mol/m$^3$
$C_{cooling}$ unit cost of cooling effect, \$/kWh
$C_F$ annual capital cost, \$
$C_G$ annual cost of natural gas, \$
$C_L$ annual labor cost, \$
$C_M$ annual maintenance cost, \$
$C_{Mg}$ annual management cost, \$
$C_{pw}$ unit cost of freshwater produced, \$/m$^3$
$C_T$ total annual cost, \$
d diameter
$D_e$ effective diffusion coefficient, m$^2$/s
$D_h$ hydraulic diameter, m
$D_k$ Knudsen diffusion coefficient, m$^2$/s
$D_m$ molecular diffusion coefficient, m$^2$/s
f system availability
h specific enthalpy, kJ/kg
i interest rate
J water vapor flux, kg/m$^2$·s
$k_m$ membrane thermal conductivity, kW/m·K
$k_s$ diffusive mass transfer coefficient
L length, m
l operating labor cost, \$/m$^3$
$M_w$ molecular weight, kg/kmol
N number of channels in a module
n number of DCMD modules
n system expected life, years
Nu Nusselt number
P total pressure, kPa
$P_{air,\,pore}$ partial pressure of air inside pores, kPa
$PD_{w,a}$ vapor diffusivity through static air inside pores
$P_h$ high pressure, kPa
$P_l$ low pressure, kPa
$P_m$ medium pressure, kPa
$P_{pore}$ total pore pressure, kPa
Pr Prandtl number
q heat transfer per unit area, kW/m$^2$
Re Reynolds number
RUD ratio of water production power to the total power of products
S Salinity, g/kg
Sc Schmidt number
Sh Sherwood number
T temperature, ° C.
U heat transfer coefficient, kW/m$^2$·K
UA overall heat transfer coefficient, kW/K
W width, m
x LiBr concentration, kg/kg
y molar fraction
$\Delta H_v$ latent heat of vaporization, KJ/kg

Greek Symbols

α mass transfer factor/amortization charge
η efficiency
β concentration polarization coefficient
δ thickness, m
ε porosity
φ hypothesis path through the membrane
μ dynamic viscosity, Pa·s
τ tortuosity
ρ density, kg/m$^3$

Subscripts

1, . . . , 22 absorption refrigerator states
w1, . . . , w10 water states
Abs absorber
ch channel
comb combustion
Cond condenser
Des desorber
Evap evaporator
f feed
ht heating source
in inlet
j channel number
m, mem membrane
mf feed at membrane surface
mp permeate at membrane surface
out outlet
p permeate/PORE
pw water production
sat saturated
sw saline water
w water

Superscripts n years
o vapor state

Figure 2A:
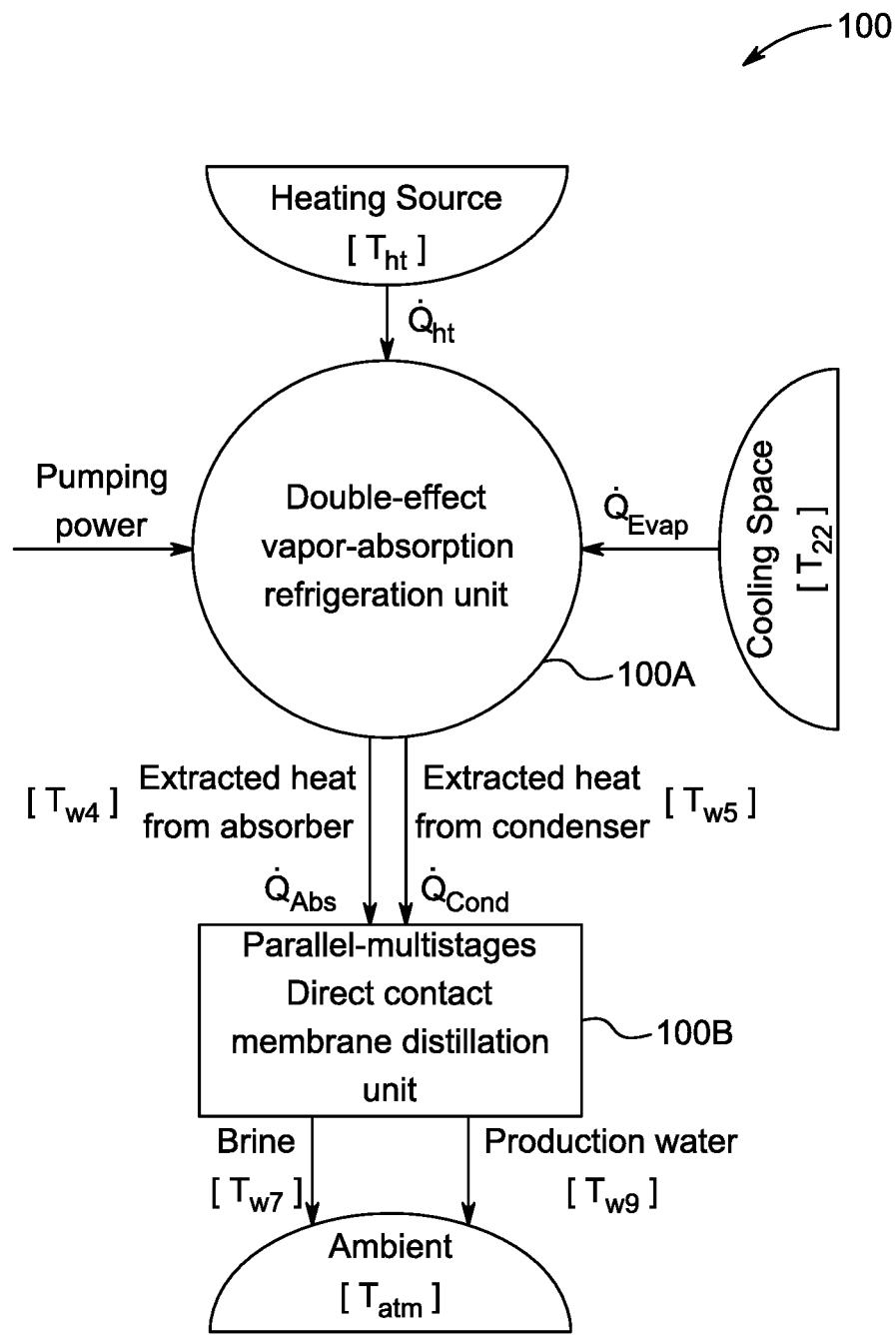
FIG. 2A is a schematic diagram depicting a working principle of the desalination system, according to certain embodiments.

Referring to FIG. 2A, illustrated is a schematic diagram depicting a working principle of the desalination system 100. As shown, the input energy to the VAR unit 100A is provided by the heating source (such as, the heating source 'H' of FIG. 1) at temperature $T_{ht}$ to provide heat at a heat transfer rate $\dot{Q}_{ht}$ to drive the VAR unit 100A. Also, a cooling space load (e.g., the air conditioning system) is provided to the VAR unit 100A, via the chiller water, to exchange heat at a heat transfer rate $\dot{Q}_{evap}$ and thereby provide a cooling effect with temperature $T_{22}$ to the conditioning space. Further, a pumping energy is provided to the double-effect VAR unit 100A to runs the LiBr solution pumps 124, 126. On the other hand, the energy released from the VAR unit 100A is that of the condenser 102 (i.e., condenser cooling water used to exchange heat at heat transfer rate $\dot{Q}_{Cond}$ and provide a temperature $T_{w5}$ to help in driving the DCMD unit 100B) and the absorber 104 (i.e., absorber cooling water used to exchange heat at heat transfer rate $\dot{Q}_{Abs}$ and provide a temperature $T_{w4}$ to help in driving the DCMD unit 100B). Herein, both $\dot{Q}_{cond}$ and $\dot{Q}_{AB}$ power the DCMD unit 100B. The streams that exit from the desalination system 100 are freshwater at temperature $T_{w9}$ (as water stream 'W9' of FIG. 1) and brine at temperature $T_{w7}$ (as stream 'W7' of FIG. 1) to end up at ambient conditions.

Figure 2B:
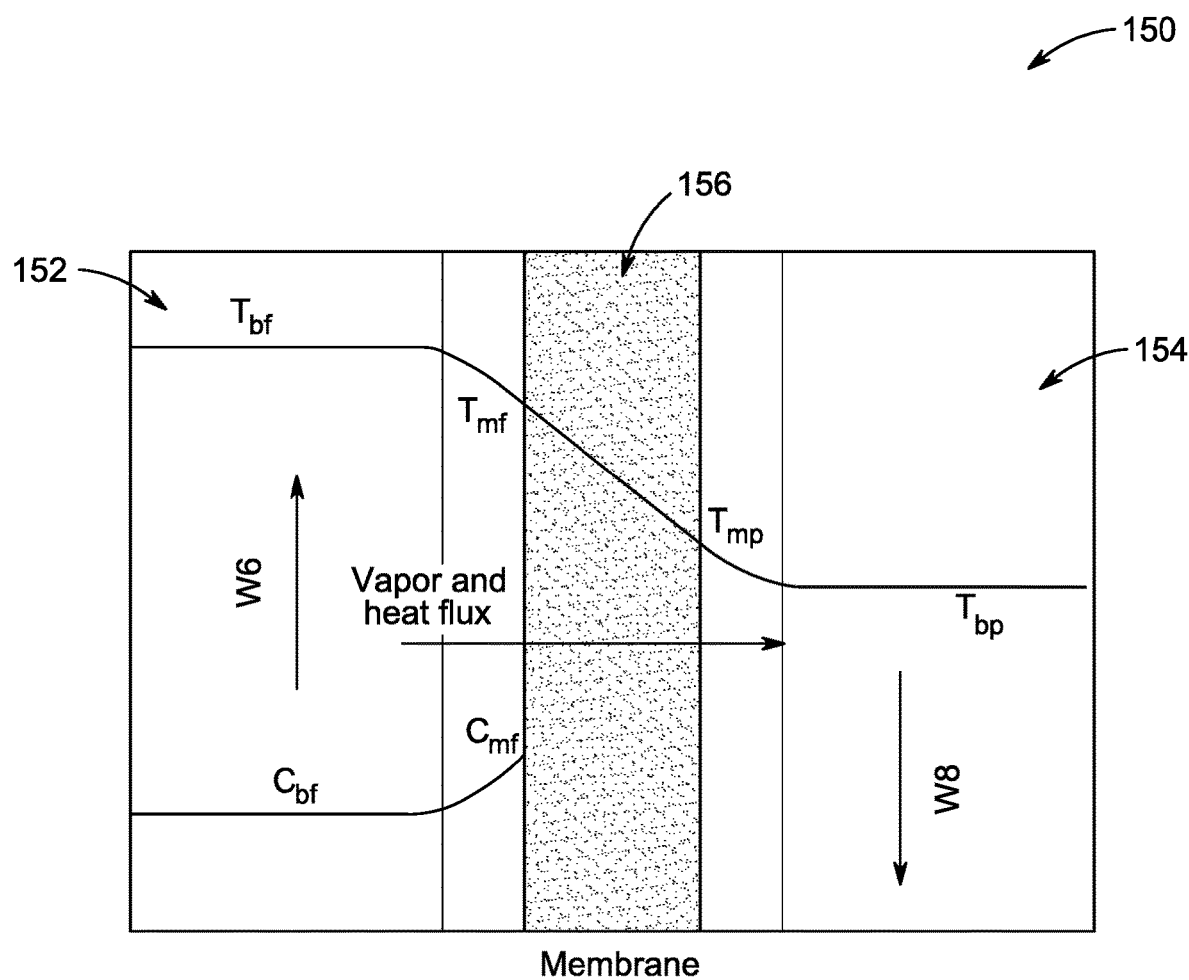
FIG. 2B is a schematic diagram depicting a working principle of the DCMD unit of the desalination system, according to certain embodiments.

Referring to FIG. 2B, illustrated is a schematic diagram depicting a working principle of the DCMD unit 100B of the desalination system 100. As may be understood, the DCMD unit 100B depends on the temperature difference between hot channels at $T_{bf}$ and cold channels at temperature $T_{bp}$, of the saltwater feed compartment 152 and the water compartment 154 respectively, which results in a temperature difference ($T_{mf}$ and $T_{mp}$) on both sides of the membrane 156. Due to this temperature difference, there is a pressure difference resulting in evaporating water closer to hot side of the membrane 156 at the saltwater feed compartment 152. Since the membrane 156 is hydrophobic, the water vapor passes through the membrane 156 while water liquid does not. On the cold side of the membrane 156 at the water compartment 154, water vapor condenses at temperature $T_{mp}$, and it is mixed with permeate water to be cooled to the ambient conditions and extracted from the permeate tank 162. Due to the evaporation process closer to the hot side, a salt concentration grows in this region, as may be seen in FIG. 2B. The vapor and heat fluxes through the membrane 156 rely on the hot and cold temperatures and the thermal resistance of saline water and permeate water, and the membrane 156 itself. In addition, geometry of the channels and characteristics of the membrane 156 are also vital for the vapor and heat fluxes.

Further, in the present disclosure, a simulation model ("model") of the desalination system 100 is considered based on the continuity, energy, VAR solution, and salinity conservation equations. The model is assumed to be under steady-state conditions. The absorbent solution as used in the system 100 is assumed to be homogenous and stable. The ambient conditions are assumed to be at 25° C. and 101.3 kPa. Further, temperatures of the chiller water at state '21' and at state '22' are considered to 12° C. and 7° C., respectively, complying with the standard of AHRI [AHRI. 2018 standard for performance rating of water-chilling and heat pump water-heating packages using the vapor compression cycle 2018:105].

EXAMPLES

The following examples describe and demonstrate exemplary embodiments of an integrated cooling and desalination system described herein. The examples are provided solely for the purpose of illustration. They are not to be construed as limitations of the present disclosure, as many variations thereof are possible without departing from the spirit and scope of the present disclosure.

Example 1: Governing Equations of the DCMD Unit 100B

As the DCMD unit 100B is connected to the VAR unit 100A through the condenser 102 and the absorber 104, the energy acquired to run the DCMD unit 100B is combined at the state 'W6' as:

$$\dot{m}_{w6} h_{w6} = \dot{m}_{w4} h_{w4} + \dot{m}_{w5} h_{w5} \tag{1}$$

where h is the specific enthalpy, and $\dot{m}$ is the mass flow rate. The power used to run all the modules 150 of the DCMD unit 100B is divided among all the modules 150 as:

$$\dot{Q}_{DCMD,f} = \sum_{i}^{n} \dot{Q}_{DCMD,f,i} = \dot{m}_{w6} h_{w6} - \dot{m}_{w7} h_{w7} \tag{2}$$

The total heat due to the cooling water can be expressed as:

$$\dot{Q}_{DCMD,p} = \sum_{i}^{n} \dot{Q}_{DCMD,p,i} = \dot{m}_{w9} h_{w9} - \dot{m}_{w8} h_{w8} \tag{3}$$

where "i" represents module i and "n" is the total number of modules 150. "f" and "p" denote the feed and permeate channels, respectively. The heat transfer through membranes 156 is described later (see Eq. (34)). For each module 150, the run power is divided based on the number of channels, such as:

$$\dot{Q}_{DCMD,f,i} = \sum_{j=1}^{N} \dot{Q}_{ch,f,j} = \sum_{j=1}^{N} (\dot{m}_{f,in,j} h_{f,in,j} - \dot{m}_{f,out,j} h_{f,out,j}) \tag{4}$$

where "j" is the number of a channel in the module and "N" denotes the total number of channels. A similar equation for permeate side can be expressed as:

$$\dot{Q}_{DCMD,p,i} = \sum_{j=1}^{N} \dot{Q}_{ch,p,j} = \sum_{j=1}^{N} (\dot{m}_{p,out,j} h_{p,out,j} - \dot{m}_{p,in,j} h_{p,in,j}) \tag{5}$$

Herein, the total mass flow rate ($\dot{m}_{w6}$) is divided equally for each module. The detailed mass and energy equations for each channel are described in the proceeding paragraphs.

Example 2: Mass Transfer Through the Membranes

The mass flux of evaporated water (permeate) through the membrane is evaluated from the difference in vapor pressure between the feed and permeate sides on the membrane [Khalifa A, Ahmad H, Antar M, Laoui T, Khayet M. Experimental and theoretical investigations on water desalination using direct contact membrane distillation. Desalination 2017; 404:22-34, incorporated herein by reference in its entirety] as:

$$J = D_e \Delta P_m = D_e (P_{mf}^o - P_{mp}^o) \tag{6}$$

Here, $D_e$ is the effective diffusion coefficient (see Eq. (9)), P indicates the pressure, subscripts "mf and mp" represent the feed and permeate sides of the membrane, respectively, and the superscript "o" represents the vapor pressure.

Considering the salinity effect of the feed solution, the permeate mass flux equation is updated to [Khalifa et al.]:

$$J = D_e (p_{mf}^o a_{wf} y_{wf} - p_{mp}^o) \tag{7}$$

where $a_{wf}$ and $y_{wf}$ denote the activity coefficient and the water mole fraction of the feed, respectively. The activity coefficient accounts for the non-ideality of a solution. For NaCl, it could be expressed [Qasem N A A, Generous M M, Qureshi B A, Zubair S M. A Comprehensive Review of Saline Water Correlations and Data: Part II-Thermophysical Properties. Arab J Sci Eng 2021; 46:1941-79, incorporated herein by reference in its entirety] as:

$$a_{wf} = \ln\left(\frac{P_{sw}^o}{P_w^o}\right) = \exp(-4.58180 \times 10^{-4} S - 2.04430 \times 10^{-6} S^2) \tag{8}$$

where S is the salinity in g/kg. $P_{sw}^o$ and $P_w^o$ represent vapor pressure of saltwater and pure water, respectively.

The air and vapor transport through the porous membranes is explained by Knudsen, molecular diffusion, and Poiseuille flow models. The Knudsen flow model and molecular diffusion model are suited to the DCMD systems. Because there is no trans-membrane hydrostatic pressure exerted owing to the negligible pressure difference between permeate and feed steams, the Poiseuille flow is insignificant in this case [Alkhudhiri A, Darwish N, Hilal N. Membrane distillation: A comprehensive review. Desalination 2012; 287:2-18, incorporated herein by reference in its entirety]. The Knudsen diffusion to the molecular diffusion ratio could be used to calculate the diffusions. The controlling mechanism in the mass transfer is determined by a ratio (a) whose value varies from 0 to 1 [Essalhi M, Khayet M. Self-sustained webs of polyvinylidene fluoride electrospun nanofibers at different electrospinning times: 2. Theoretical analysis, polarization effects and thermal efficiency. J Memb Sci 2013; 433:180-91, incorporated herein by reference in its entirety]. The effective diffusivity can be expressed as:

$$D_e = \left(\left(\frac{\alpha}{D_k}\right) + \left(\frac{1-\alpha}{D_m}\right)\right)^{-1} \quad (9)$$

$$D_k = \left(\left(\frac{3\varphi}{2\varepsilon d_{pore}}\right)\left(\frac{\pi R T_m}{8 M_w}\right)^{0.5}\right)^{-1} \quad (10)$$

$$D_M = \left(\frac{R T_m \varphi P_{air,pore}}{M_w \varepsilon P D_{w,a}}\right)^{-1} \quad (11)$$

Here, $D_e$, $D_k$, and $D_M$ represent the effective, Knudsen, and molecular diffusion coefficients, respectively. R is the universal gas constant, $\varepsilon$ is the membrane porosity, $T_m$ is the membrane temperature, which is estimated as the average temperature of both surfaces of the membrane $(T_{mf}+T_{mp})/2$, $M_w$ is the molecular weight of water, P is the total pressure equal to the sum of the air and water partial pressures, and $D_{w,a}$ is the pressure-independent molecular diffusion coefficient of water in the air. $\varphi$ is the hypothesis path through the membrane ($\varphi=\delta_m \tau$). $\delta_m$ and $\tau$ are the membrane thickness and tortuosity, respectively. $\tau$ can be calculated [See: Khalifa et al.] as:

$$\tau = \frac{1}{\varepsilon} \quad (12)$$

The term $PD_{w,a}$ represent the water vapor diffusivity through the static air inside pores; it is estimated [Alkhudhiri A, Darwish N, Hilal N. Membrane distillation: A comprehensive review. Desalination 2012; 287:2-18, and Andrjesdóttir Ó, Ong C L, Nabavi M, Paredes S, Khalil A S G, Michel B, et al. An experimentally optimized model for heat and mass transfer in direct contact membrane distillation. Int J Heat Mass Transf 2013; 66:855-67, incorporated herein by reference in their entirety] as:

$$PD_{w,a} = 1.895 \times 10^{-5} T_m^{2.072} \quad (13)$$

The partial pressure is calculated from the total pore pressure and water partial vapor pressure as:

$$P_{air,pore} = P_{pore} - P_{w,p}^o \quad (14)$$

where $P_{w,p}^o$ is the partial pressure of water vapor inside the pores, which can be determined based on $T_m$, and $P_{pore}$ is the total pores pressure, which is given by:

$$P_{pore} = \frac{P_f + P_p}{2} \quad (15)$$

Example 3: Heat Transfer

The heat transfer from a bulk liquid to the membrane surface is convection heat transfer, while conduction and convection heat transfer exist through the membranes. The convective heat transfer from the hot feed side to the membrane surface ($q_f$) is given as:

$$q_f = h_f(T_{bf} - T_{mf}) \quad (16)$$

where $T_{bf}$ is the feed mean temperature (of the inlet and outlet) and $h_f$ is the convective heat transfer coefficient in the feed side, which depends on the flow type (laminar or turbulent). The heat transfer through the membrane ($q_m$) is:

$$q_m = q_{cond} + q_{conv} \quad (17)$$

$$q_{cond} = \left(\frac{k_m}{\delta_m}\right)(T_{mf} - T_{mp}) \quad (18)$$

$$q_{conv} = J \Delta H_v \quad (19)$$

where $k_m$ is the effective thermal conductivity of the membrane and can be determined as:

$$k_m = \left(\left(\frac{\varepsilon}{k_g}\right) + \left(\frac{1-\varepsilon}{k_{mem}}\right)\right)^{-1} \quad (20)$$

where $k_g$ and $k_{mem}$ are the thermal conductivities of the gas phase (vapor and air) and the membrane, respectively, $\Delta H_v$ is the vaporization enthalpy of water at $T_{mf}$. The convective heat transfer from membrane surface to permeate stream can be estimated as:

$$q_p = h_p (T_{mp} - T_{bp}) \quad (21)$$

where $T_{bp}$ is the permeate average temperature of the inlet and outlet, and $h_p$ is the permeate side convective heat transfer coefficient, which depends on the flow type (laminar or turbulent). The following energy conservation is valid under steady-state conditions:

$$q_f = q_m = q_p \quad (22)$$

The membrane surfaces' temperatures facing the feed and permeate streams are given [Essalhi et al.] as:

$$T_{mf} = \frac{k_m\left(T_{bp} + \frac{h_f}{h_p}T_{bf}\right) + (\delta_m(h_f T_{bf} - J\Delta H_v))}{k_m + \left(h_f\left(\delta_m + \frac{k_m}{h_p}\right)\right)} \quad (23)$$

$$T_{mp} = \frac{k_m\left(T_{bf} + \frac{h_p}{h_f}T_{bp}\right) + (\delta_m(h_p T_{bp} + J\Delta H_v))}{k_m + \left(h_p\left(\delta_m + \frac{k_m}{h_f}\right)\right)} \quad (24)$$

The feed concentration influence on the permeate flux is considered by the estimation of the concentration polarization coefficient ($\beta$)—the ratio of salt concentration adjacent to the membrane surface to that in the bulk region [See: Essalhi et al.].

$$\beta = \frac{C_{mf}}{C_{bf}} \quad (25)$$

where the salt concentration closer to the membrane surface [Yun Y, Ma R, Zhang W, Fane A G, Li J. Direct contact membrane distillation mechanism for high concentration NaCl solutions. Desalination 2006; 188:251-62, incorporated herein by reference in its entirety] is given by:

$$C_{mf} = C_{bf}\exp\left(\frac{J}{k_s\rho_{bf}}\right) \quad (26)$$

Here, $\rho_{pf}$ is the feed stream density and $k_s$ is the diffusive mass transfer coefficient of solute through the concentration boundary layer on the feed side.

$$k_s = Sh * \frac{D_e}{D_h} \quad (27)$$

where $D_h$ and Sh denote the hydraulic diameter of the feed compartment and the Sherwood number, respectively. For laminar flow, the Graetz-Lévêque equation can be used [Yun et al. and MARTÍNEZ-DÍEZ L, FLORIDO-DÍAZ FJ, VÁZQUEZ-GONZÁLEZ MI. Study of Polarization Phenomena in Membrane Distillation of Aqueous Salt Solutions. Sep Sci Technol 2000; 35:1485-501, incorporated herein by reference in their entirety], whereas Dittus-Boelter equation could be suitable for turbulent flow.

$$Sh = \begin{cases} 1.86\left(\frac{Re*Sc*D_h}{L}\right)^{0.33} & \text{Laminar} \\ 0.023\ (Re_f)^{0.8}(Sc)^{0.33} & \text{Turbulent} \end{cases} \quad (28)$$

Here, Re, L, and Sc denote the Reynolds number, the channel length, and the Schmidt number, respectively.

$$Sc = \frac{\mu_{mf}}{\rho_{bf}D_e} \quad (29)$$

where $m_{mf}$ denotes the feed viscosity at the membrane surface. The convective heat transfer coefficient is defined as follows:

$$h = \frac{Nu\,k}{D_h} \quad (30)$$

where k and Nu represent the thermal conductivity of the fluid and the Nusselt number, respectively, Nu can be estimated for laminar flow [See: Andrjesdóttir et al.] and turbulent flow [See: Essalhi et al.] as follows:

$$Nu = \begin{cases} 1.86\left(\frac{Re*Pr*D_h}{L}\right)^{0.33} & \text{Laminar} \\ 0.027\ (Re)^{0.8}(Pr)^{0.4}\left(\frac{\mu_b}{\mu_m}\right)^{0.14} & \text{Turbulent} \end{cases} \quad (31)$$

These equations are used for both channels. Herein, Pr is the Prandtl number (Pr=$\mu$·Cp/k), where $\mu$ and $C_p$ are the dynamic viscosity and the specific heat of the fluid, respectively.

Based on the above equations, the total heat transfer (per unit area) in the module membrane can be expressed as follows:

$$q_m = U(T_{bf} - T_{bp}) \quad (32)$$

where U is the overall heat transfer coefficient and can be estimated [Manawi Y M, Khraisheh M, Fard A K, Benyahia F, Adham S. Effect of operational parameters on distillate flux in direct contact membrane distillation (DCMD): Comparison between experimental and model predicted performance. Desalination 2014; 336:110-20, incorporated herein by reference in its entirety] as:

$$U = \left[\frac{1}{U_f} + \frac{1}{\left(\frac{k_m}{\delta_m}\right) + \frac{J\Delta H_v}{(T_{mf} - T_{mp})}} + \frac{1}{U_p}\right]^{-1} \quad (33)$$

Thus, the total heat transfer is:

$$\dot{Q}_m = nA_{mem}q_m \quad (34)$$

where $A_{mem}$ is the effective area of membrane in a module. It is important to note that the useful energy in the DCMD system is only that related to the evaporation process, so the useful energy for a module can be estimated as:

$$\dot{Q}_{DCMD,useful,i} = A_{mem}J\Delta H_v \quad (35)$$

To account for the plurality of modules 150, the values should be multiplied by the number of modules, "n." The total water production can be given as:

$$\dot{m}_{pw} = nA_{mem}J \quad (36)$$

Thereby, the total useful energy for the DCMD unit 100B can be briefed to:

$$\dot{Q}_{DCMD,useful} = \dot{m}_{pw}\Delta H_v \quad (37)$$

Example 4: Governing Equations of the VAR Unit 100A

For the double-effect VAR unit 100A, the model was previously developed in [Qasem N A A, Zubair S M, Abdallah A M, Elbassoussi M H, Ahmed M A. Novel and efficient integration of a humidification-dehumidification desalination system with an absorption refrigeration system. Appl Energy 2020; 263:114659 and Herold K E, Radermacher R, Klein S A. Absorption Chillers and Heat Pumps. 2016, incorporated herein by reference in their entirety]. Table 1 below summarizes the model governing equations as adapted from Qasem et al. and Herold et al. to be appropriate for the desalination system 100 of FIG. 1.

TABLE 1

| Component | Governing equations | Eq. |
|---|---|---|
| Desorber # 1 | $\dot{m}_8 + \dot{m}_9 = \dot{m}_7$ | (38) |
| | $\dot{m}_9 x_9 = \dot{m}_7 x_7$ | (39) |
| | $\dot{Q}_{ht} = \dot{m}_9 h_9 + \dot{m}_8 h_8 - \dot{m}_7 h_7$ | (40) |
| Desorber # 2 | $\dot{m}_{14} + \dot{m}_{12} = \dot{m}_4 + \dot{m}_9$ | (41) |
| | $\dot{m}_{14} x_{14} = \dot{m}_4 x_4 + \dot{m}_9 x_9$ | (42) |
| | $\dot{m}_8 = \dot{m}_{13}$ | (43) |
| | $\dot{Q}_{DES\#2} = \dot{m}_{14} h_{14} + \dot{m}_{12} h_{12} - \dot{m}_4 h_4 -$ $\dot{m}_9 h_{11} = \dot{m}_8 (h_8 - h_{13})$ | (44) |
| | $\dot{Q}_{Des\#2} = UA_{Des\#2}\left(\dfrac{(T_{13}-T_{14})-(T_{13}-T_{12})}{\ln\left(\dfrac{T_{13}-T_{14}}{T_{13}-T_{12}}\right)}\right)$ | (45) |
| Solution split | $\dot{m}_1 = \dot{m}_7 + \dot{m}_4$ | (46) |
| Absorber | $\dot{m}_1 = \dot{m}_{14} + \dot{m}_{20}$ | (47) |
| | $\dot{m}_1 x_1 = \dot{m}_{14} x_{14}$ | (48) |
| | $\dot{Q}_{Abs} = \dot{m}_{14} h_{16} + \dot{m}_{20} h_{20} - \dot{m}_1 h_1 = \dot{m}_{w2}(h_{w4} - h_{w2})$ | (49) |
| | $\dot{Q}_{Abs} = UA_{Abs}\left(\dfrac{(T_{16}-T_{w4})-(T_1-T_{w2})}{\ln\left(\dfrac{T_{16}-T_{w4}}{T_1-T_{w2}}\right)}\right)$ | (50) |
| Weak solution concentration | $x_1 = x_2 = x_3 = x_4 = x_5 = x_6 = x_7$ | (51) |
| Strong solution concentration | $x_9 = x_{10} = x_{11}$ | (52) |
| | $x_{14} = x_{15} = x_{16}$ | (53) |
| Condenser | $\dot{m}_{17} + \dot{m}_{12} = \dot{m}_{18}$ | (54) |
| | $\dot{Q}_{Cond} = \dot{m}_{17} h_{17} + \dot{m}_{12} h_{12} - \dot{m}_{18} h_{18} = \dot{m}_{a5}(h_{w5} - h_{w3})$ | (55) |
| | $\dot{Q}_{Cond} = UA_{Cond}\left(\dfrac{(T_{18}-T_{w3})-(T_{18}-T_{w5})}{\ln\left(\dfrac{T_{18}-T_{w3}}{T_{18}-T_{w5}}\right)}\right)$ | (56) |
| Evaporator | $\dot{m}_{19} = \dot{m}_{20} = \dot{m}_{18}$ | (57) |
| | $\dot{Q}_{Evap} = \dot{m}_{19}(h_{20} - h_{19}) = \dot{m}_{21}(h_{21} - h_{22})$ | (58) |
| | $\dot{Q}_{Evap} = UA_{Evap}\left(\dfrac{(T_{21}-T_{20})-(T_{22}-T_{19})}{\ln\left(\dfrac{T_{21}-T_{20}}{T_{22}-T_{19}}\right)}\right)$ | (59) |
| HX # 1 | $\dot{Q}_{HX\#1} = \dot{m}_7(h_7 - h_6) = \dot{m}_9(h_9 - h_{10})$ | (60) |
| | $\dot{Q}_{HX\#1} = UA_{HX\#1}\left(\dfrac{(T_9-T_7)-(T_{10}-T_6)}{\ln\left(\dfrac{T_9-T_7}{T_{10}-T_6}\right)}\right)$ | (61) |
| HX # 2 | $\dot{Q}_{HX\#2} = \dot{m}_1(h_3 - h_2) = \dot{m}_{14}(h_{14} - h_{15})$ | (62) |
| | $\dot{Q}_{HX\#2} = UA_{HX\#2}\left(\dfrac{(T_{14}-T_3)-(T_{15}-T_2)}{\ln\left(\dfrac{T_{14}-T_3}{T_{15}-T_2}\right)}\right)$ | (63) |
| Pump # 1 | $\dot{W}_{Pump\#1} = \dot{m}_1(h_2 - h_1) = \dfrac{\dot{m}_1}{\eta \rho_1}(P_m - P_l)$ | (64) |
| Pump # 2 | $\dot{W}_{Pump\#2} = \dot{m}_7(h_6 - h_5) = \dfrac{\dot{m}_7}{\eta \rho_5}(P_h - P_m)$ | (65) |
| Throttling valves | $h_{10} = h_{11}$ | (66) |
| | $h_{13} = h_{17}$ | (67) |
| | $h_{15} = h_{16}$ | (68) |
| | $h_{18} = h_{19}$ | (69) |
| Water split | $\dot{m}_{w2} = y\,\dot{m}_{w1}\ \&\ \dot{m}_{w3} = (1-y)\,\dot{m}_{w1}$ | (70) |
| | $\dot{m}_{w1} h_{w1} = \dot{m}_{w2} h_{w2} + \dot{m}_{w3} h_{w3}$ | (71) |
| Water mixed | $\dot{m}_{w6} = \dot{m}_{w4} + \dot{m}_{w5}$ | (72) |
| | $\dot{m}_{w6} h_{w6} = \dot{m}_{w4} h_{w6} + \dot{m}_{w5} h_{w7}$ | (73) |

The governing equations of the VAR unit (with state numbers being presented in FIG. (1). Herein, x is the solution concentration. UA is the overall heat transfer coefficient of a component, η is the efficiency, and ρ is the density.

Example 5: Performance Indices

The produced water ($\dot{m}_{pw}$) and cooling capacity ($\dot{Q}_{Evap}$) are the products of the integrated desalination system 100. The performance of the system 100 involves these two products besides GOR (the vaporization energy over the total energy input), COP (the cooling capacity over total energy input), and energy utilization factor (EUF/UTF, which accounts for both water vapor vaporization heat and cooling capacity).

$$GOR = \frac{\dot{Q}_{DCMD,useful}}{\dot{Q}_{ht} + \dot{W}_{Pump\#1} + \dot{W}_{Pump\#2}} \quad (74)$$

$$COP = \frac{\dot{Q}_{Evap}}{\dot{Q}_{ht} + \dot{W}_{Pump\#1} + \dot{W}_{Pump\#2}} \quad (75)$$

$$EUF = \frac{\dot{Q}_{DCMD,useful} + \dot{Q}_{Evap}}{\dot{Q}_{ht} + \dot{W}_{Pump\#1} + \dot{W}_{Pump\#2}} \quad (76)$$

Figure 3:
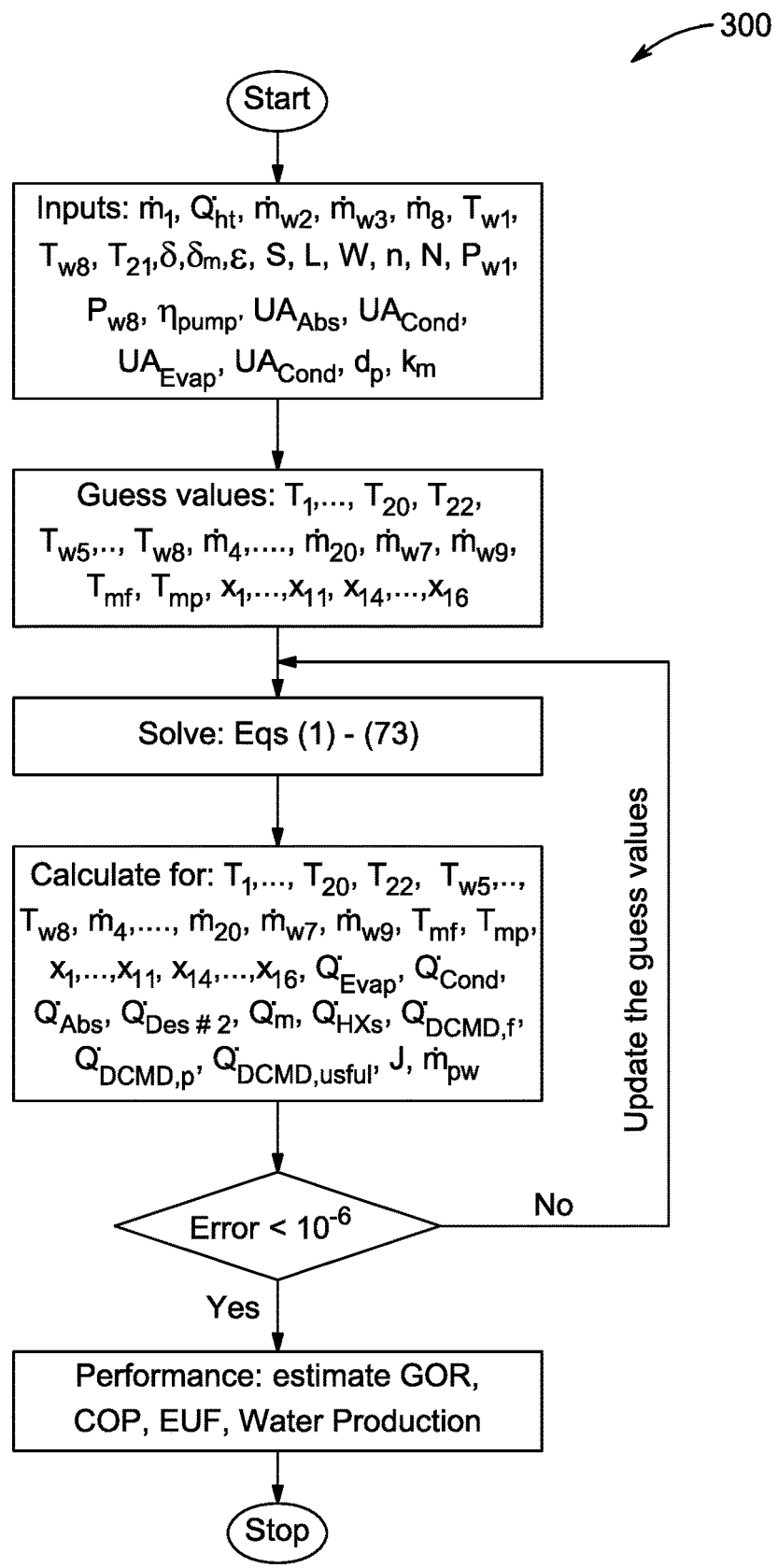
FIG. 3 is an exemplary flowchart of implementation of a model of the desalination system in an Engineering Equation Solver (EES) software, according to certain embodiments.

Referring to FIG. 3, illustrated is an exemplary flowchart (as represented by reference numeral 300) of implementation of the model (as described in the preceding paragraphs) of the desalination system 100 in an Engineering Equation Solver (EES) software [EES: Engineering Equation Solver|F-Chart Software: Engineering Software 2020, incorporated herein by reference in its entirety]. Herein, the fluids' thermodynamic properties are taken from [Qasem et al., EES: Engineering Equation Solver, and Generous M M, Qasem N A A, Qureshi B A, Zubair S M. A comprehensive review of saline water correlations and data-Part I: Thermodynamic properties. Arab J Sci Eng 2020; 45:8817-76, incorporated herein by reference in their entirety]. The EES solves a number of algebraic equations that equal the number of unknowns. As shown in the flowchart 300 of FIG. 3, starting with a guess value for every unknown and solving all equations implicitly to obtain the solution, the obtained values for the unknowns are taken as new guess values, and this is repeated until a convergent solution is achieved. The convergence is obtained when the error is less than $10^{-6}$.

Example 6: Operating Conditions

Table 2 below lists the operating and constructive variables used to estimate performance of the desalination system 100 with some of the values taken from various references [Herold et al. and Hwang H J, He K, Gray S, Zhang J, Moon I S. Direct contact membrane distillation (DCMD): Experimental study on the commercial PTFE membrane and modeling. J Memb Sci 2011; 371:90-8, incorporated herein by reference in their entirety].

TABLE 2

Important designing and operating variables of the desalination system, where these values are used in the results section unless otherwise mentioned.

| Parameter | Value |
| --- | --- |
| Weak solution mass flow rate, $\dot{m}_1$ | 1 kg/s |
| $UA_{evap}$ | 85 kW/K |
| $UA_{Abs}$ | 50 kW/K |
| $UA_{Des\#1}$ | 25 kW/K |
| $UA_{Des\#2}$ | 10 kW/K |
| $UA_{Cond}$ | 65 kW/K |
| $UA_{HX\#1}$ | 2 kW/K |
| $UA_{HX\#2}$ | 1.25 kW/K |
| High-pressure of VAR, $P_h$ | $P_{sat}$ at $T_{13}$ |
| Medium-pressure of VAR, $P_m$ | $P_{sat}$ at $T1_8$ |
| Low-pressure of VAR, $P_l$ | $P_{sat}$ at $T_{20}$ |
| Efficiency of pumping devices, $\eta$ | 0.72 |
| Length of DCMD channel | 0.7 m |
| Width of DCMD channel | 0.5 m |
| Thickness of DCMD channel | 1 mm |
| Feed water temperature, $T_{w1} = T_f$ | 25° C. |
| Permeate water temperature, $T_{w8} = T_p$ | 25° C. |
| Feed mass flow rate (total), $\dot{m}_{w1} = \dot{m}_f$ | 10 kg/s |
| Permeate water mass flow rate (total), $\dot{m}_{w8} = \dot{m}_p$ | 10 kg/s |
| Ratio of feed water goes to the absorber | 0.5 |
| Saline water salinity, Salinity | 35 g/kg |
| Number of channels in a DCMD module | 30 |
| Number of modules | 5 |
| Membrane PTFE-SF17386 (0.45 µm) | |
| Membrane thickness, $\delta_m$ | 145.0 µm |
| Membrane porosity, $\varepsilon$ | 0.80 |
| Pore diameter, $d_p$ | 0.379 µm |
| Membrane thermal conductivity, $k_m$ | 0.18 W/m · K |
| Membrane PVDF ENMs | |
| Membrane thickness, $\delta_m$ | 144.4 µm |
| Membrane porosity, $\varepsilon$ | 0.853 |
| Pore diameter, $d_p$ | 1.20 µm |
| Membrane thermal conductivity, $k_m$ | 0.18 W/m · K |

Example 7: Economic Method

The produced water and the cooling effect cost are estimated based on all cost contributors. Herein, the following assumptions are made: (a) natural gas burning process runs the first desorber 108 (Desorber #1) with a gas unit cost of $4.0 per million metric British thermal units at an efficiency of 83.9% [Comparison of combustion performance between natural gas and medium fuel oil at different firing settings for industrial boilers n.d., incorporated herein by reference in its entirety]; (b) photovoltaic panels (PV) are used to drive the pumps 124, 126; (c) the cost of labor is considered as $0.1 per cubic meter of produced water [El-Dessouky H T, Ettouney H M. Fundamentals of salt water desalination. Fundam Salt Water Desalin 2002, incorporated herein by reference in its entirety], and 20% of it is taken for the management cost [Wang Y, Lior N. Thermoeconomic analysis of a low-temperature multi-effect thermal desalination system coupled with an absorption heat pump. Energy 2011; 36:3878-87, incorporated herein by reference in its entirety]; (d) 1.5% of the capital cost is used for the annual maintenance cost [Wang et al.]; (e) the system operates for n=30 years at availability (f) of 90% [Kabeel A E, Elmaaty T A, El-Said E M S. Economic analysis of a small-scale hybrid air HDH-SSF (humidification and dehumidification-water flashing evaporation) desalination plant. Energy 2013; 53:306-11, incorporated herein by reference in its entirety]; and (f) the interest rate (i) is taken as 5% [Kabeel et al.].

Further, the components' capital costs are variable, as summarized in Table 3 below taken from multiple references [Rostamzadeh H, Namin A S, Ghaebi H, Amidpour M. Performance assessment and optimization of a humidification dehumidification (HDH) system driven by absorption-compression heat pump cycle. Desalination 2018; 447:84-101, Murphy C, Sun Y, Cole W, Maclaurin G, Turchi C, Mehos M, et al. The potential role of concentrating solar power within the context of DOE's 2030 solar cost targets. 2019, Banat F, Jwaied N. Economic evaluation of desalination by small-scale autonomous solar-powered membrane distillation units. Desalination 2008; 220:566-73, and Lawal D U, Antar M A, Khalifa A, Zubair S M, Al-Sulaiman F. Experimental investigation of heat pump driven humidification-dehumidification desalination system for water desalination and space conditioning. Desalination 2020; 475:114199, incorporated herein by reference in their entirety].

TABLE 1

| Component | Annual capital/investment cost |
| --- | --- |
| Desorbers | $2 \times 2143 \left(\dfrac{UA_{Des}}{0.85}\right)^{0.541}$ |
| Absorber | $2143 \left(\dfrac{UA_{Abs}}{0.85}\right)^{0.541}$ |
| Heat exchangers | $2 \times 2143 \left(\dfrac{UA_{HX}}{1.1}\right)^{0.541}$ |
| Condenser | $2143 \left(\dfrac{UA_{Cond}}{1.1}\right)^{0.541}$ |
| Evaporator | $2143 \left(\dfrac{UA_{Evap}}{1.1}\right)^{0.541}$ |
| Throttling valves | $114.5 \, (\dot{m}_{10} + \dot{m}_{13} + \dot{m}_{15} + \dot{m}_{18})$ |
| PV and pumping power (annual) | $0.08 \, (W_{Pump\#1} + W_{Pump\#2}) \times f \times 24 \times 365$ |
| Membranes | $36 \times A_{mem}$ |
| DCMD installation | $0.25 \times$ purchased equipment cost |
| Membrane's replacement | $0.20 \times$ purchased equipment cost |
| Water tanks[a] | $11.795 \, \dot{m}_{pw} - 0.000343 \, \dot{m}_{pw}^2$; $\dot{m}_{pw}$ is hourly kg |
| Pipes and fittings | $2.92 \, \dot{m}_{pw}$; $\dot{m}_{pw}$ is hourly kg |
| Accessories | $1.67 \, \dot{m}_{pw}$; $\dot{m}_{pw}$ is hourly kg |
| Control devices | $8.34 \, \dot{m}_{pw}$; $\dot{m}_{pw}$ is hourly kg |

Construction cost of integrated system; [a]representing that the estimated cost is formulated based on the market cost).

The overall capital cost ($C_c$) is the summation of values obtained from the equations described in Table 3. The capital cost (annual) is given as:

$$C_F = C_c \times \alpha \quad (77)$$

Here, α is the amortization charge.

$$\alpha = \frac{i \times (i+1)^n}{(i+1)^n - 1} \quad (78)$$

The natural gas annual cost is given as:

$$C_G = \times \frac{COG}{293.071} \times \frac{\dot{Q}_{hL}}{\eta_{comb}} \times 24 \times 365 \quad (79)$$

The annual labor cost ($C_L$), maintenance cost ($C_M$), and management cost ($C_{Mg}$) are expressed by:

$$C_L = l \times f \times \frac{\dot{m}_{pw}}{1000} \times 3600 \times 24 \times 365 \quad (80)$$

$$C_M = 0.015 \times C_F \quad (81)$$

$$C_{Mg} = 0.20 \times C_L \quad (82)$$

The total cost in USD ($) is:

$$C_T = C_F + C_G + C_M + C_{Mg} + C_L \quad (83)$$

Since the proposed desalination system 100 produces freshwater and cooling capacity, the cost of each product can be estimated based on the relevant output from the VAR unit 100A and the DCMD unit 100B. The portion pertinent to water production is given as the ratio of useful heat of desalination (RUD) [Lawal et al.] by:

$$RUD = \frac{\dot{Q}_{DCMD,useful}}{\dot{Q}_{evap} + \dot{Q}_{DCMD,useful}} \quad (84)$$

Thus, the freshwater cost ($/m³) is estimated as:

$$C_{pw} = RUD \frac{C_T}{f \times \dot{m}_{pw} \times 3600 \times 24 \times 365} \quad (85)$$

And cooling effect cost ($/kWh) is:

$$C_{cooling} = (1 - RUD) \frac{c_T}{f \times \dot{Q}_{evap} \times 24 \times 365} \quad (86)$$

Example 8: Model Validation

Figures 4A, 4B, 4C:
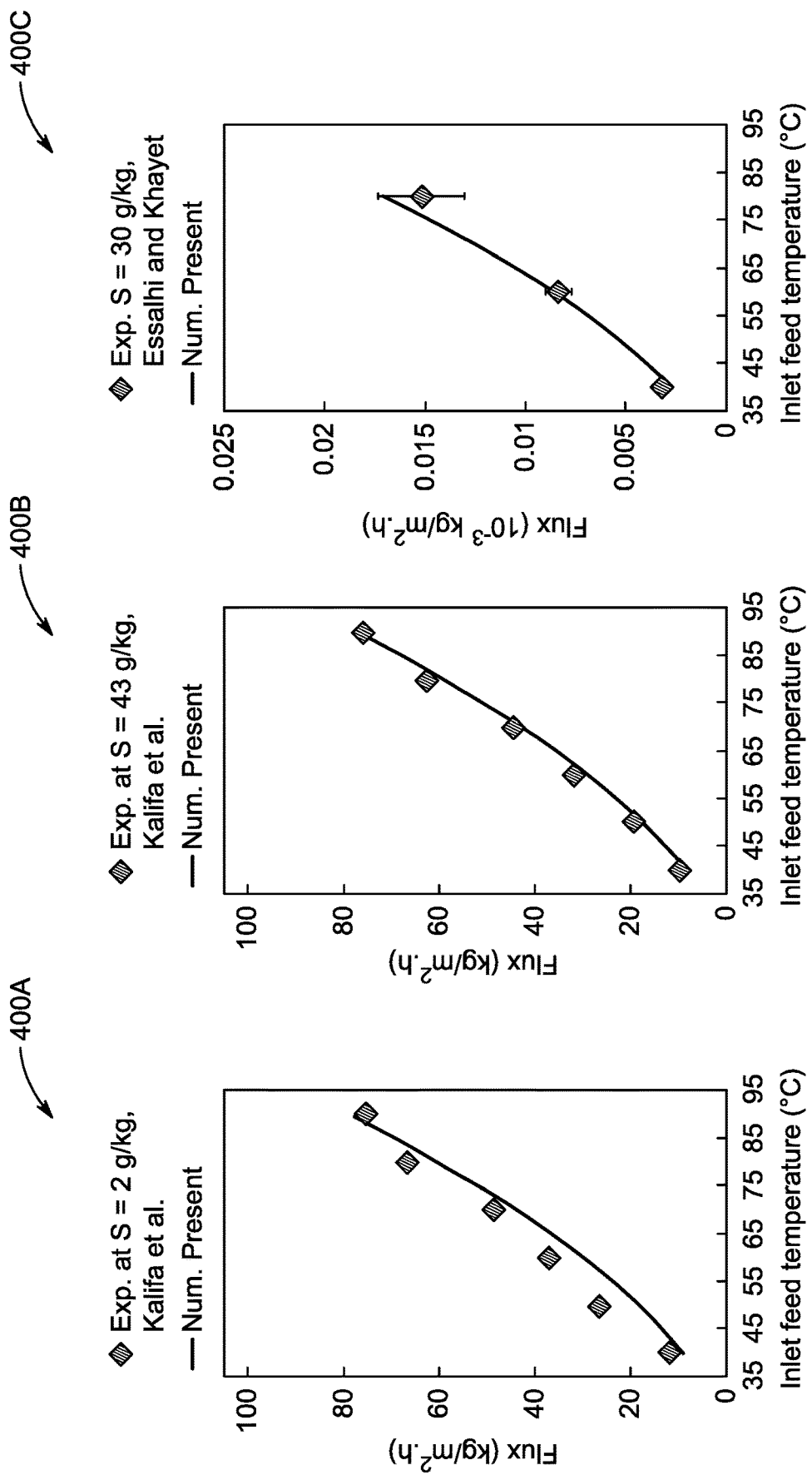
FIG. 4A is an exemplary graph for results validation for a model of the DCMD unit against experimental data of Khalifa et al. at a cooling temperature of 25° C. and PTFE-SF17386 (0.45 μm) membrane for salinity at 2 g/kg, according to certain embodiments.
FIG. 4B is an exemplary graph for results validation for a model of the DCMD unit against experimental data of Khalifa et al. at a cooling temperature of 25° C. and PTFE-SF17386 (0.45 μm) membrane for salinity at 43 g/kg, according to certain embodiments.
FIG. 4C is an exemplary graph for results validation for a model of the DCMD unit against experimental data of Essalhi and Khayet at a cooling temperature of 20° C. and PVDF ENMs membrane for salinity at 30 g/kg, according to certain embodiments.

The above described models of the VAR unit 100A and the DCMD unit 100B are validated against some reported experimental works. Referring to FIGS. 4A-4C, herein, the model of the DCMD unit 100B is validated against the experimental work of Khalifa et al. and Essalhi and Khayet at a cooling temperature of 25 and 20° C. and membrane type of PTFE-SF17386 (0.45 μm) and PVDF ENMs, respectively. As may be seen from graphs 400A, 400B and 400C of FIGS. 4A-4C, the model predictions are in line with the experimental work of Khalifa et al. and Essalhi and Khayet.

Further, the validation of the VAR unit 100A has been discussed in the Supplementary information file of the previous study [Qasem et al.]. Thus, the present models may be considered trustworthy for evaluating the investigated system.

Further, the performance of the desalination system 100 is discussed in terms of the influence of the input parameters on the performance outputs, such as produced water, cooling effect, COP, GOR, EUF, cost of produced water, and cost of cooling effect. It is noteworthy that the input parameters of Table 2 (as described above) are considered for all results unless otherwise mentioned. Herein, the VAR unit 100A acts as a refrigerator to produce a cooling effect and as a heat pump to produce a heating effect used for driving the DCMD unit 100B. In such a case, the useful energy is maximized.

Figure 5A:
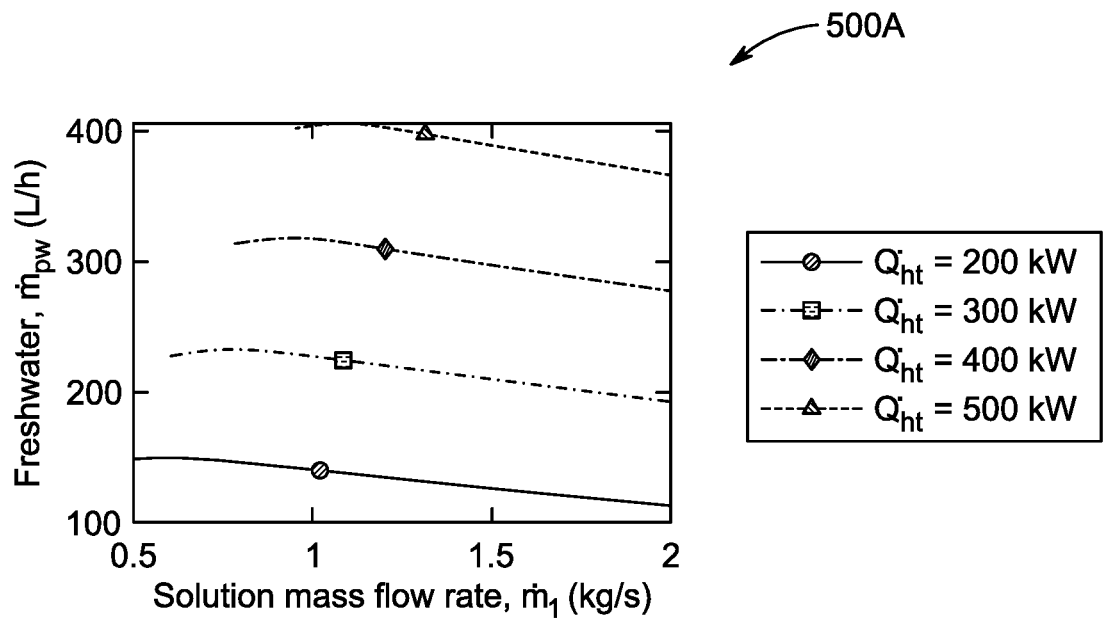
FIG. 5A is an exemplary graph depicting the effect of mass flow rate of absorption solution and input heat on the performance of the desalination system for hourly produced freshwater, according to certain embodiments.
Figure 5B:
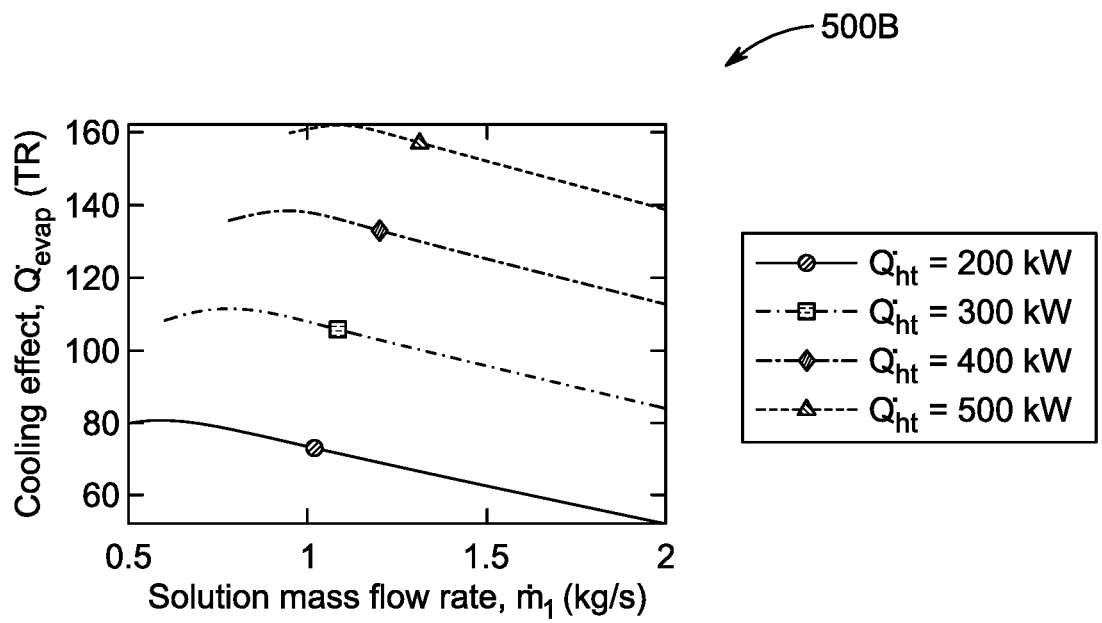
FIG. 5B is an exemplary graph depicting the effect of mass flow rate of absorption solution and input heat on the performance of the desalination system for cooling capacity, according to certain embodiments.
Figure 5C:
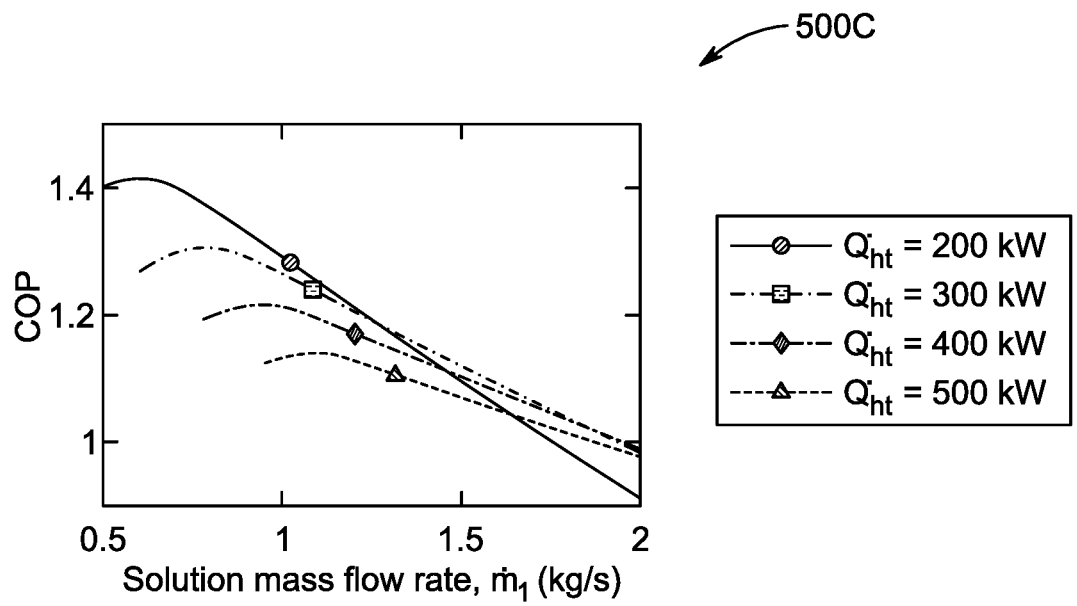
FIG. 5C is an exemplary graph depicting the effect of mass flow rate of absorption solution and input heat on the performance of the desalination system for coefficient of performance (COP), according to certain embodiments.
Figure 5D:
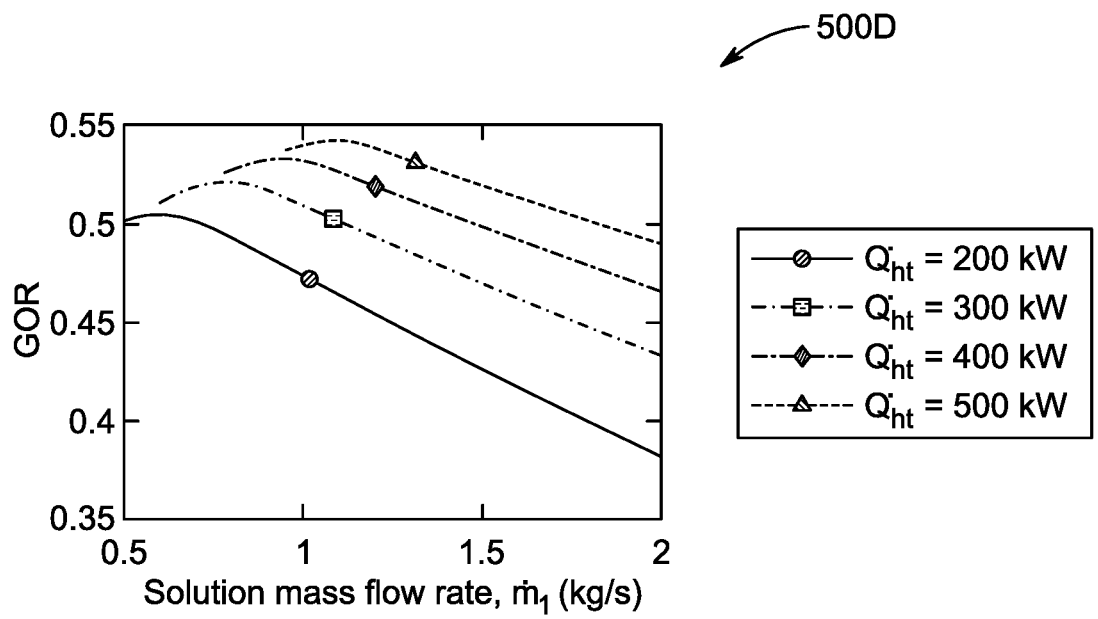
FIG. 5D is an exemplary graph depicting the effect of mass flow rate of absorption solution and input heat on the performance of the desalination system for gained output ratio (GOR), according to certain embodiments.
Figure 5E:
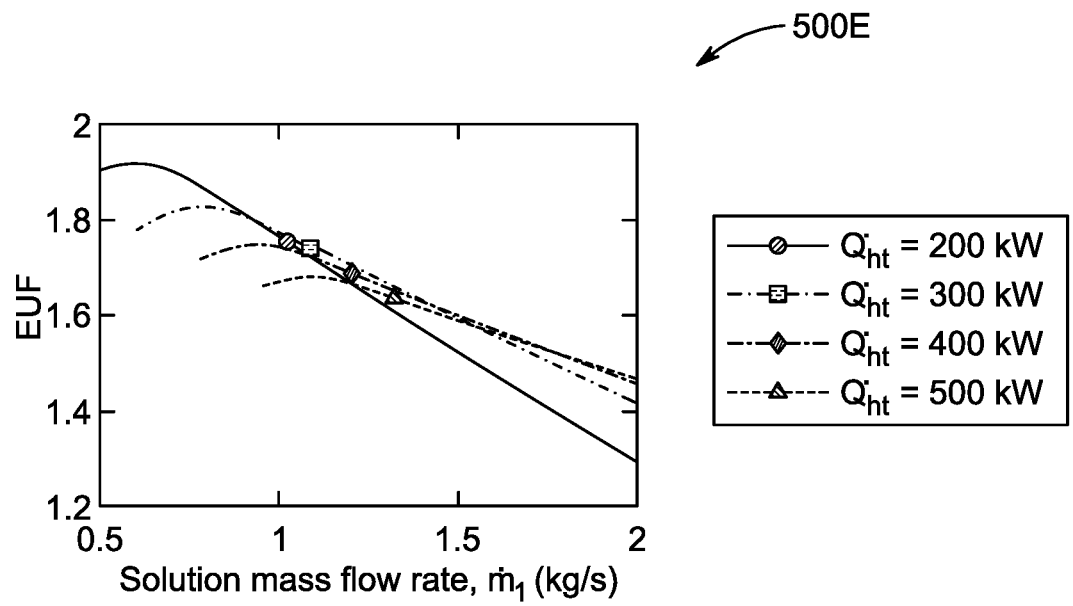
FIG. 5E is an exemplary graph depicting the effect of mass flow rate of absorption solution and input heat on the performance of the desalination system for energy utilization factor (EUF), according to certain embodiments.
Figure 5F:
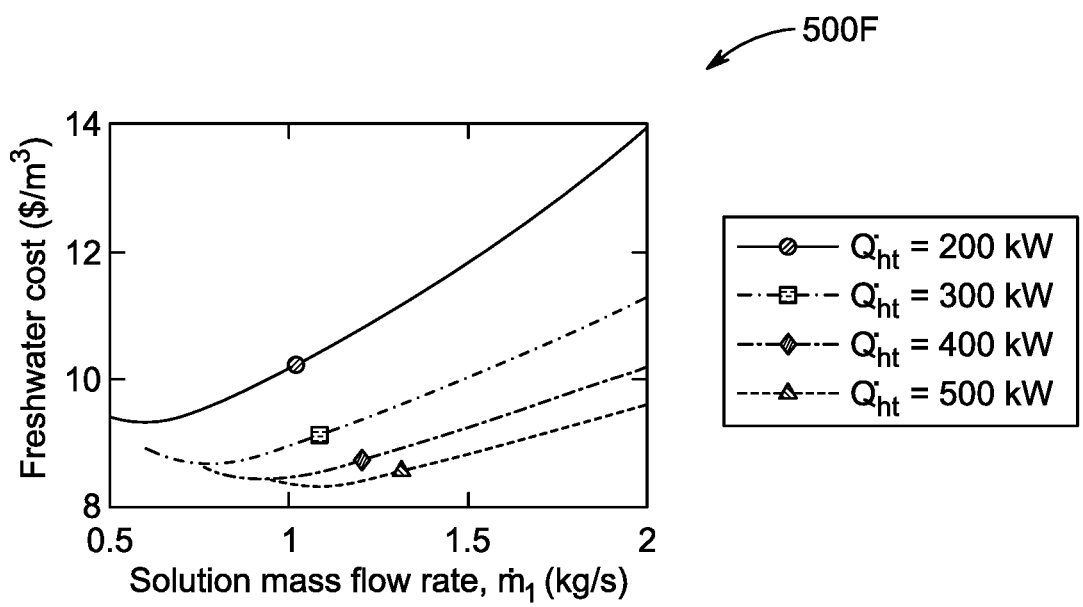
FIG. 5F is an exemplary graph depicting the effect of mass flow rate of absorption solution and input heat on the performance of the desalination system for freshwater cost, according to certain embodiments.
Figure 5G:
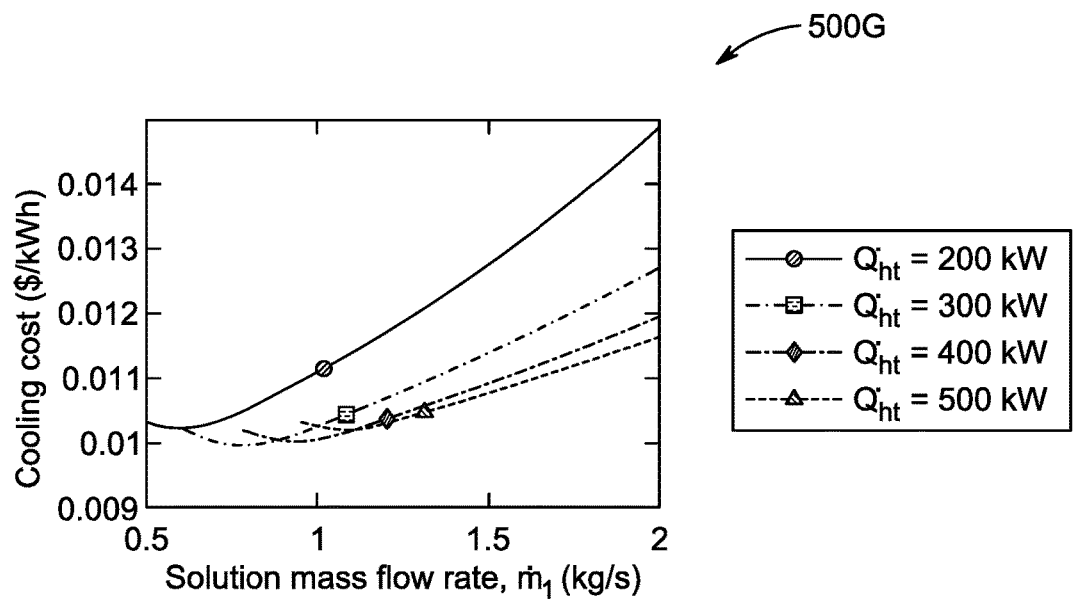
FIG. 5G is an exemplary graph depicting the effect of mass flow rate of absorption solution and input heat on the performance of the desalination system for cooling cost, according to certain embodiments.

Referring to FIGS. 5A-5G, the effects of mass flow rate of absorption solution and input heat on the performance of the desalination system 100 are graphically depicted. In particular, FIG. 5A is an exemplary graph 500A depicting the effect of mass flow rate of absorption solution and input heat on the performance of the desalination system 100 for hourly produced freshwater. FIG. 5B is an exemplary graph 500B depicting the effect of mass flow rate of absorption solution and input heat on the performance of the desalination system 100 for cooling capacity. FIG. 5C is an exemplary graph 500C depicting the effect of mass flow rate of absorption solution and input heat on the performance of the desalination system 100 for coefficient of performance (COP). FIG. 5D is an exemplary graph 500D depicting the effect of mass flow rate of absorption solution and input heat on the performance of the desalination system 100 for gained output ratio (GOR). FIG. 5E is an exemplary graph 500E depicting the effect of mass flow rate of absorption solution and input heat on the performance of the desalination system 100 for energy utilization factor (EUF). FIG. 5F is an exemplary graph 500F depicting the effect of mass flow rate of absorption solution and input heat on the performance of the desalination system 100 for freshwater cost. FIG. 5G is an exemplary graph 500G depicting the effect of mass flow rate of absorption solution and input heat on the performance of the desalination system 100 for cooling cost. Herein, the system driving power is investigated against the absorption mass flow rate ($\dot{m}_1$) because high input heat values and low amounts of absorption solution could lead to a high concentration of the strong solution that violates the solution liquidity. The performance results for different power values (200, 300, 400, and 500 kW) are shown. Increasing the input power is preferred to enhance DCMD production and performance. For example, at 500 kW, the maximum water production, GOR, and water cost reach 406.1 L/h, 0.543, and 8.315 $/m³, respectively, whereas, at 400 kW, those values are 318 L/h, 0.534, and 8.419 $/m³, respectively. The increment in VAR solution mass flow rate and decrease in the input power reduce the performance of the DCMD unit 100B due to minimizing the solution heating process in the desorbers 108, 110 and then minimizing the water vapor that participates in driving the DCMD unit 100B. Further, the cooling capacity is also higher for higher input power (the maximum value is 162.4 TR (571.14 kW) at a power input of 500 kW). However, the COP (as seen from the graph 500C) is sensitive to the VAR solution flow rate, and the best values are recorded for the lowest power input. That is because more power input results in a more cooling effect but with inflated energy consumption; therefore, the low energy input produces an efficient cooling effect even with lower values. Also, increasing the amount of solution flow rate decreases performance of the VAR unit 100A due to minimizing the solution heating process inside the desorbers 108, 110. The minimum values of cooling costs are observed for 300 and 400 kW input power by about 0.01 $/kWh. The EUF values (as seen from the graph 500E) account for performance of the integrated system 100 (with both the VAR 100A and the DCMD unit 100B). Herein, EUF recommends the low input heating values due to a significant improvement in the performance of the VAR unit 100A. In addition, the graphs 500A-500G provide an optimal value for the solution mass flow rate. It may be noted that higher heating values support the water production system while lower values stand with the cooling system. When water production is important, it may be suggested to have a power of 400 kW to achieve high water production with an excellent cooling effect. For instance, at 400 kW input power and $\dot{m}_1$ of 0.98 (optimal), water production, cooling effect, COP, GOR, EUF, water cost, cooling cost are 318.5 L/h, 138.6 TR, 1.218, 0.534, 1.75, 8.419 $/m³, and 0.01 $/kWh, respectively.

Figure 6A:
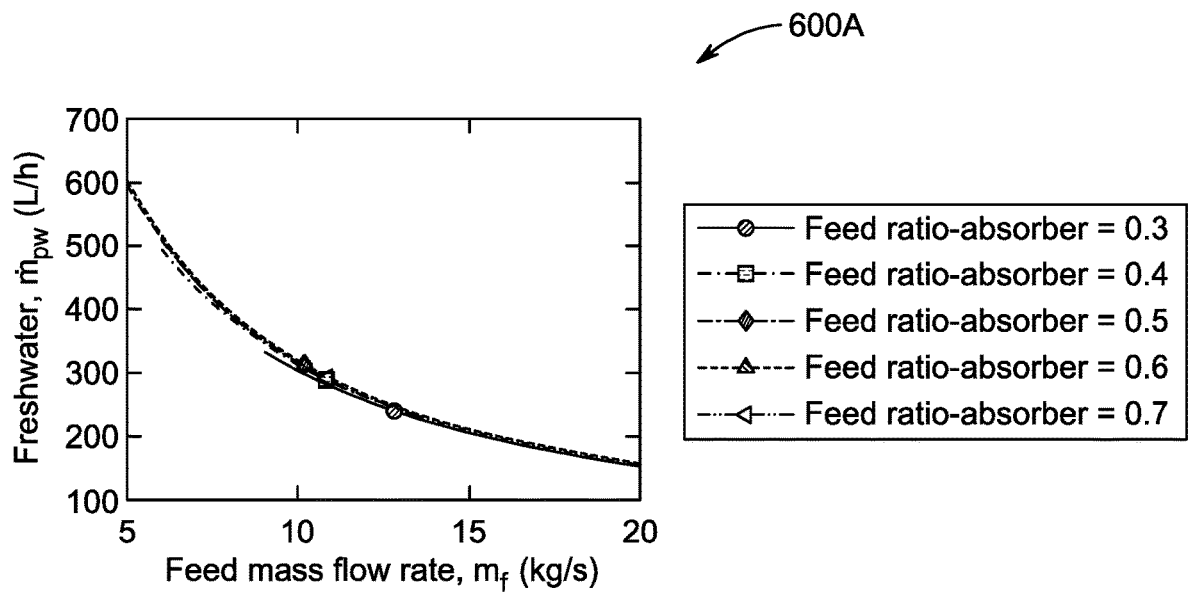
FIG. 6A is an exemplary graph depicting the effect of mass flow rate of saltwater feed stream and its ratio that goes to absorber on the performance of the desalination system for hourly produced freshwater, according to certain embodiments.
Figure 6B:
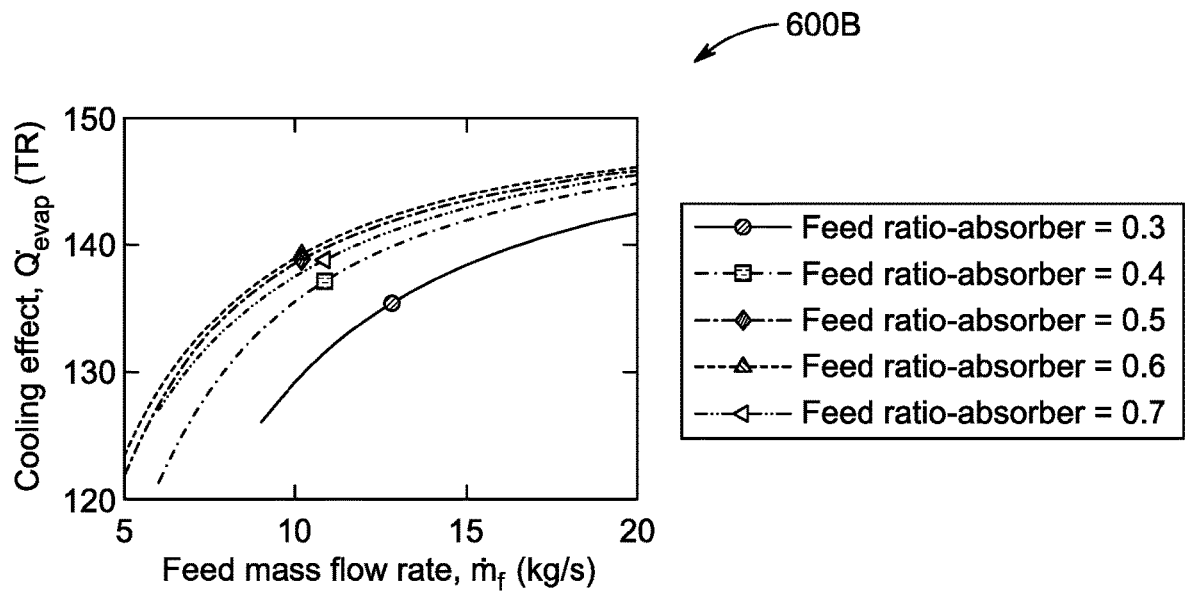
FIG. 6B is an exemplary graph depicting the effect of mass flow rate of saltwater feed stream and its ratio that goes to absorber on the performance of the desalination system for cooling capacity, according to certain embodiments.
Figure 6C:
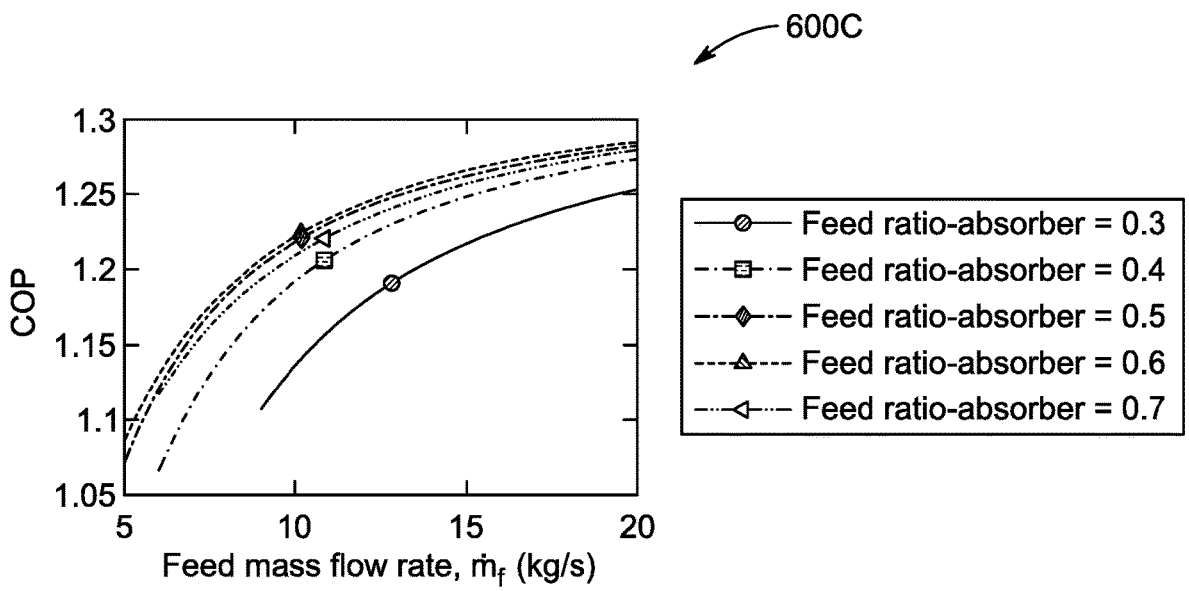
FIG. 6C is an exemplary graph depicting the effect of mass flow rate of saltwater feed stream and its ratio that goes to absorber on the performance of the desalination system for coefficient of performance (COP), according to certain embodiments.
Figure 6D:
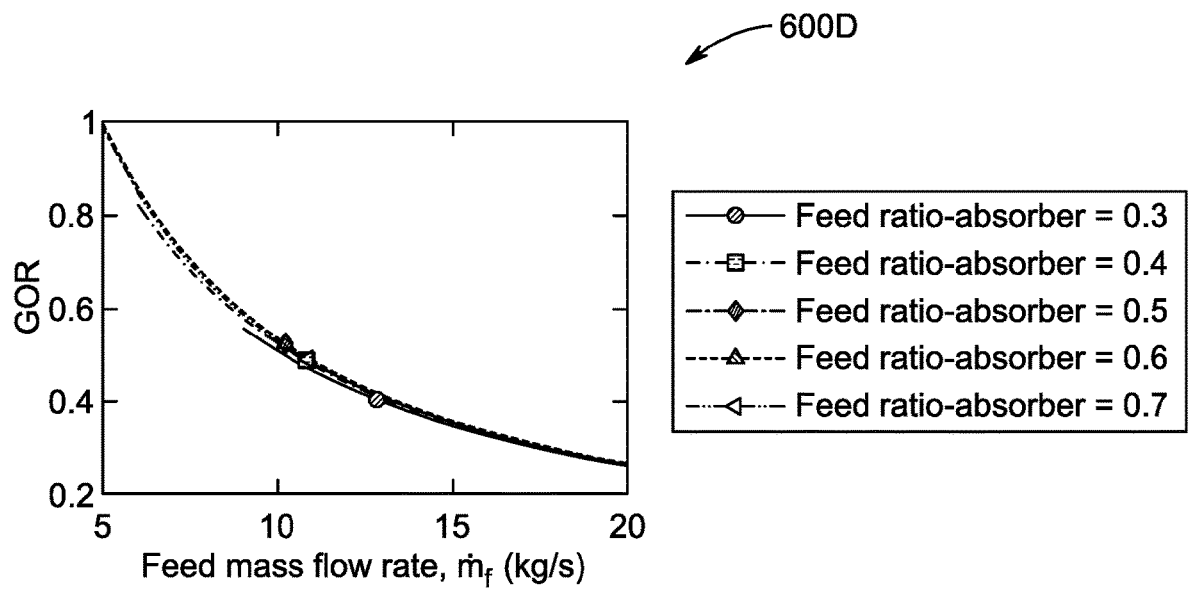
FIG. 6D is an exemplary graph depicting the effect of mass flow rate of saltwater feed stream and its ratio that goes to absorber on the performance of the desalination system for gained output ratio (GOR), according to certain embodiments.
Figure 6E:
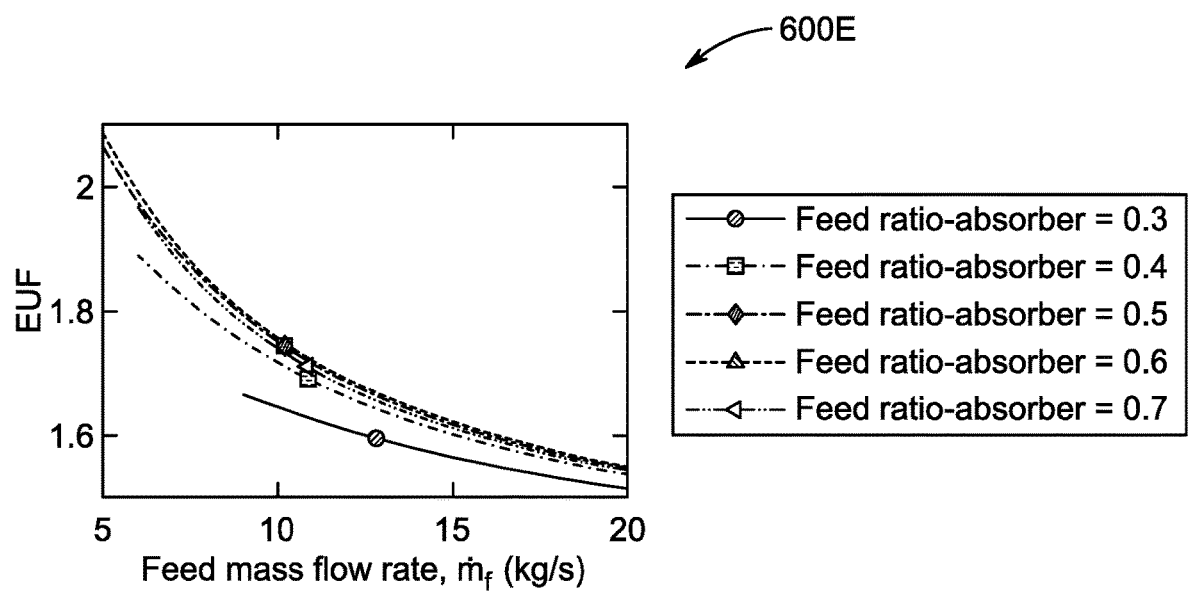
FIG. 6E is an exemplary graph depicting the effect of mass flow rate of saltwater feed stream and its ratio that goes to absorber on the performance of the desalination system for energy utilization factor (EUF), according to certain embodiments.
Figure 6F:
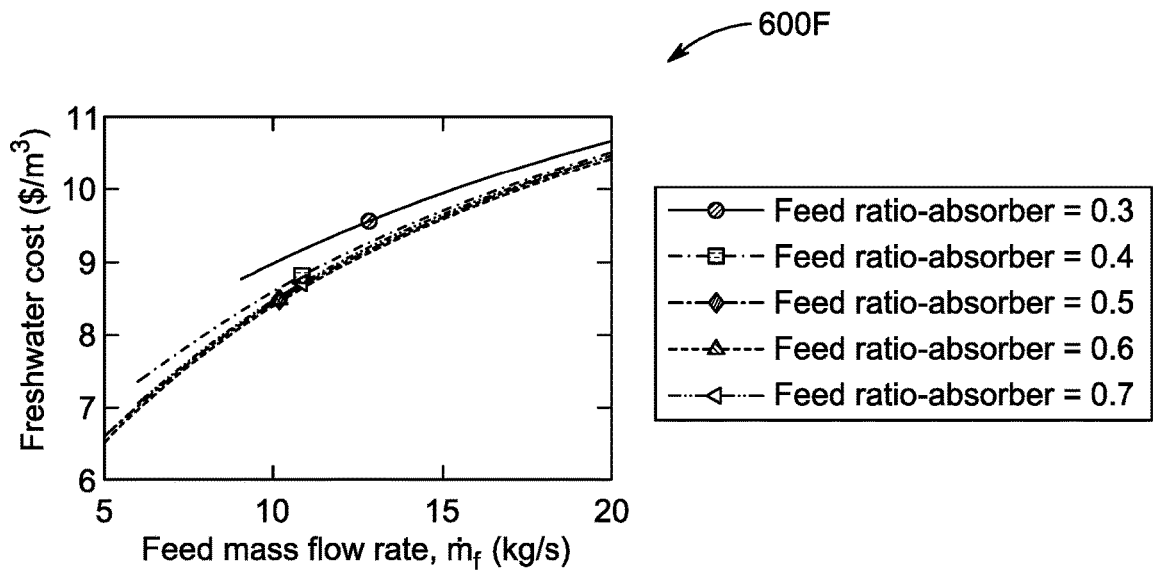
FIG. 6F is an exemplary graph depicting the effect of mass flow rate of saltwater feed stream and its ratio that goes to absorber on the performance of the desalination system for freshwater cost, according to certain embodiments.
Figure 6G:
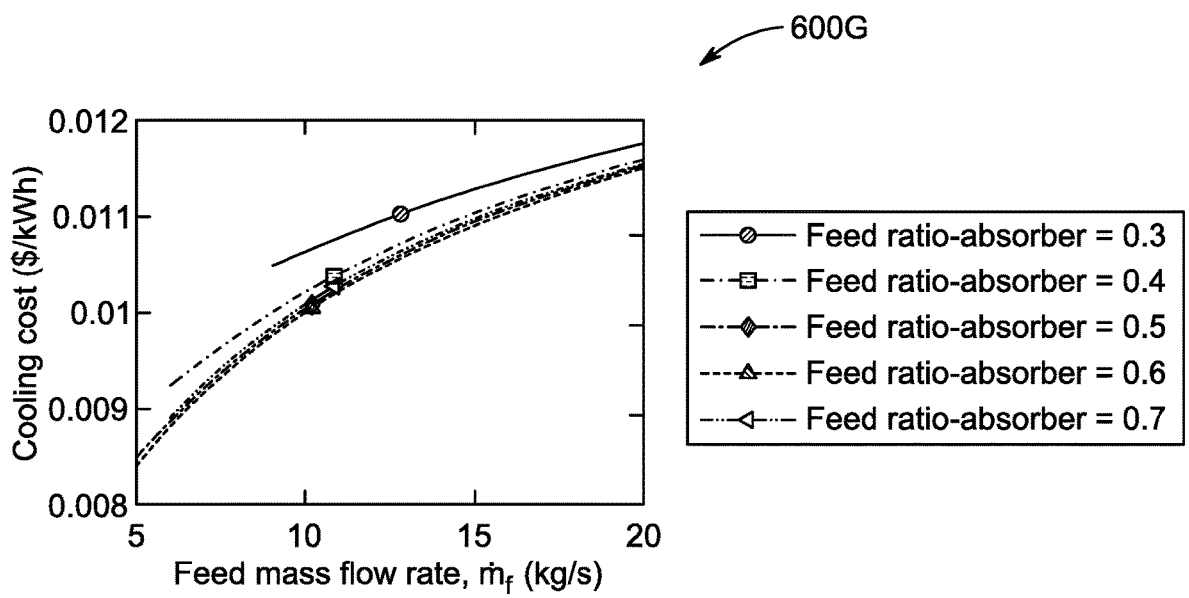
FIG. 6G is an exemplary graph depicting the effect of mass flow rate of saltwater feed stream and its ratio that goes to absorber on the performance of the desalination system for cooling cost, according to certain embodiments.

Referring to FIGS. 6A-6G, the effects of mass flow rate of saltwater feed stream and its ratio that goes to the absorber 104 on the performance of the desalination system 100 are graphically depicted. In particular, FIG. 6A is an exemplary graph 600A depicting the effect of mass flow rate of saltwater feed stream and its ratio that goes to the absorber 104 on the performance of the desalination system 100 for hourly produced freshwater. FIG. 6B is an exemplary graph 600B depicting the effect of mass flow rate of saltwater feed stream and its ratio that goes to the absorber 104 on the performance of the desalination system 100 for cooling capacity. FIG. 6C is an exemplary graph 600C depicting the effect of mass flow rate of saltwater feed stream and its ratio that goes to the absorber 104 on the performance of the desalination system 100 for coefficient of performance (COP). FIG. 6D is an exemplary graph 600D depicting the effect of mass flow rate of saltwater feed stream and its ratio that goes to the absorber 104 on the performance of the desalination system 100 for gained output ratio (GOR). FIG. 6E is an exemplary graph 600E depicting the effect of mass flow rate of saltwater feed stream and its ratio that goes to the absorber 104 on the performance of the desalination system 100 for energy utilization factor (EUF). FIG. 6F is an exemplary graph 600F depicting the effect of mass flow rate of saltwater feed stream and its ratio that goes to the absorber 104 on the performance of the desalination system 100 for freshwater cost. FIG. 6G is an exemplary graph 600G depicting the effect of mass flow rate of saltwater feed stream and its ratio that goes to the absorber 104 on the performance of the desalination system 100 for cooling cost. Herein, since the feed mass flow rate of the DCMD unit 100B is split to cool the condenser 102 and the absorber 104 of the VAR unit 100A, it is essential to figure out the feed flow rate that results in a good performance. The feed mass flow rate (total, $\dot{m}_f=\dot{m}_{w1}$) is investigated first against the feed water ratio that goes to the absorber 104 and second against the channel thickness at $\overline{m}_1$=0.98 kg/s and $\dot{Q}_{hw}$=400 kW. The graphs 600A-600G depicts the impact of the total feed mass flow rate that is heated by the absorber 104 and the condenser 102 of the VAR unit 100A and then emerges again to drive the DCMD unit 100B on the performance of the desalination system 100 at different ratios of the amounts part devoted for cooling the absorber 104. First, for all performance indices, the performance improvement is attained by increasing the feed water absorber portion up to 60%, and then the performance decreases, providing that the amount of heat in the absorber 104 is higher than the condenser 102, so the absorber 104 needs more cooling water. For that reason, when more than 60% of total feed water is used to cool the absorber 104, it shows good performance for the integrated system 100, but the optimal values take place at 60%. Further, the low values of total feed mass flow rates result in the optimal performance indicators, except for the cooling effect and COP (as shown in the graphs 600B and 600C, respectively, owing to the increase in the water temperature that goes to drive the DCMD unit 100B. The cooling effect declines for low total feed mass flow rates because of minimizing the cooling process of the VAR unit 100A, and so for COP. The graph 600E shows a significant improvement in the EUF performance of the integrated system 100 for low values of feed mass flow rate, suggesting that the optimal values are associated with $\dot{m}_f$=5 kg/s. For instance, at $\dot{m}_f$ of 5 kg/s with 60% of it going to absorber 104, the performance of the integrated system 100 is 604.7 L/h, 123.4 TR, 1.09 COP, 1.01 GOR, 2.09 EUF, 6.51 $/m³ water cost, and 0.0084 $/kW cooling cost.

Figure 7A:
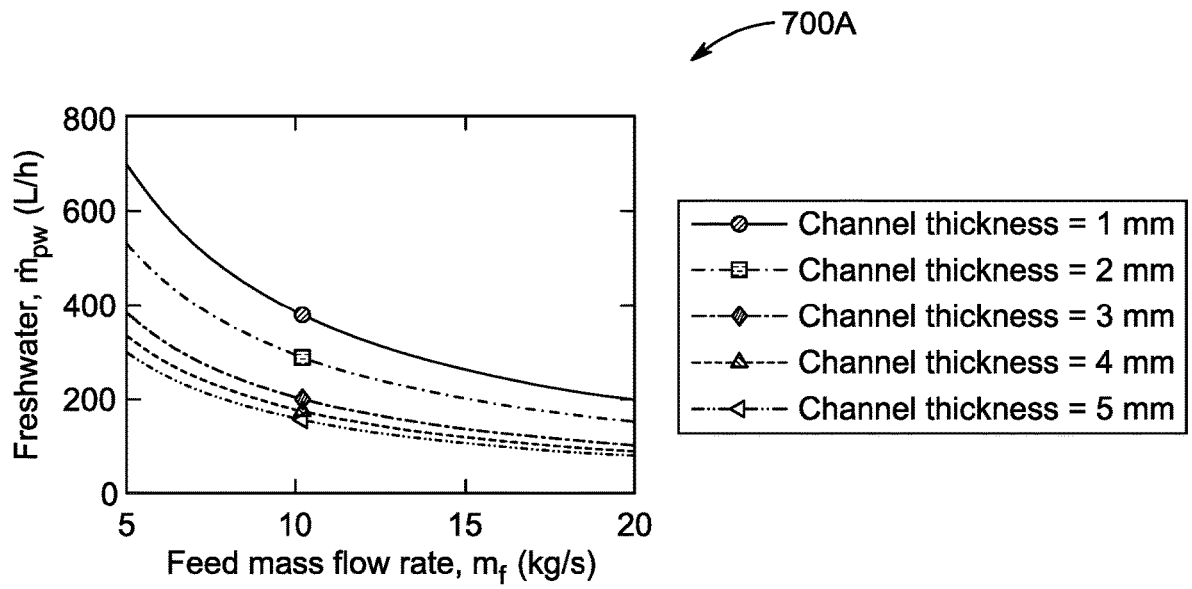
FIG. 7A is an exemplary graph depicting the effect of mass flow rate of saltwater feed stream and channel thickness of the DCMD unit on the performance of the desalination system for hourly produced freshwater, according to certain embodiments.
Figure 7B:
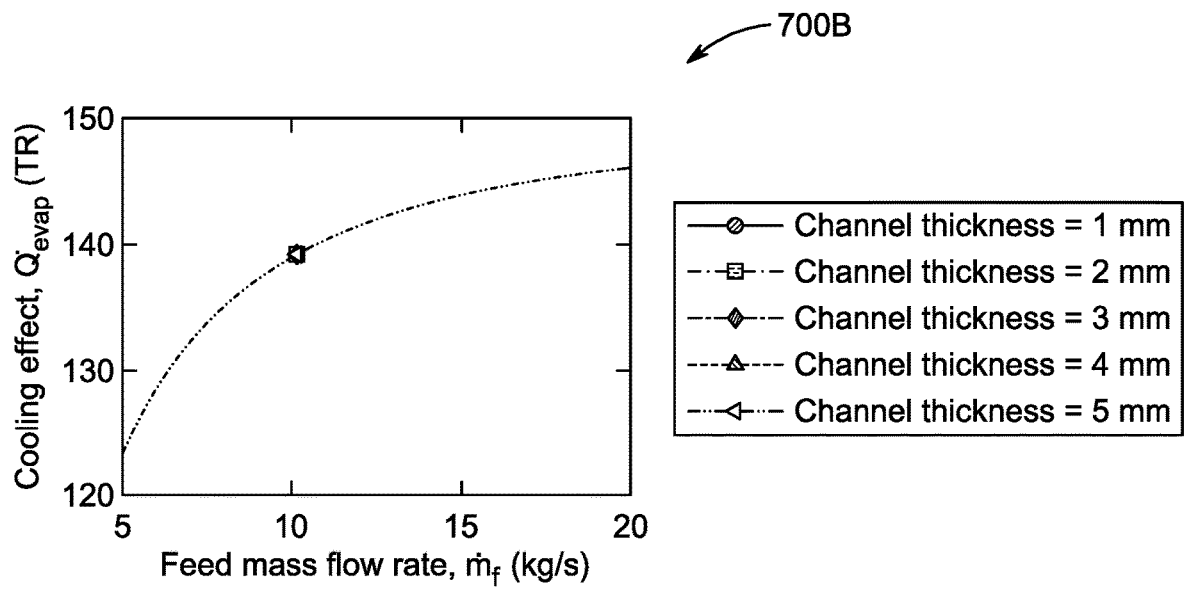
FIG. 7B is an exemplary graph depicting the effect of mass flow rate of saltwater feed stream and channel thickness of the DCMD unit on the performance of the desalination system for cooling capacity, according to certain embodiments.
Figure 7C:
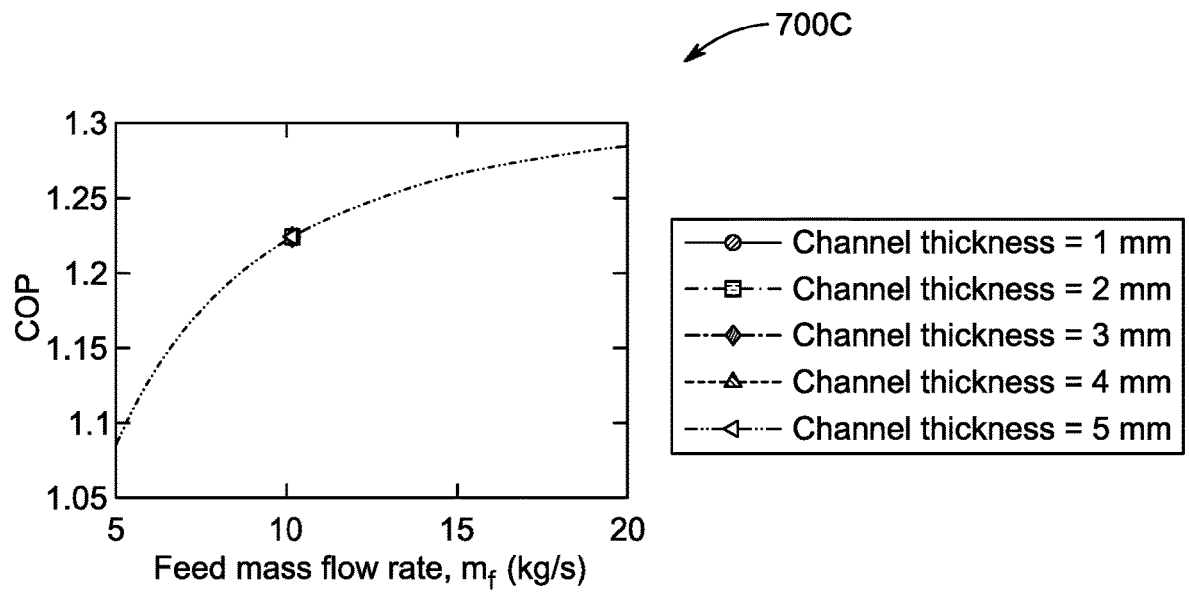
FIG. 7C is an exemplary graph depicting the effect of mass flow rate of saltwater feed stream and channel thickness of the DCMD unit on the performance of the desalination system for coefficient of performance (COP), according to certain embodiments.
Figure 7D:
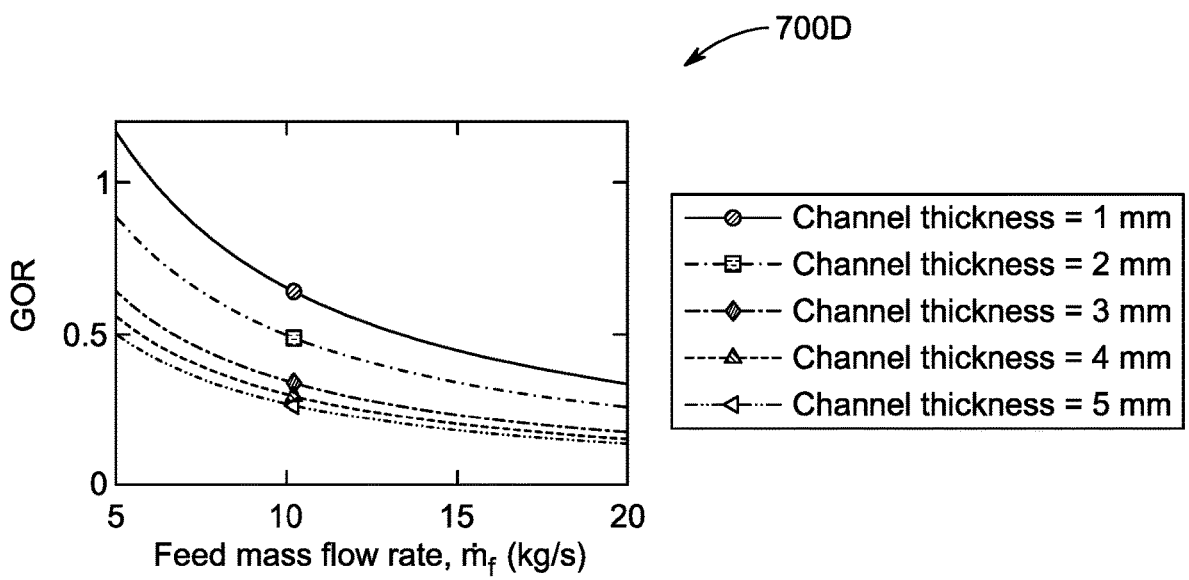
FIG. 7D is an exemplary graph depicting the effect of mass flow rate of saltwater feed stream and channel thickness of the DCMD unit on the performance of the desalination system for gained output ratio (GOR), according to certain embodiments.
Figure 7E:
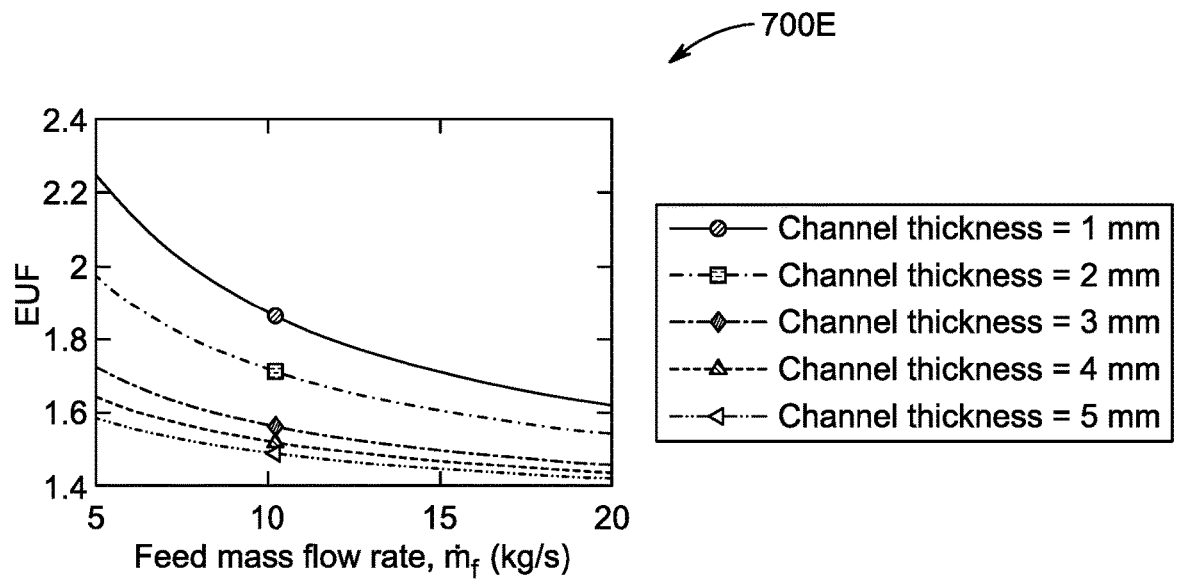
FIG. 7E is an exemplary graph depicting the effect of mass flow rate of saltwater feed stream and channel thickness of the DCMD unit on the performance of the desalination system for energy utilization factor (EUF), according to certain embodiments.
Figure 7F:
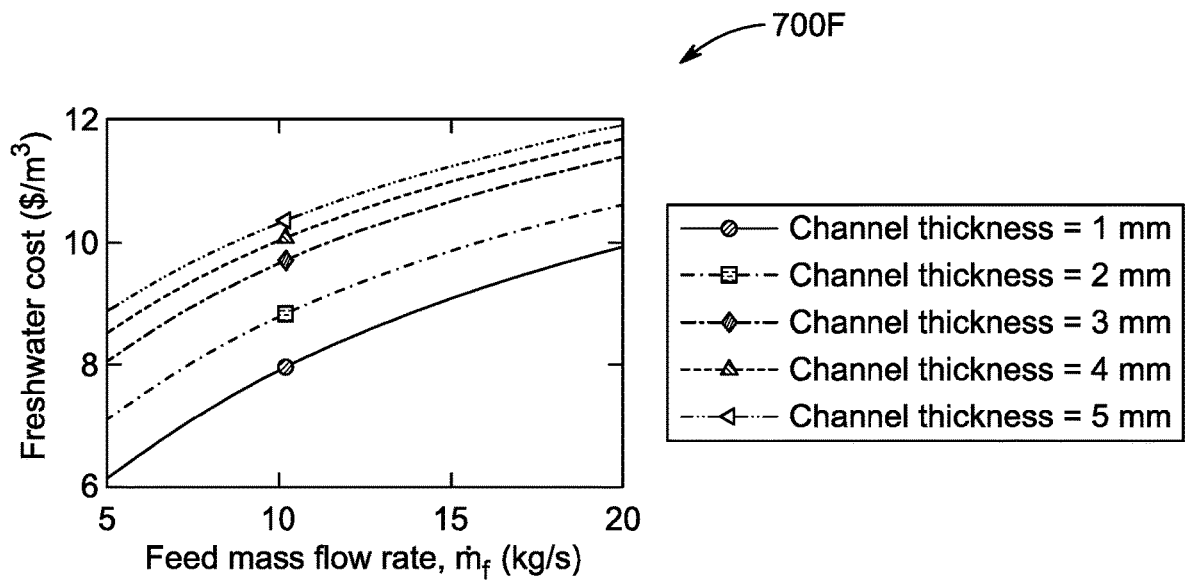
FIG. 7F is an exemplary graph depicting the effect of mass flow rate of saltwater feed stream and channel thickness of the DCMD unit on the performance of the desalination system for freshwater cost, according to certain embodiments.
Figure 7G:
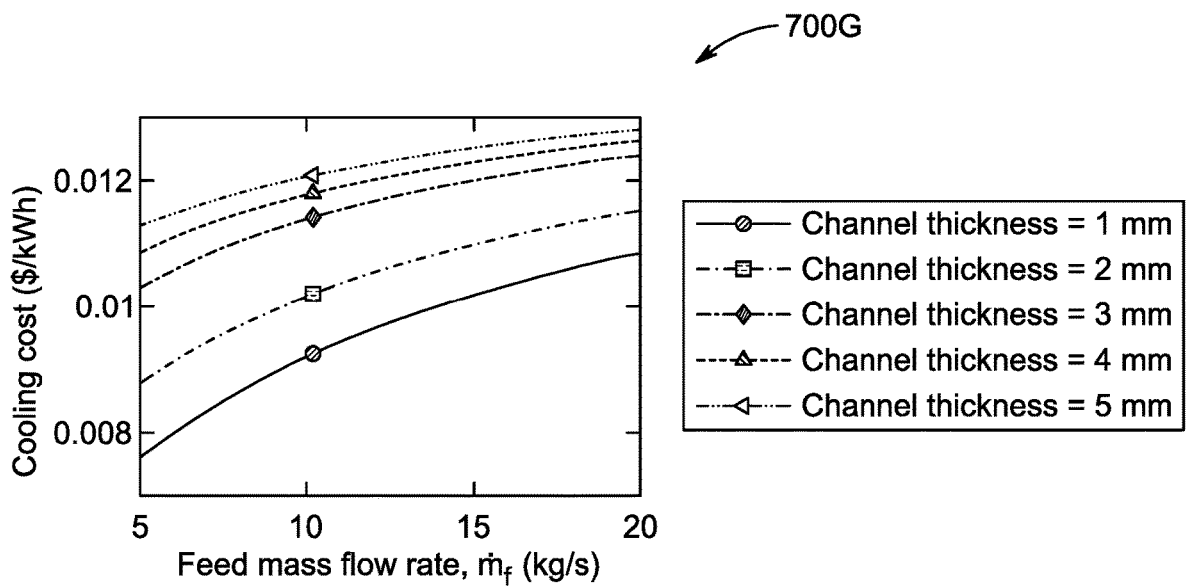
FIG. 7G is an exemplary graph depicting the effect of mass flow rate of saltwater feed stream and channel thickness of the DCMD unit on the performance of the desalination system for cooling cost, according to certain embodiments.

Referring to FIGS. 7A-7G, the effects of mass flow rate of saltwater feed stream and channel thickness of the DCMD unit 100B on the performance of the desalination system 100 are graphically depicted. In particular, FIG. 7A is an exemplary graph 700A depicting the effect of mass flow rate of saltwater feed stream and channel thickness of the DCMD unit 100B on the performance of the desalination system 100 for hourly produced freshwater. FIG. 7B is an exemplary graph 700B depicting the effect of mass flow rate of saltwater feed stream and channel thickness of the DCMD unit 100B on the performance of the desalination system 100 for cooling capacity. FIG. 7C is an exemplary graph 700C depicting the effect of mass flow rate of saltwater feed stream and channel thickness of the DCMD unit 100B on the performance of the desalination system 100 for coefficient of performance (COP). FIG. 7D is an exemplary graph 700D depicting the effect of mass flow rate of saltwater feed stream and channel thickness of the DCMD unit 100B on the performance of the desalination system 100 for gained output ratio (GOR). FIG. 7E is an exemplary graph 700E depicting the effect of mass flow rate of saltwater feed stream and channel thickness of the DCMD unit 100B on the performance of the desalination system 100 for energy utilization factor (EUF). FIG. 7F is an exemplary graph 700F depicting the effect of mass flow rate of saltwater feed stream and channel thickness of the DCMD unit 100B on the performance of the desalination system 100 for freshwater cost. FIG. 7G is an exemplary graph 700G depicting the effect of mass flow rate of saltwater feed stream and channel thickness of the DCMD unit 100B on the performance of the desalination system 100 for cooling cost. Herein, the absorber portion of the feed water (~60%) is investigated to figure out the effect of channel thickness (distance between membranes) on the performance of the desalination system 100. As may be seen from the graphs 700A-700G, increasing the channel thickness from 1 to 5 mm results in an exponential drop in the performance of the system 100, excluding the cooling effect and COP, due to reducing the flow velocity, decreasing the heat transfer from hot to cold stream, and increasing the concentration polarization closer to the membranes 156. The cooling effect and COP do not change because the thickness effect comes after the cooling processes of the condenser 102 and the absorber 104 and away from the VAR unit 100A. It may be noted that a thickness of 1 mm for the membranes 156 of the DCMD unit 100B has been used and recommended in the literature [See: Wang et al. and Swaminathan J, Chung H W, Warsinger D M, Lienhard V J H. Energy efficiency of membrane distillation up to high salinity: Evaluating critical system size and optimal membrane thickness. Appl Energy 2018; 211:715-34, incorporated herein by reference in their entirety].

Figure 8A:
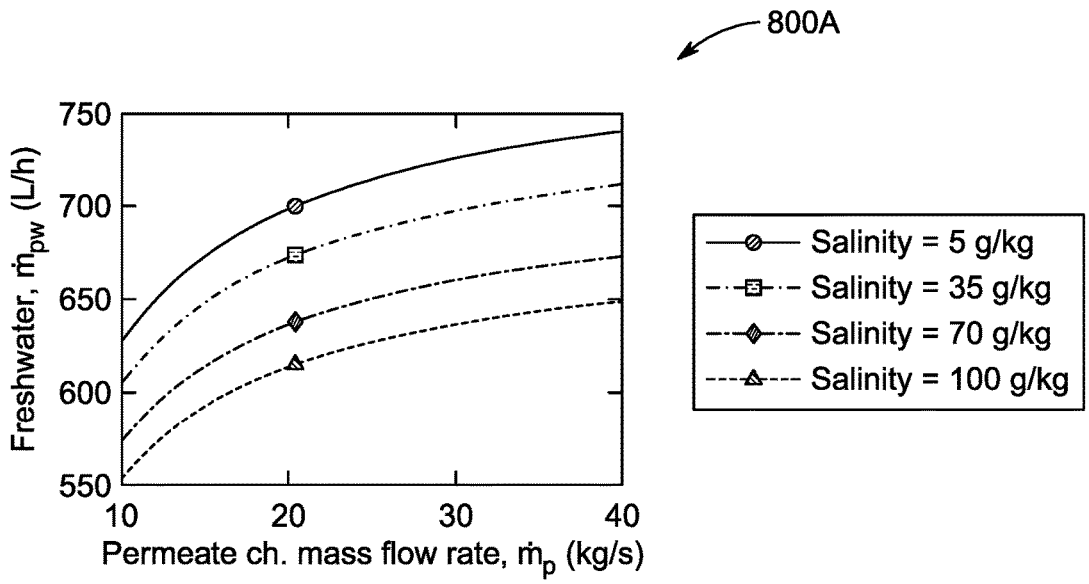
FIG. 8A is an exemplary graph depicting the effect of channel mass flow rate in the DCMD unit and salinity of saltwater feed stream on the performance of the desalination system for hourly produced freshwater, according to certain embodiments.
Figure 8B:
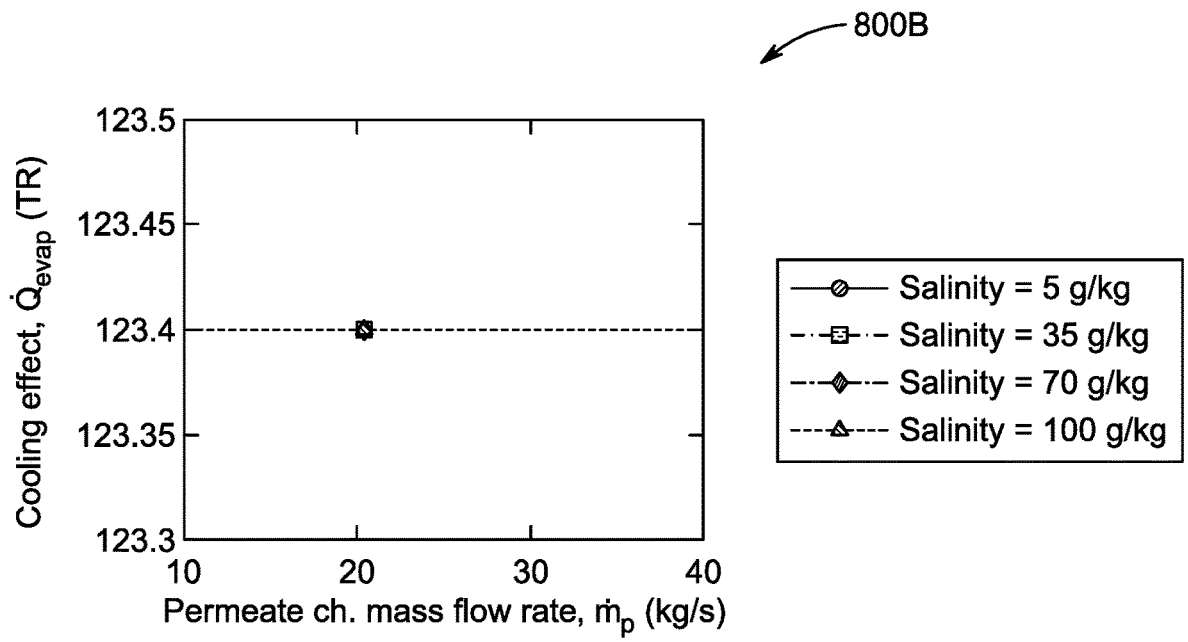
FIG. 8B is an exemplary graph depicting the effect of channel mass flow rate in the DCMD unit and salinity of saltwater feed stream on the performance of the desalination system for cooling capacity, according to certain embodiments.
Figure 8C:
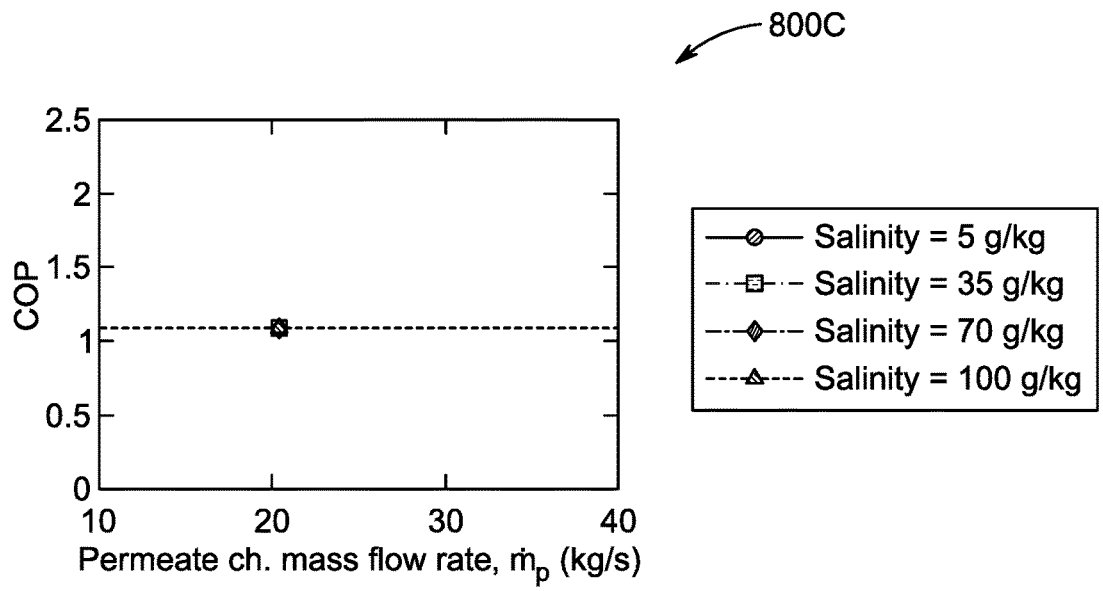
FIG. 8C is an exemplary graph depicting the effect of channel mass flow rate in the DCMD unit and salinity of saltwater feed stream on the performance of the desalination system for coefficient of performance (COP), according to certain embodiments.
Figure 8D:
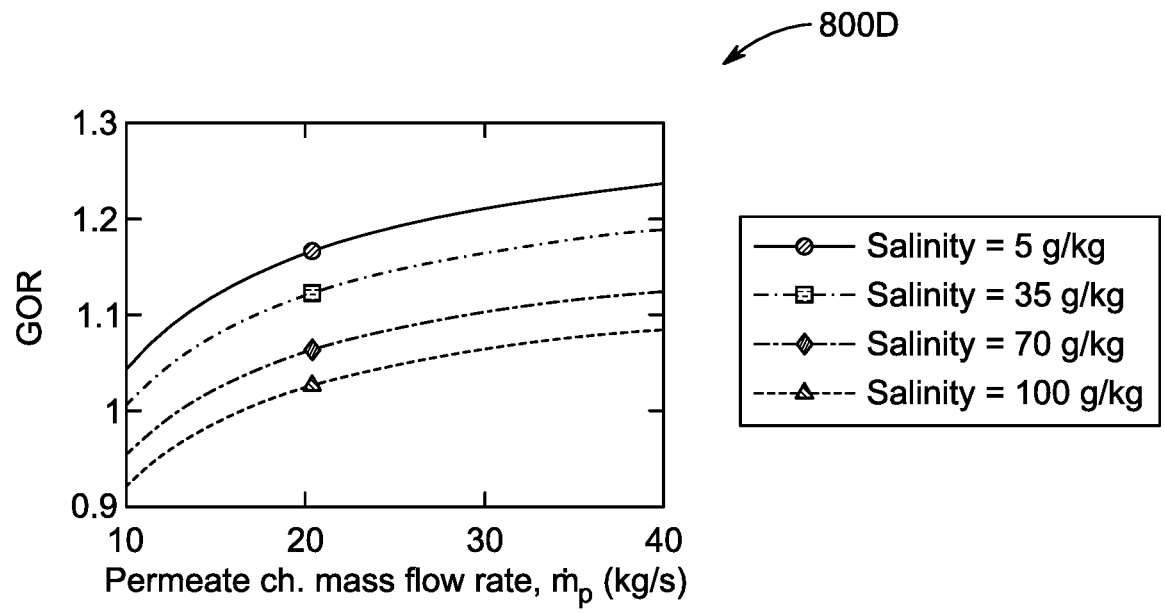
FIG. 8D is an exemplary graph depicting the effect of channel mass flow rate in the DCMD unit and salinity of saltwater feed stream on the performance of the desalination system for gained output ratio (GOR), according to certain embodiments.
Figure 8E:
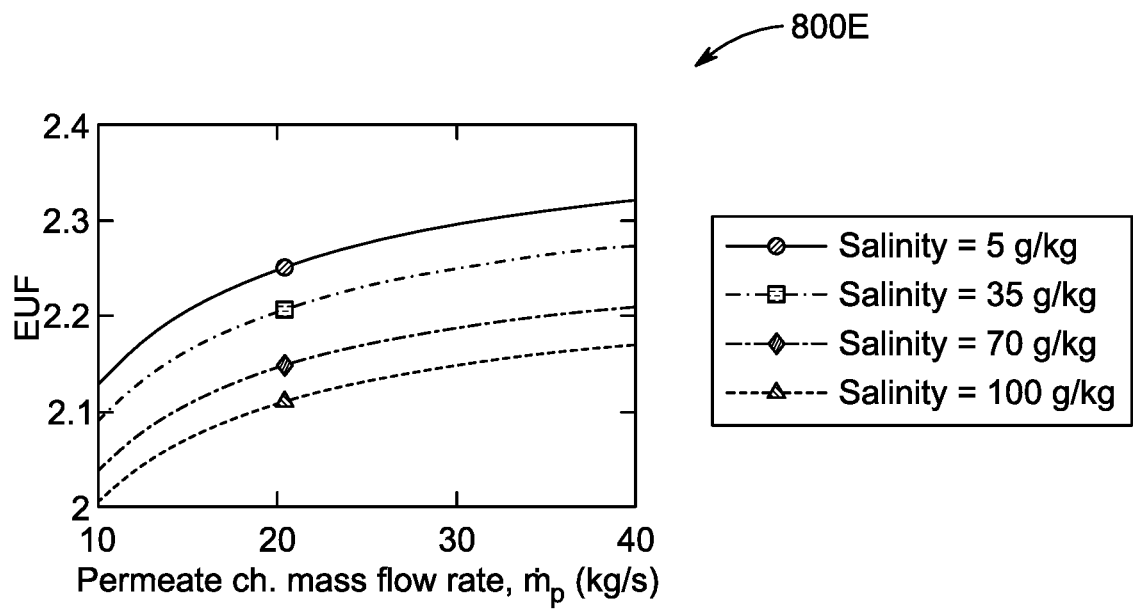
FIG. 8E is an exemplary graph depicting the effect of channel mass flow rate in the DCMD unit and salinity of saltwater feed stream on the performance of the desalination system for energy utilization factor (EUF), according to certain embodiments.
Figure 8F:
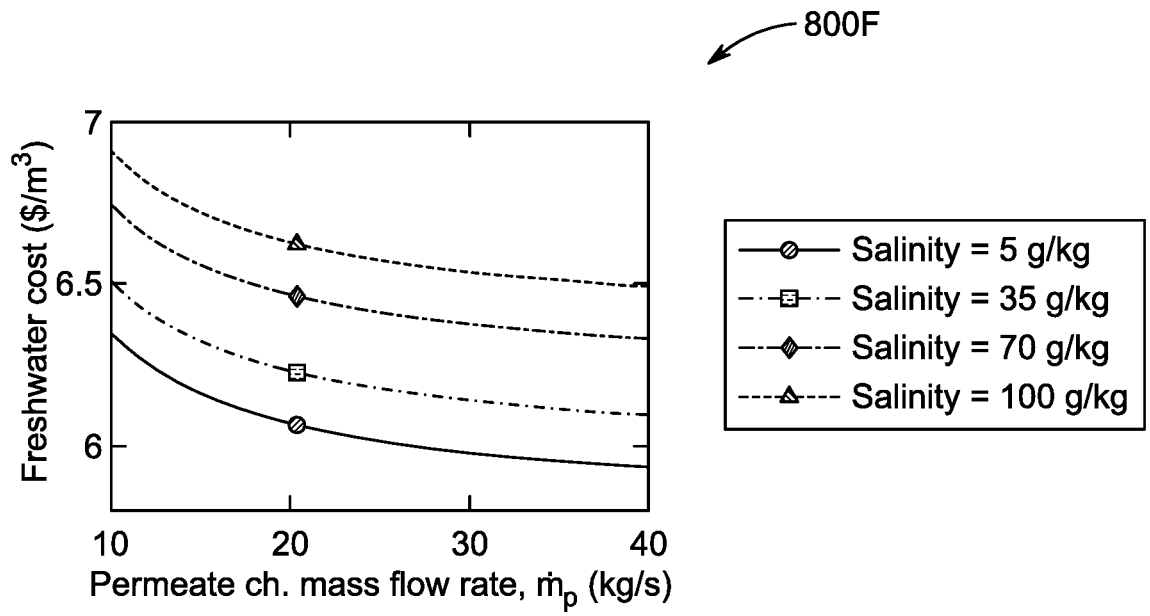
FIG. 8F is an exemplary graph depicting the effect of channel mass flow rate in the DCMD unit and salinity of saltwater feed stream on the performance of the desalination system for freshwater cost, according to certain embodiments.
Figure 8G:
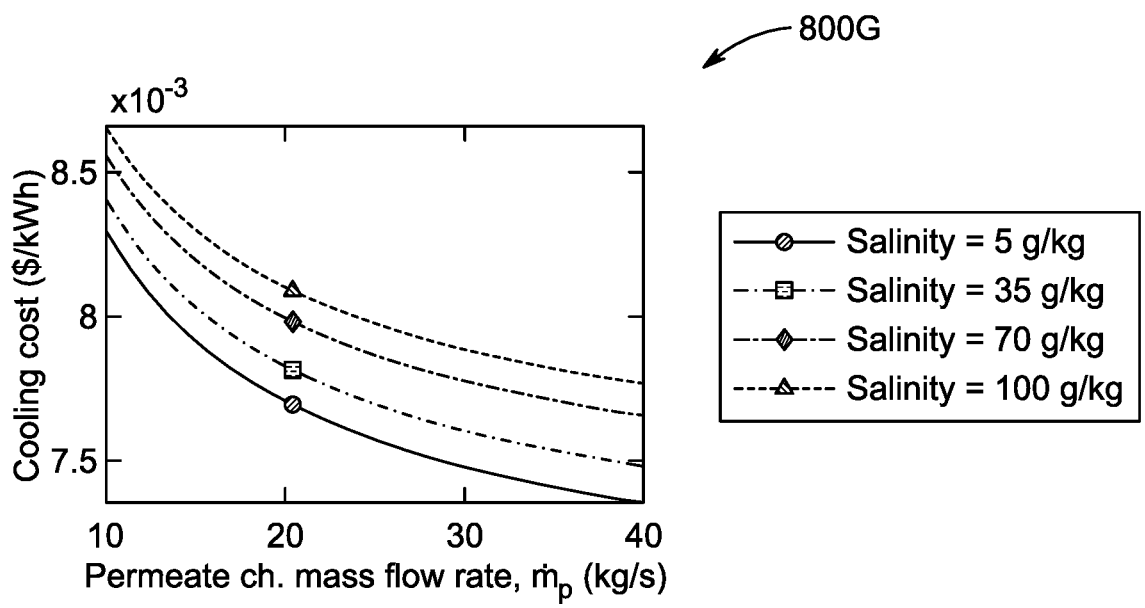
FIG. 8G is an exemplary graph depicting the effect of channel mass flow rate in the DCMD unit and salinity of saltwater feed stream on the performance of the desalination system for cooling cost, according to certain embodiments.

Referring to FIGS. 8A-8G, the effects of channel mass flow rate in the DCMD unit 100B and salinity of saltwater feed stream on the performance of the desalination system 100 are graphically depicted. In particular, FIG. 8A is an exemplary graph 800A depicting the effect of channel mass flow rate in the DCMD unit 100B and salinity of saltwater feed stream on the performance of the desalination system 100 for hourly produced freshwater. FIG. 8B is an exemplary graph 800B depicting the effect of channel mass flow rate in the DCMD unit 100B and salinity of saltwater feed stream on the performance of the desalination system 100 for cooling capacity. FIG. 8C is an exemplary graph 800C depicting the effect of channel mass flow rate in the DCMD unit 100B and salinity of saltwater feed stream on the performance of the desalination system 100 for coefficient of performance (COP). FIG. 8D is an exemplary graph 800D depicting the effect of channel mass flow rate in the DCMD unit 100B and salinity of saltwater feed stream on the performance of the desalination system 100 for gained output ratio (GOR). FIG. 8E is an exemplary graph 800E depicting the effect of channel mass flow rate in the DCMD unit 100B and salinity of saltwater feed stream on the performance of the desalination system 100 for energy utilization factor (EUF). FIG. 8F is an exemplary graph 800F depicting the effect of channel mass flow rate in the DCMD unit 100B and salinity of saltwater feed stream on the performance of the desalination system 100 for freshwater cost. FIG. 8G is an exemplary graph 800G depicting the effect of channel mass flow rate in the DCMD unit 100B and salinity of saltwater feed stream on the performance of the desalination system 100 for cooling cost. Herein, different feed salinities are presented to explore the performance of varying saline water sources. Permeate channel stream ($\dot{m}_p$) is the total freshwater that passes in cold channels to cool and condensate the permeate water vapor through the membranes 156. For this purpose, the input data listed in Table 2 is used except for input power, solution mass flow rate, and total feed water amount and its fraction going to the absorber to be those of improved performance (i.e., $\dot{Q}_{ht}$=400 kW, $\dot{m}_1$=0.98 kg/s, and $\dot{m}_f$=5 kg/s and 60%). As may be seen from the graphs 800A-800G, there is enhancement in many performance indices by increasing the mass flow rate of DCMD cooling water due to enhancing the vapor condensation process (for the vapor transports through membranes) and minimizing the rise in the cold water temperature. There is no change in the cooling effect and COP since the cooling process of the DCMD unit 100B is away from the VAR unit 100A. However, it is observed that the cooling cost is substantially reduced with increased $\dot{m}_p$. This is attributed to the increase in the recovered waste energy that drives the DCMD unit 100B (RUD is high, Eq. (84)). To account for this reduction in the cooling cost, $\dot{m}_p$=30 kg/s may be selected as a reasonable amount to improve the performance of the integrated system 100. Notably, enhanced performance indices with lower salinity values are expected in the DCMD separation due to a reduction in the concentration polarization caused by salt presence. Herein, the salinity of the water source is 35 g/kg (i.e., seawater). For seawater used and $\dot{m}_p$=30 kg/s, the performance factors achieve 697.5 L/h for produced water, 123.4 TR for cooling capacity 1.09 for COP, 1.17 for GOR, 2.25 for EUF, 6.14 $/m³ for freshwater cost, and 0.0076 $/kWh for cooling cost.

Figure 9A:
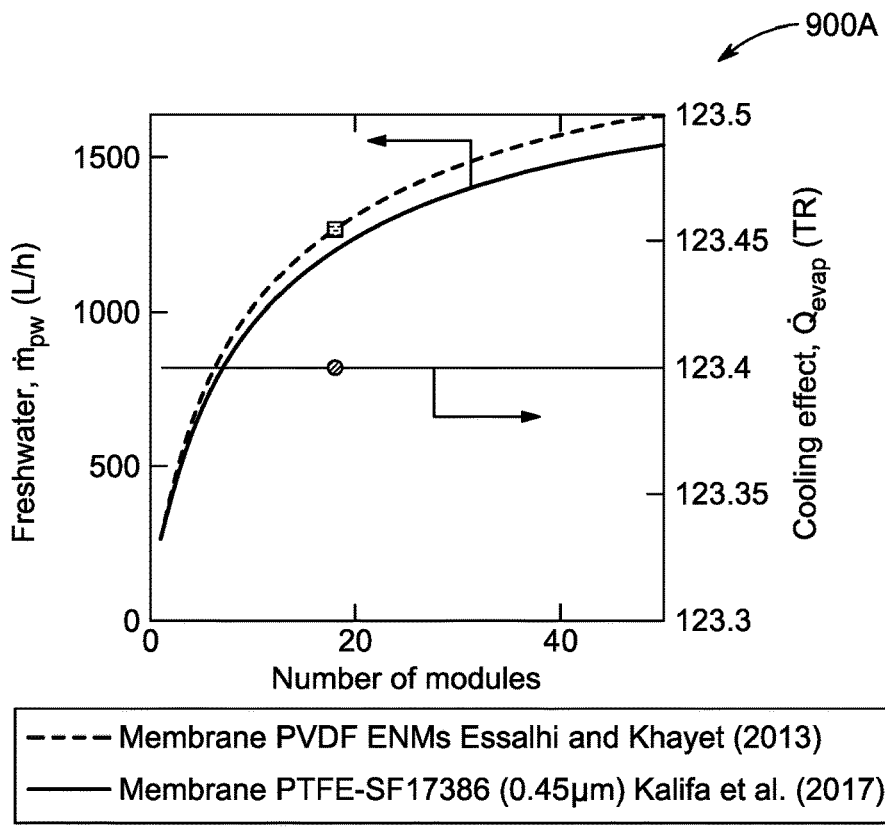
FIG. 9A is an exemplary graph depicting the effect of number of modules in the DCMD unit on the performance of the desalination system for hourly produced freshwater and cooling capacity for PVDF ENMs membrane and PTFE-SF17386 (0.45 µm) membrane, according to certain embodiments.
Figure 9B:
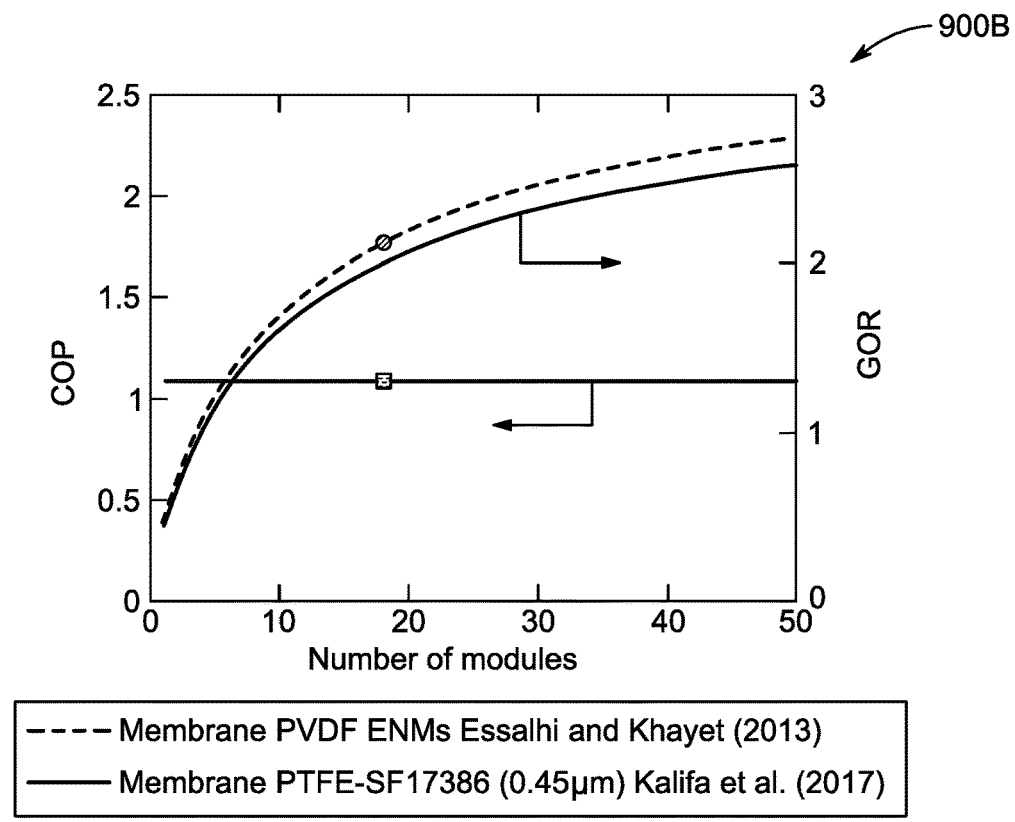
FIG. 9B is an exemplary graph depicting the effect of number of modules in the DCMD unit on the performance of the desalination system for coefficient of performance (COP) and gained output ratio (GOR) for PVDF ENMs membrane and PTFE-SF17386 (0.45 µm) membrane, according to certain embodiments.
Figure 9C:
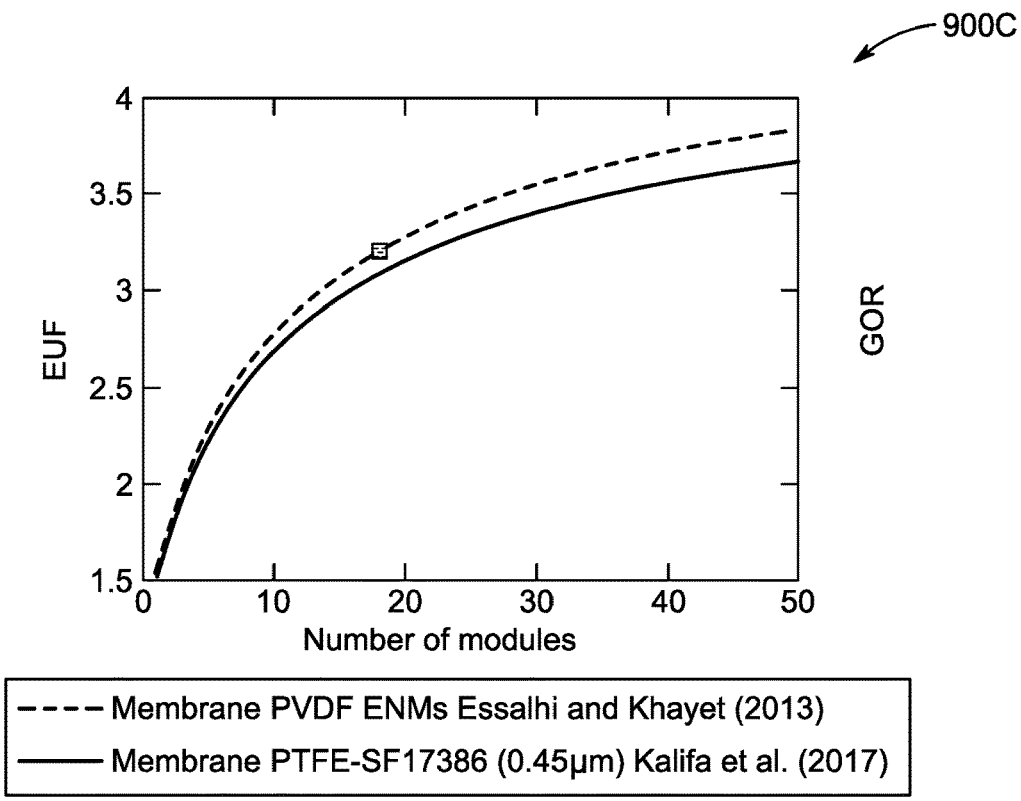
FIG. 9C is an exemplary graph depicting the effect of number of modules in the DCMD unit on the performance of the desalination system for energy utilization factor (EUF) for PVDF ENMs membrane and PTFE-SF17386 (0.45 µm) membrane, according to certain embodiments.
Figure 9D:
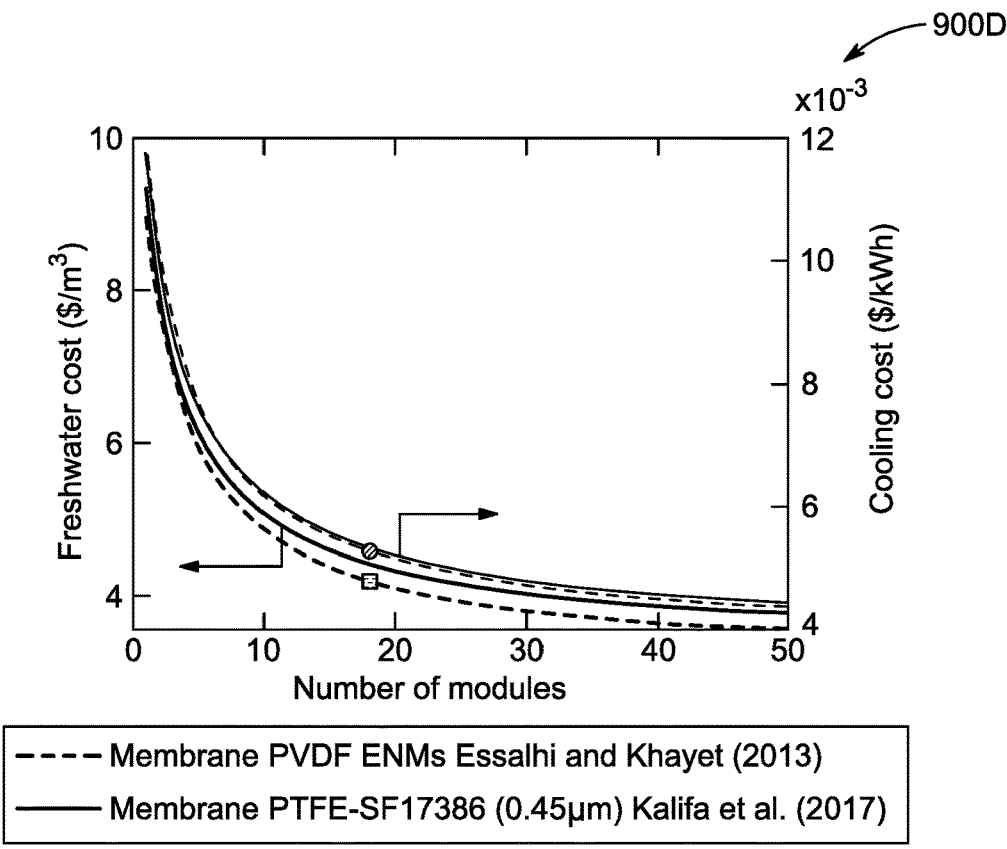
FIG. 9D is an exemplary graph depicting the effect of number of modules in the DCMD unit on the performance of the desalination system for freshwater cost and cooling cost for PVDF ENMs membrane and PTFE-SF17386 (0.45 µm) membrane, according to certain embodiments.

Referring to FIGS. 9A-9D, the effect of number of the modules 150 in the DCMD unit 100B on the performance of the desalination system 100 for PVDF ENMs membrane 156 and PTFE-SF17386 (0.45 μm) membrane 156 are graphically depicted. In particular, FIG. 9A is an exemplary graph 900A depicting the effect of number of the modules 150 in the DCMD unit 100B on the performance of the desalination system 100 for hourly produced freshwater and cooling capacity for PVDF ENMs membrane 156 and PTFE-SF17386 (0.45 μm) membrane 156. FIG. 9B is an exemplary graph 900B depicting the effect of number of the modules 150 in the DCMD unit 100B on the performance of the desalination system 100 for coefficient of performance (COP) and gained output ratio (GOR) for PVDF ENMs membrane 156 and PTFE-SF17386 (0.45 μm) membrane 156. FIG. 9C is an exemplary graph 900C depicting the effect of number of the modules 150 in the DCMD unit 100B on the performance of the desalination system 100 for energy utilization factor (EUF) for PVDF ENMs membrane 156 and PTFE-SF17386 (0.45 μm) membrane 156. FIG. 9D is an exemplary graph 900D depicting the effect of number of the modules 150 in the DCMD unit 100B on the performance of the desalination system 100 for freshwater cost and cooling cost for PVDF ENMs membrane 156 and PTFE-SF17386 (0.45 μm) membrane 156. As may be seen from the graphs 900A-900D, increasing the number of modules 150 enhances performance of the DCMD unit 100B. Despite the flow velocity decreases with the increased number of modules 150, as the modules 150 are arranged in parallel, the DCMD unit 100B offers more membrane area for water vapor transport. Another advantage is that the temperature difference between the hot feed and cold permeate streams is maintained high for all channels, unlike the series DCMD arrangement. However, the incremental performance trend shown in the graphs 900A-900D is not linear due to the negative impact of lowering the flow velocity and minimizing the heat transfer rates for increased modules. In this regard, the number of modules 150 may be selected to be about 20 to achieve high performance of the integrated system 100. Further, for the membrane type, the above results are obtained using the PTFE-SF17386 (0.45 μm) membrane Khalifa et al. To compare it to another good membrane, PVDF ENMs membrane from Alkhudhiri et al. is selected. Table 1 lists the main specification of both membranes. Herein, the graphs 900A-900D also emphasizes the same performance trends for both membranes with better values for PVDF ENMs. This might be attributed to the higher porosity and pore size of the PVDF ENMs membrane. For instance, at the number of modules being 20, the DCMD unit 100B shows enhanced water production of 1315 L/h at a GOR of 2.20 and a water cost of 4.09 $/m³. The cooling effect and COP remain constant while EUF increases to 3.28, and cooling cost decreases to 0.0052 $/kWh (due to RUD rise). Generally, these improvements in the performance of the integrated system 100 are due to an increase in the collective area of the membranes 156 to produce more water and magnifying the useful energy of the DCMD unit 100B as well as using a proper membrane type (as described).

The present disclosure further provides a comparison between the integrated system 100 (as disclosed) and stand-alone systems (as known in the art). At the typical parameters (i.e., $\dot{m}_1$=0.98, $\dot{Q}_{ht}$=400 kW, $T_{f(w1)}$=25° C., $T_{p(w8)}$=25° C., ratio of feed mass flow rate going to absorber=0.6, $\dot{m}_f$=5 kg/s, $\dot{m}_p$=30 kg/s, number of modules=20, Salinity=35 g/kg, and membrane of PVDF ENMs type), the integrated system 100 can produce 1315 L/h freshwater, 123.4 TR cooling capacity, 1.09 COP, 2.20 GOR, 3.28 EUF, 4.09 $/m³ freshwater cost, and 0.0052 $/kWh cooling cost, as listed in Table 4 below. The improvement in the performance indices of the integrated system 100 compared to the standalone DCMD shows that the integrated system 100 has superior water production by 2.23 times, GOR by 2.29 times, EUF by 3.42 times, and freshwater cost reduction by 2.82 times. Further, compared to the standalone double-effect VAR system, the integrated system 100 may reduce the cooling capacity and COP by 0.92 and 0.87 times, respectively, but with a substantial enhancement in the cooling cost reduction (by 2.88 times). Therefore, it may be concluded that with a simple reduction of the cooling capacity of the VAR unit 100A due to controlling the cooling processes of the absorber 104 and the condenser 102 to run the DCMD unit 100B, the overall performance of the integrated system 100 is significantly improved over respective standalone systems with a large reduction in the freshwater and cooling costs.

TABLE 4

Comparison between the integrated system performance and the standalone DCMD and standalone VAR systems at the same input power (400 kW).

| System | GOR | COP | EUF | Freshwater production, L/h | Cooling capacity, TR | Freshwater cost, $/m³ | Cooling effect cost, $/kWh |
|---|---|---|---|---|---|---|---|
| Integrated system | 2.20 | 1.08 | 3.28 | 1315 | 123.4 | 4.09 | 0.0052 |
| Standalone DCMD | 0.96 | — | 0.96 | 589.2 | — | 11.53 | — |
| Standalone double-effect VAR system | — | 1.247 | 1.247 | — | 134.8 | — | 0.0150 |

Further, a comparison between the present integrated system and some of related systems reported in the literature [Lawal et al., Diaby A T, Byrne P, Loulergue P, Sow O, Maré T. Experimental Study of a Heat Pump for Simultaneous Cooling and Desalination by Membrane Distillation. Membr 2021; 11, Karanikola V, Moore S E, Deshmukh A, Arnold R G, Elimelech M, Sáez AE. Economic performance of membrane distillation configurations in optimal solar thermal desalination systems. Desalination 2019; 472:114164, and Fane A G, Schofield R W, Fell C J D. The efficient use of energy in membrane distillation. Desalination 1987; 64:231-43, incorporated herein by reference in their entirety] is summarized in Table 5 below. It is clear that the integration of the VAR unit 100A with the DCMD unit 100B as per the system 100 has outstanding performance for the two products (cooling effect and freshwater).

Figure 10:
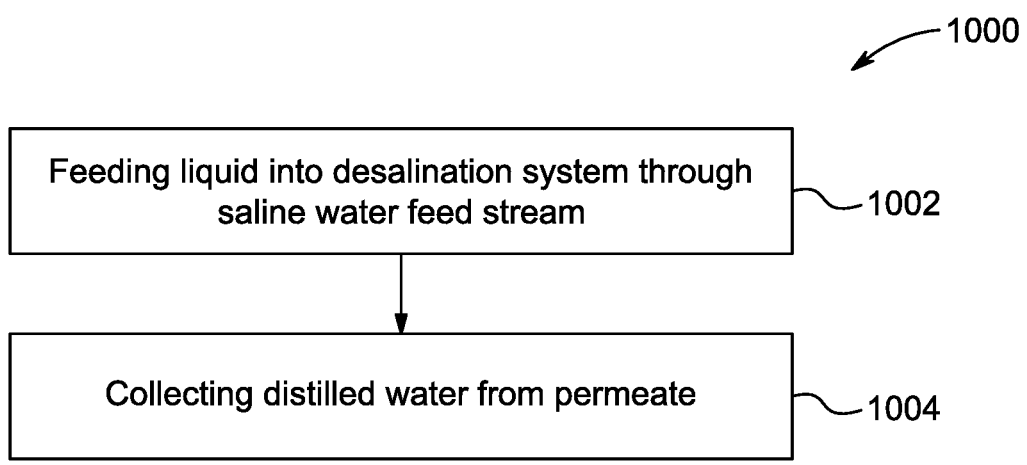
FIG. 10 is a flowchart of a desalination process utilizing the desalination system, according to certain embodiments.

Referring to FIG. 10, illustrated is a flowchart of a desalination process (as represented by reference numeral 1000) utilizing the desalination system 100. Various embodiments and variants disclosed above with respect to the desalination system 100 apply mutatis mutandis to the present desalination process 1000.

At step 1002, the desalination process 1000 includes feeding a liquid into the desalination system 100 through the saltwater feed compartment 152. As shown in FIG. 1, the condenser 102 is in fluid communication with the saltwater feed compartment 152 of the DCMD unit 100B, to pass the saltwater feed stream 'W5' thereto. Further, the absorber 104 is in fluid communication with the saltwater feed compartment 152 of the DCMD unit 100B, to pass the saltwater feed stream 'W4' thereto. In particular, the saltwater feed streams 'W2' and 'W3' (split from the saltwater feed stream 'W1') gain some heat from the absorber 104 and the condenser 102, respectively; then leave as the saltwater feed streams 'W4' and 'W5', respectively; and combined again to form a combined stream as the saltwater feed stream 'W6', and each module 150 of the DCMD unit 100B shares the hot stream 'W6' via the inlet of the saltwater feed compartment 152.

In the present embodiments, the liquid is at least one selected from a group consisting of salty water, ocean/sea water, rejected brine, wastewater, brackish water, flowback/produced water, and waste flows. That is, via the desalination process 1000, as implemented by the desalination system 100, any of the listed types of liquids, including the salty water, the ocean/sea water, the rejected brine, the

TABLE 5

Comparison between the present integrated system performance and those reported in the literature.

| Investigated System | GOR | COP | EUF | Freshwater production, L/h | Cooling capacity, TR | Freshwater cost, $/m³ | Cooling effect cost, $/kWh |
|---|---|---|---|---|---|---|---|
| VCR-DCMD (parallel connection) | 1.85 | — | — | 5.31 | — | 0.5-2 | — |
| VCR-AGMD | 0.5 | 1.2 | — | 2.0 | — | — | — |
| Solar-driven DCMD | | | | 0.42 | | 21 | |
| Solar-driven DCMD | — | — | — | 2.083 | — | 10-15 | — |
| Present VAR-DCMD (parallel connection) | 2.20 | 1.08 | 3.28 | 1315 | 123.4 | 4.09 | 0.0052 | wastewater, the brackish water, the flowback/produced water and the waste flows, may be distilled to produce freshwater.

Further, the modules 150 receive flow of a cold stream (as represented by 'W8'), from a permeate tank 162, via a cold stream line 164, in an opposite direction to the hot stream 'W6'. Herein, each module 150 of the DCMD unit 100B shares the cold stream 'W8' via the inlet of the water compartment 154. It may be understood that the hot stream 'W6' and the cold stream 'W8' are in countercurrent flow.

At step 1004, the desalination process 1000 includes collecting distilled water from the water compartment 154. In the DCMD unit 100B, the membrane 156 permits water vapor to pass from the saltwater feed compartment 152 to the water compartment 154. In particular, the saltwater feed compartment 152 of each module 150 is in fluid communication with the water compartment 154 of the same module 150 by passing a portion of the hot stream 'W6' from the saltwater feed compartment 152 to the water compartment 154 through the membrane 156. In some examples, the water compartment 154 includes a DCMD condenser (not shown) to condense the water vapor passing through the membrane 156. Specifically, due to temperature difference, water is evaporated closer to the hot saltwater feed stream channels in the saltwater feed compartment 152 and passes through the membrane 156 to the cooling water stream permeate channels in the water compartment 154. The water produced from the water compartment 154 of the DCMD unit 100B is collected at the permeate tank 162.

The desalination system 100 and the desalination process 1000 of the present disclosure exploit the double-effect vapor-absorption refrigeration unit 100A as a refrigerator (for air-conditioning purposes), and as a heat pump to run a direct contact membrane distillation (DCMD) unit 100B for freshwater production. Multiple modules 150 of the DCMD unit 100B are investigated, which are heated by the heat released from the absorber 104 and the condenser 102 of the VAR unit 100A. The operating parameters of both units 100A, 100B are tuned to achieve the optimal performance of the integrated system 100. Based on the applied conditions, it has been noticed that the input power, solution mass flow rate of the VAR unit 100A, the mass flow rate of the DCMD unit 100B (which is split to cool the condenser 102 and the absorber 104), the DCMD channel thickness, the DCMD cooling water flow rate, and the number of modules 150 have important roles in the performance of the desalination system 100. The optimal performance was 1315 L/h for produced freshwater, 123.4 TR for cooling capacity, 1.09 for COP, 2.20 for GOR, 3.28 for EUF, 4.09 $/m$^3$ for freshwater cost, and 0.0052 $/kWh for cooling effect cost. These performance values are higher than those of the standalone DCMD system by about 2.23, 2.29, 3.42, and 2.82 times for freshwater produced, GOR, EUF, and water cost, respectively. Compared to a standalone double-effect absorption refrigerator, there is a slight drop in cooling capacity and COP by 0.92 and 0.87 times; however, the cooling cost was substantially decreased by 2.88 times. Thus, the desalination system 100 and the desalination process 1000 of the present disclosure are suitable for simultaneous production of freshwater and air conditioning.

Figure 11:
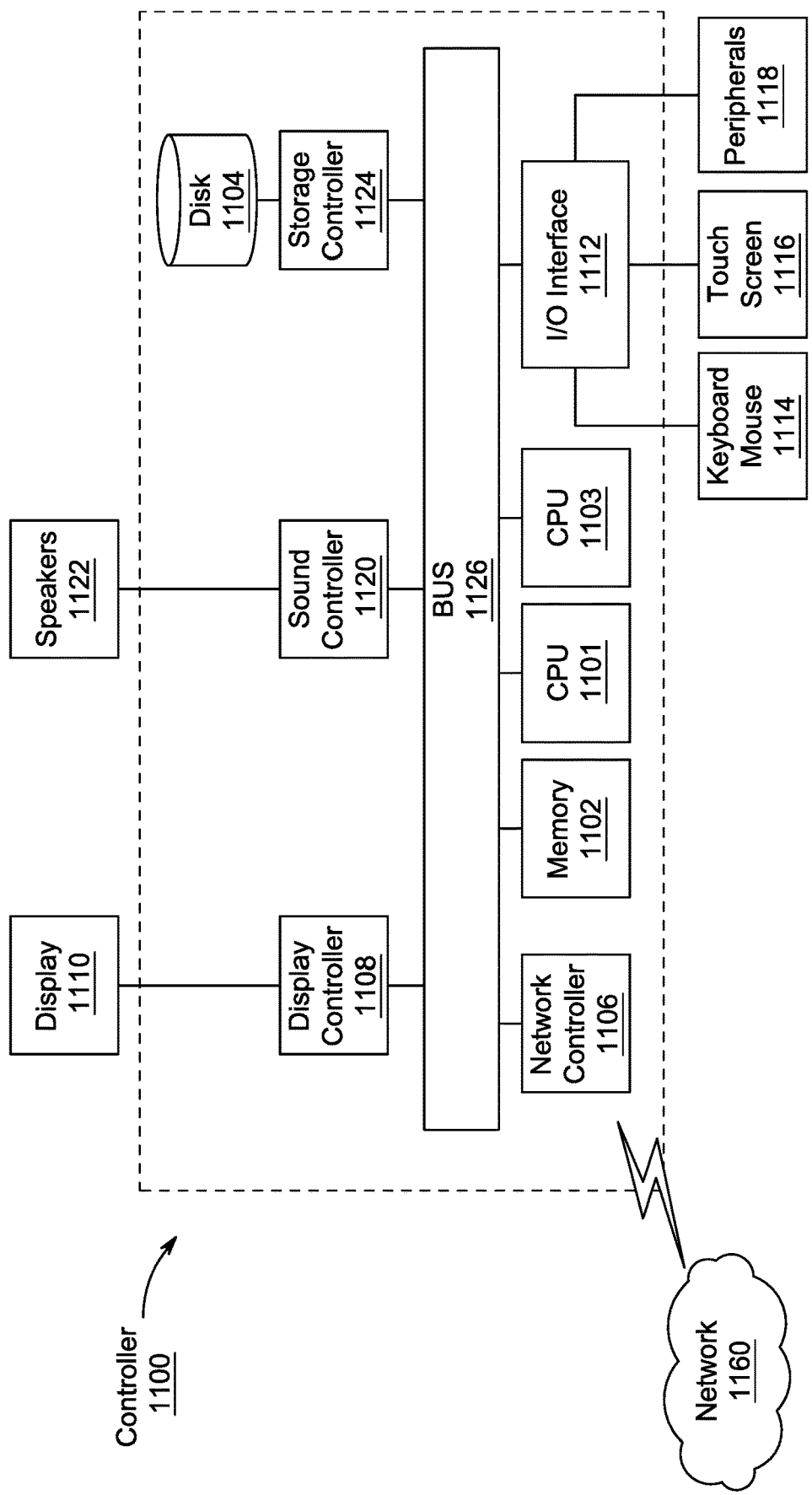
FIG. 11 is an illustration of a non-limiting example of details of computing hardware used in the computing system, according to certain embodiments.

Next, further details of hardware description of a controller 1100 which may be implemented to control various functions and operation of the present system 100 according to exemplary embodiments is described with reference to FIG. 11. In FIG. 11, the controller 1100 is described which is representative of a computing environment in which the controller 1100 (also sometimes referred to as computing device) includes a CPU 1101 which performs the processes described above/below. The process data and instructions may be stored in memory 1102. These processes and instructions may also be stored on a storage medium disk 1104 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1101, 1103 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 1101 or CPU 1103 may be a Xenon or Core processor from Intel of America or an Opteron processor from AMD of America, or may be other processor types that would be recognized by one of ordinary skill in the art. Alternatively, the CPU 1101, 1103 may be implemented on an FPGA, ASIC, PLD or using discrete logic circuits, as one of ordinary skill in the art would recognize. Further, CPU 1101, 1103 may be implemented as multiple processors cooperatively working in parallel to perform the instructions of the inventive processes described above.

The controller 1100 also includes a network controller 1106, such as an Intel Ethernet PRO network interface card from Intel Corporation of America, for interfacing with network 1160. As can be appreciated, the network 1160 can be a public network, such as the Internet, or a private network such as an LAN or WAN network, or any combination thereof and can also include PSTN or ISDN sub-networks. The network 1160 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1108, such as a NVIDIA Geforce GTX or Quadro graphics adaptor from NVIDIA Corporation of America for interfacing with display 1110, such as a Hewlett Packard HPL2445w LCD monitor.

A sound controller 1120 is also provided in the computing device such as Sound Blaster X-Fi Titanium from Creative, to interface with speakers/microphone 1122 thereby providing sounds and/or music.

The general purpose storage controller 1124 connects the storage medium disk 1104 with communication bus 1126, which may be an ISA, EISA, VESA, PCI, or similar, for interconnecting all of the components of the computing device. A description of the general features and functionality of the display 1110, the display controller 1108, storage controller 1124, network controller 1106, and the sound controller 1120 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A desalination system, comprising:
a vapor-absorption refrigeration (VAR) unit, comprising:
a first desorber and a second desorber;
an absorber;
an evaporator;
a condenser;
a first heat exchanger and a second heat exchanger;
a first lithium bromide (LiBr) solution pump and a second LiBr solution pump;
at least four throttling valves including a first throttling valve, a second throttling valve, a third throttling valve, and a fourth throttling valve;
a direct contact membrane distillation (DCMD) unit having a plurality of modules, and each module comprises:
a saltwater feed compartment and a water compartment, wherein the saltwater feed compartment and the water compartment are separated by a membrane so that water vapor is generated in the saltwater feed compartment and is transferred through the membrane to condense in the water compartment;
wherein the absorber is in fluid communication with the second heat exchanger via the second LiBr solution pump;
wherein the second heat exchanger is in fluid communication with the first heat exchanger via the first LiBr pump;
wherein the second heat exchanger is in fluid communication with the second desorber;
wherein the first heat exchanger is in fluid communication with the first desorber;
wherein the first desorber is in fluid communication with the first heat exchanger;
wherein the first heat exchanger is in fluid communication with the second desorber via the first throttling valve;
wherein the second desorber is in fluid communication with the second heat exchanger;
wherein the second heat exchanger is in fluid communication with the absorber via the second throttling valve;
wherein the second desorber is in fluid communication with the condenser via the third throttling valve;
wherein the condenser is in fluid communication with the evaporator via the fourth throttling valve;
wherein the evaporator is in fluid communication with the absorber;
wherein the condenser is in fluid communication with the saltwater feed compartment of the DCMD unit; and
wherein the absorber is in fluid communication with the saltwater feed compartment of the DCMD unit.

2. The desalination system of claim 1, wherein:
the first desorber, the second desorber, the absorber, and the evaporator are oriented horizontally; and
the first heat exchanger, the second heat exchanger, and the condenser are oriented vertically.

3. The desalination system of claim 1, wherein the modules of the DCMD unit are connected in parallel to each other, and are operated in a counter-current flow mode.

4. The desalination system of claim 1, wherein the DCMD unit comprises from 2 to 40 modules.

5. The desalination system of claim 1,
wherein each module of the DCMD unit shares a hot stream via an inlet of the saltwater feed compartment;
wherein each module of the DCMD unit shares a cold stream via an inlet of the water compartment;
wherein the hot stream and the cold stream are in countercurrent flow; and
wherein the saltwater feed compartment of each module is in fluid communication with the water compartment of the same module by passing a portion of the hot stream from the saltwater feed compartment to the water compartment through the membrane.

6. The desalination system of claim 1, wherein the DCMD unit further comprises a discharge line configured to remove excess brine within the saltwater feed compartment, and wherein each module of the DCMD unit shares the discharge line via an outlet of the saltwater feed compartment.

7. The desalination system of claim 1, wherein water produced from the water compartment of the DCMD unit is collected at a permeate tank via an outlet of the water compartment, and wherein the permeate tank is in fluid communication with each water compartment of the plurality of modules.

8. The desalination system of claim 1, wherein the condenser and the absorber share a saltwater feed stream; and
a condenser inlet and an absorber inlet are configured to receive the saltwater feed stream.

9. The desalination system of claim 1, wherein the evaporator is configured to cool a working fluid in a fluid path of an air conditioning system.

10. The desalination system of claim 1, wherein a mass flow rate of a saltwater feed stream sent to the absorber is from 1.2 to 1.8 times greater than a mass flow rate of a saltwater feed stream sent to the condenser.

11. The desalination system of claim 1, wherein the VAR unit further comprises thermal solar cells electrically connected to the first desorber to provide electricity for the first desorber.

12. The desalination system of claim 1, wherein a heating source for the first desorber is at least one selected from a group consisting of a space heater, heating pipes, a furnace, and a boiler.

13. The desalination system of claim 1, wherein the membrane is at least one selected from a group consisting of a composite membrane, a nano-composite membrane, a hydrophobic membrane, an omniphobic membrane, a hydrophilic and hydrophobic composite dual layer membrane, a modified ceramic membrane, a porous ceramic membrane, a surface modified membrane, a polymer electrolyte membrane, a porous graphene membrane, and a polymeric membrane.

14. The desalination system of claim 1, wherein the first heat exchanger is at least one selected from a group consisting of a plate heat exchanger, a tube in tube heat exchanger, a shell and tube heat exchanger, a plate and shell heat exchanger, a plate fin heat exchanger, a double tube heat exchanger, an adiabatic wheel heat exchanger, and a finned tube heat exchanger.

15. The desalination system of claim 1, wherein the second heat exchanger is at least one selected from a group consisting of a plate heat exchanger, a tube in tube heat exchanger, a shell and tube heat exchanger, a plate and shell heat exchanger, a plate fin heat exchanger, a double tube heat exchanger, an adiabatic wheel heat exchanger, and a finned tube heat exchanger.

16. The desalination system of claim 1, wherein the VAR unit employs LiBr solution as an absorbent solution, and wherein the LiBr solution has a concentration of 50 to 70 wt. % based on a total weight of the LiBr solution.

17. The desalination system of claim 1, wherein the absorber is in fluid communication with the plurality of modules of the DCMD unit through inlets of the saltwater feed compartment.

18. The desalination system of claim 1, wherein the condenser is in fluid communication with the plurality of modules of the DCMD unit through inlets of the saltwater feed compartment.

19. The desalination system of claim 1, wherein a heat transfer fluid employed in both the first heat exchanger and the second heat exchanger is at least one molten salt selected from a group consisting of sodium nitrate and potassium nitrate.

20. A desalination process, comprising:
feeding a liquid into the desalination system of claim 1 through the saltwater feed compartment; and
collecting distilled water from the water compartment;
wherein the liquid is at least one selected from a group consisting of salty water, ocean/sea water, rejected brine, wastewater, brackish water, flowback/produced water, and waste flows.

* * * * *